US012701205B2

(12) United States Patent
Kim

(10) Patent No.: US 12,701,205 B2
(45) Date of Patent: Aug. 4, 2026

(54) ELECTRONIC APPARATUS FOR PROJECTING IMAGE AND CONTROLLING METHOD THEREOF

(71) Applicant: SAMSUNG ELECTRONICS CO., LTD., Suwon-si (KR)

(72) Inventor: Hyungchul Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 18/197,904

(22) Filed: May 16, 2023

(65) Prior Publication Data

US 2024/0040094 A1     Feb. 1, 2024

Related U.S. Application Data

(63) Continuation of application No. PCT/KR2023/004860, filed on Apr. 11, 2023.

(30) Foreign Application Priority Data

Jul. 27, 2022     (KR) ........................ 10-2022-0093448

(51) Int. Cl.
*H04N 9/31* (2006.01)

(52) U.S. Cl.
CPC ......... *H04N 9/3188* (2013.01); *H04N 9/3185* (2013.01)

(58) Field of Classification Search
CPC .. H04N 9/3188; H04N 9/3185; H04N 9/3173; H04N 9/3194; H04N 9/3155;
(Continued)

(56) References Cited

U.S. PATENT DOCUMENTS 6,547,400 B1     4/2003     Yokoyama
6,935,745 B1     8/2005     Kitabayashi et al.
(Continued)

FOREIGN PATENT DOCUMENTS

EP          4 287 616 A1     12/2023
JP       2007-215029 A       8/2007
(Continued)

OTHER PUBLICATIONS

Search Report dated Jul. 20, 2023 issued by International Searching Authority in counterpart International Application No. PCT/KR2023/004860.
(Continued)

*Primary Examiner* — John W Miller
*Assistant Examiner* — Human M Satti
(74) *Attorney, Agent, or Firm* — Sughrue Mion, PLLC

(57)          ABSTRACT

An electronic apparatus includes a sensor including a first sensor configured to detect a distance between the electronic apparatus and a projection plane and a second sensor configured to detect an inclination of the electronic apparatus, a memory, a projecting part, and at least one processor configured to obtain first environment information through the first sensor and the second sensor, control the projecting part to output a projection image to the projection plane based on first setting information corresponding to the first environment information among plurality of setting information stored in the memory, obtain second environment information through the first sensor and the second sensor based on motion of the electronic apparatus being detected through the second sensor, and control the projecting part to output the projection image to the projection plane based on second setting information corresponding to the second environment information.

17 Claims, 51 Drawing Sheets

(58) Field of Classification Search
CPC .... H04N 9/317; H04N 9/3179; H04N 9/3182; H04N 9/31; H04N 9/3141; G03B 21/147; G03B 21/142; G03B 21/145; G03B 21/53; G03B 21/14
See application file for complete search history.

(56) References Cited

U.S. PATENT DOCUMENTS

| | | | |
|---|---|---|---|
| 7,131,732 B2 | 11/2006 | Inoue | |
| 7,929,758 B2 | 4/2011 | Cho et al. | |
| 8,025,414 B2 | 9/2011 | Furui | |
| 8,322,863 B1* | 12/2012 | Cho | H04N 9/3185 |
| | | | 353/70 |
| 8,368,685 B2 | 2/2013 | Arai | |
| 9,596,441 B2 | 3/2017 | Shin | |
| 10,310,676 B2 | 6/2019 | Lee et al. | |
| 2002/0051095 A1 | 5/2002 | Su | |
| 2004/0036844 A1* | 2/2004 | Wood | G06T 5/80 |
| | | | 353/70 |
| 2007/0154086 A1 | 7/2007 | Cho et al. | |
| 2009/0015730 A1 | 1/2009 | Arakawa | |
| 2009/0046091 A1 | 2/2009 | Arai | |
| 2009/0207322 A1* | 8/2009 | Mizuuchi | H04N 9/3194 |
| | | | 348/E3.048 |
| 2010/0103386 A1* | 4/2010 | Kubota | H04N 9/3185 |
| | | | 353/121 |
| 2012/0313974 A1* | 12/2012 | Ueno | H04M 1/21 |
| | | | 345/668 |
| 2014/0168618 A1 | 6/2014 | Kinebuchi et al. | |
| 2015/0381956 A1* | 12/2015 | Takagi | H04N 9/3185 |
| | | | 348/745 |
| 2017/0124926 A1* | 5/2017 | Mitsuhashi | G09G 3/001 |
| 2018/0024696 A1* | 1/2018 | Lee | H04N 5/74 |
| | | | 345/175 |
| 2020/0195900 A1* | 6/2020 | Sodhi | H04N 9/3194 |
| 2020/0213568 A1* | 7/2020 | Ozawa | H04N 9/3185 |
| 2022/0238060 A1* | 7/2022 | Kitabayashi | G09G 5/377 |
| 2022/0368870 A1* | 11/2022 | Inoue | H04N 9/3185 |
| 2023/0418145 A1 | 12/2023 | Nishi et al. | |
| 2024/0114117 A1* | 4/2024 | Qi | H04N 9/3188 |
| 2024/0333897 A1* | 10/2024 | Miyoshi | H04N 9/3188 |

FOREIGN PATENT DOCUMENTS

| | | | |
|---|---|---|---|
| JP | 2008-211354 A | | 9/2008 |
| JP | 4909587 B2 | | 4/2012 |
| JP | 2013-239982 A | | 11/2013 |
| KR | 10-1993-0013855 A | | 7/1993 |
| KR | 10-0543116 B1 | | 1/2006 |
| KR | 10-2007-0072324 A | | 7/2007 |
| KR | 10-0786402 B1 | | 12/2007 |
| KR | 10-0835759 B1 | | 6/2008 |
| KR | 10-2015-0080678 A | | 7/2015 |
| KR | 10-2016-0095923 A | | 8/2016 |
| KR | 10-1691880 B1 | | 1/2017 |
| KR | 10-2019-0135147 A | | 12/2019 |
| WO | 2022/113817 A1 | | 6/2022 |

OTHER PUBLICATIONS

Written Opinion dated Jul. 20, 2023 issued by International Searching Authority in counterpart International Application No. PCT/KR2023/004860.
Communication issued May 15, 2025 by the European Patent Office in European Patent Application No. 23846736.9.

* cited by examiner

FIG. 9
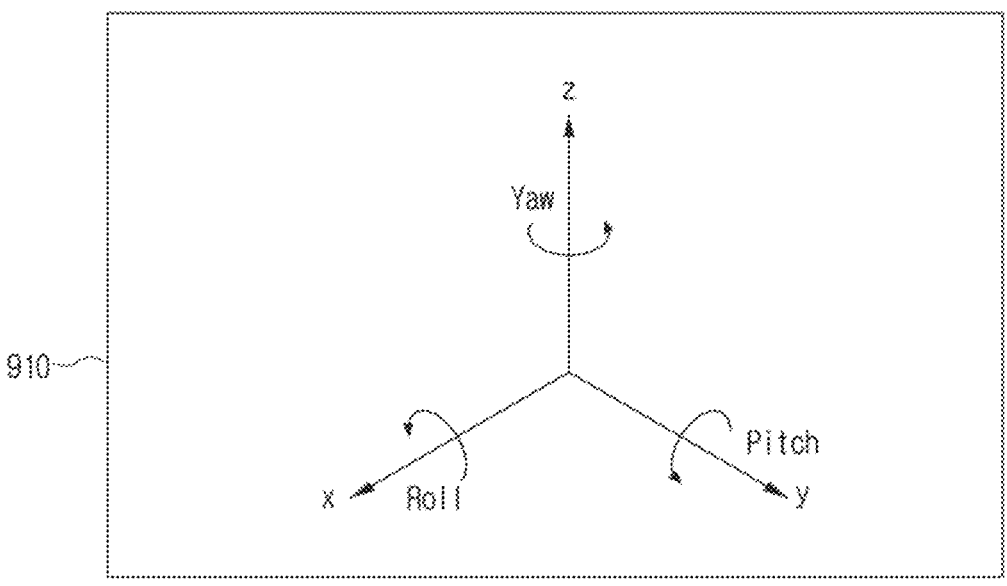
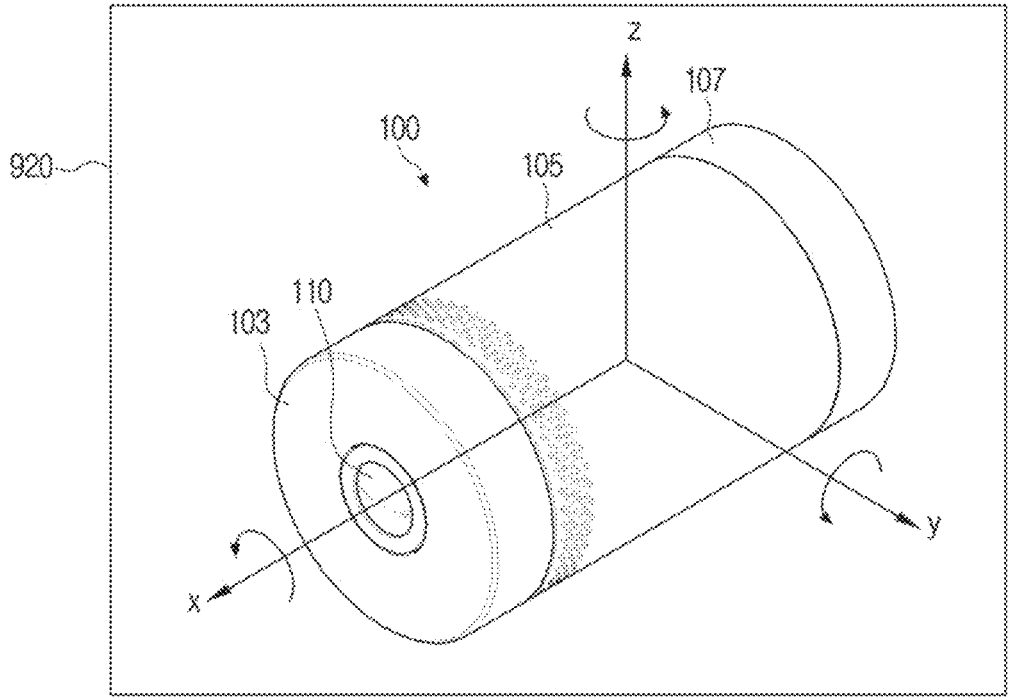

FIG. 10
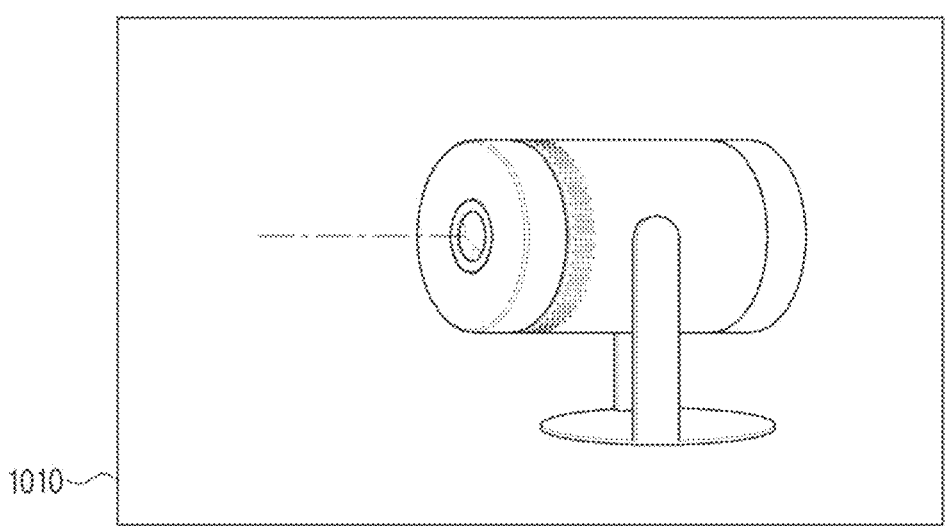
1010
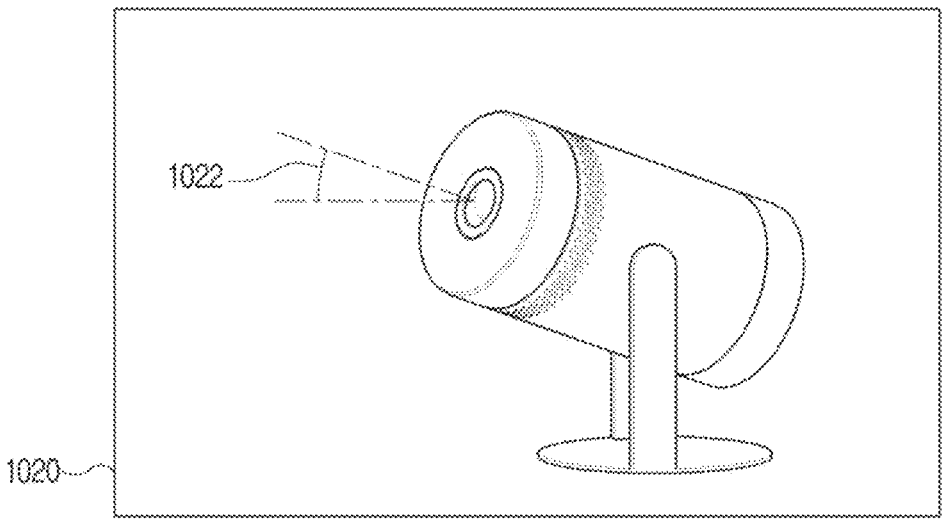
1022
1020

FIG. 11
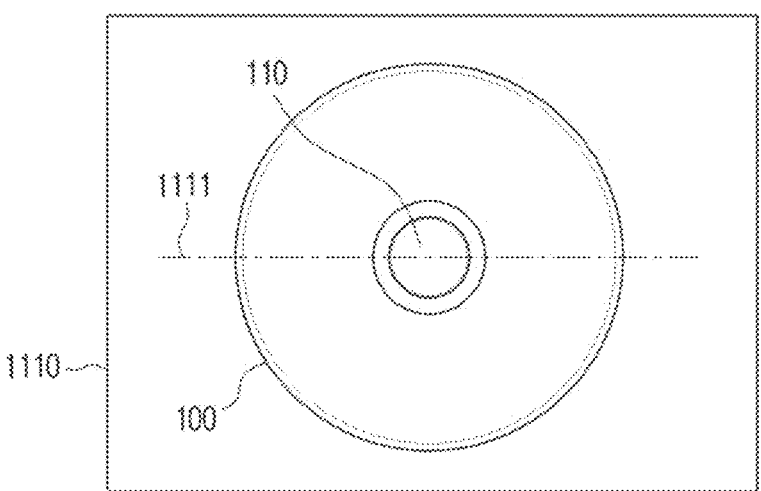
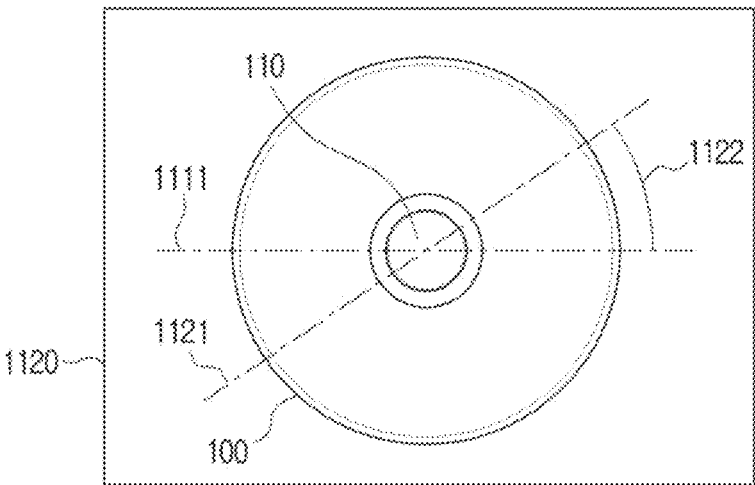

FIG. 12
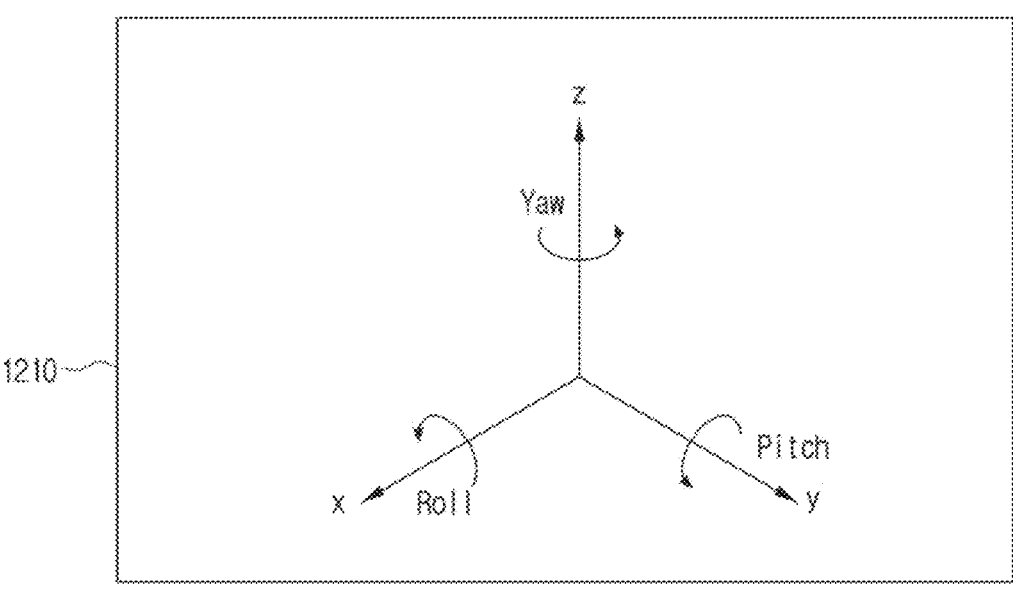
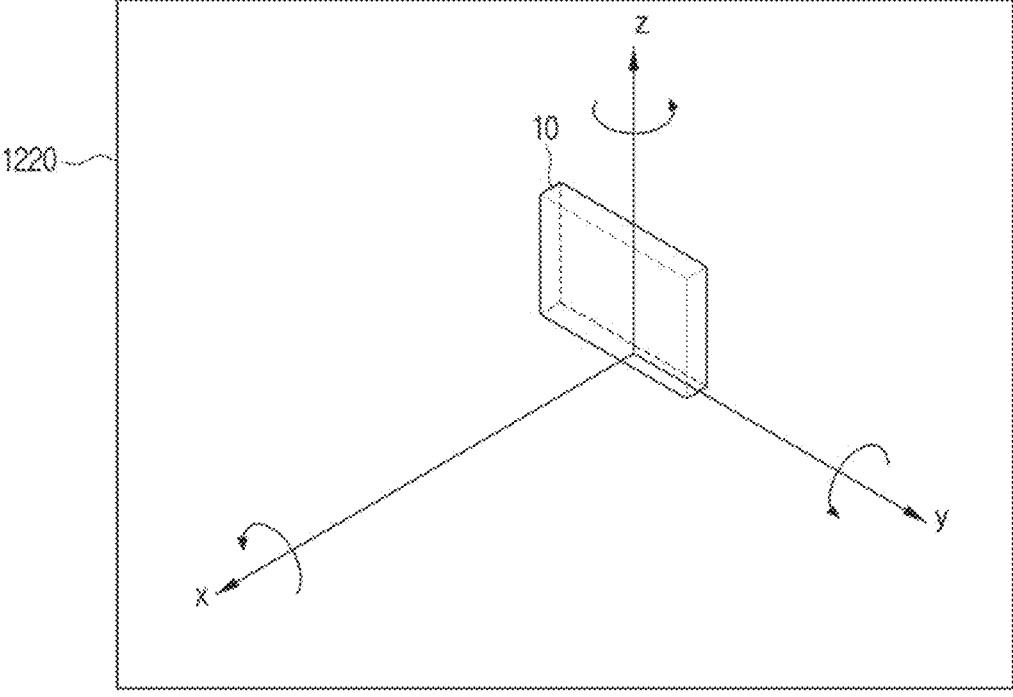

FIG. 14
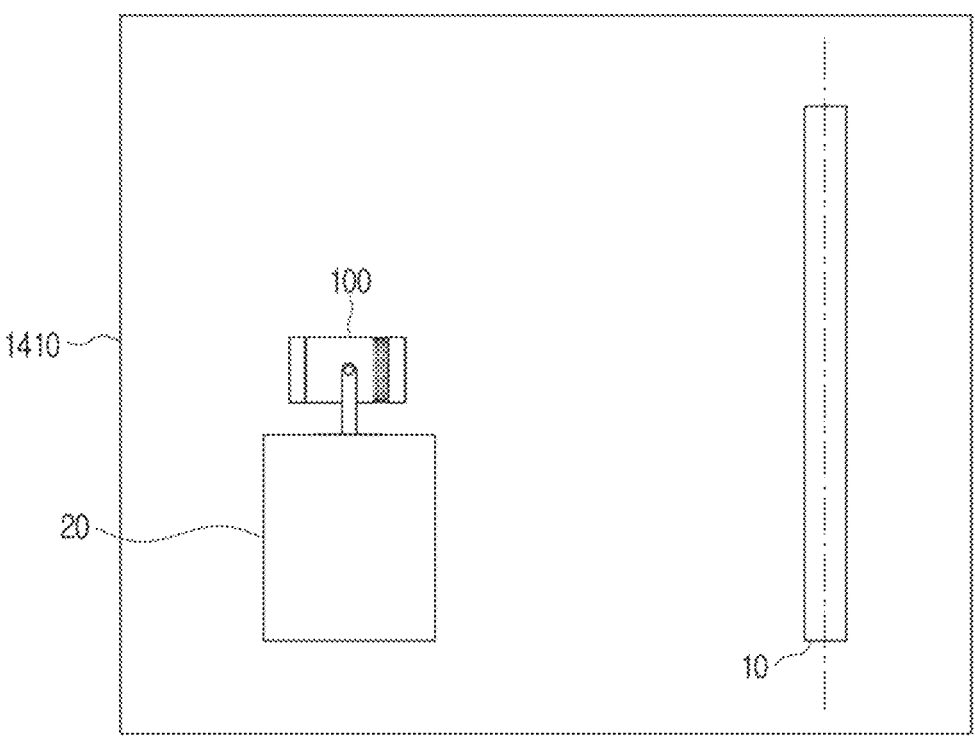
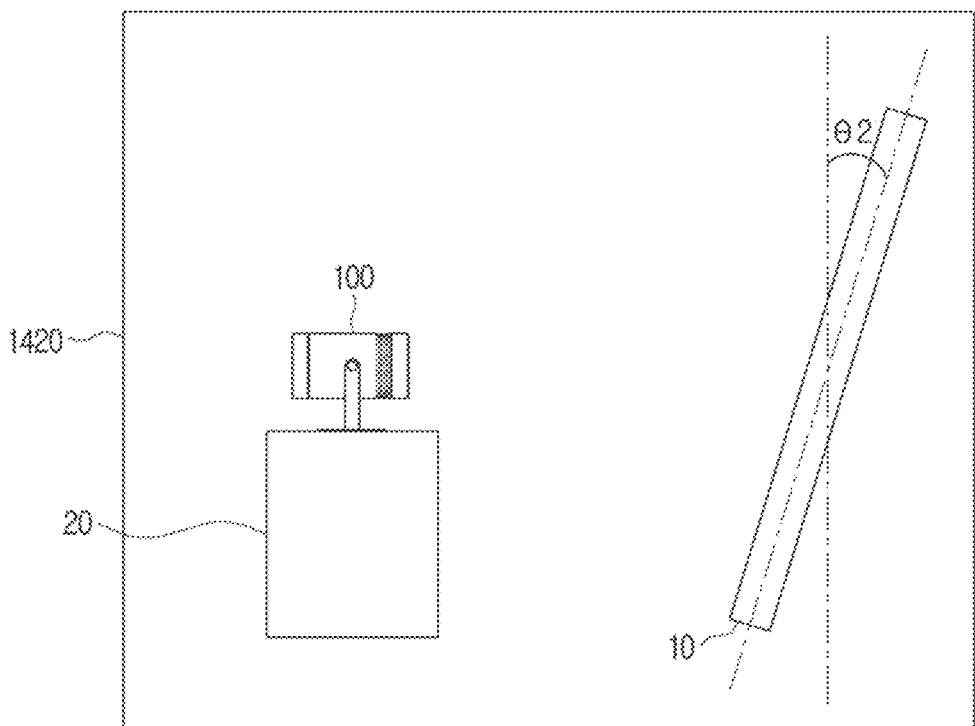

FIG. 20

| | IMAGE | | | | AUDIO | | | OBJECT | |
|---|---|---|---|---|---|---|---|---|---|
| | PROJECTION RATIO | RESOLUTION | BRIGHTNESS | CONTRAST | VOLUME | CHANNEL | EFFECT | TYPE | POSITION |
| FIRST SPACE | 1 | HD | 70 | 50 | 20 | 1 | ROOM | ~ | ~ |
| SECOND SPACE | 1.1 | FHD | 80 | 50 | 30 | 2 | ~ | ~ | ~ |
| THIRD SPACE | 1.3 | UHD | 80 | 50 | 41 | 5 | ~ | ~ | ~ |
| FOURTH SPACE | 1.5 | SUHD | 80 | 50 | 50 | 5 | ~ | FLOWER POT | (x1,y1)~ (x2,y2) |

Figure 25:
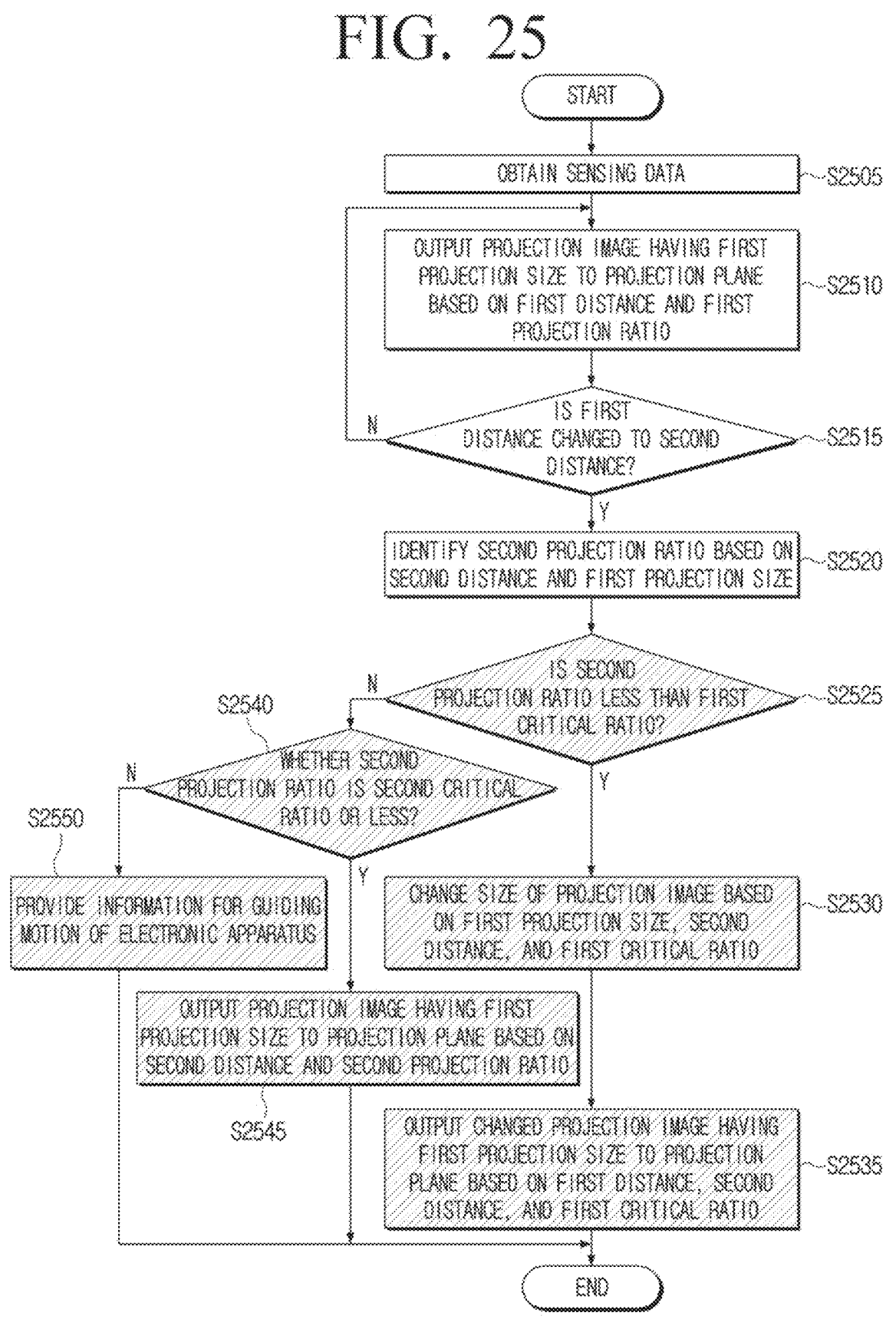

START

OBTAIN SENSING DATA ── S2505

OUTPUT PROJECTION IMAGE HAVING FIRST PROJECTION SIZE TO PROJECTION PLANE BASED ON FIRST DISTANCE AND FIRST PROJECTION RATIO ── S2510

IS FIRST DISTANCE CHANGED TO SECOND DISTANCE? ── S2515
N
Y

IDENTIFY SECOND PROJECTION RATIO BASED ON SECOND DISTANCE AND FIRST PROJECTION SIZE ── S2520

IS SECOND PROJECTION RATIO LESS THAN FIRST CRITICAL RATIO? ── S2525
N
Y

S2540 WHETHER SECOND PROJECTION RATIO IS SECOND CRITICAL RATIO OR LESS?
N
Y

S2550 PROVIDE INFORMATION FOR GUIDING MOTION OF ELECTRONIC APPARATUS

CHANGE SIZE OF PROJECTION IMAGE BASED ON FIRST PROJECTION SIZE, SECOND DISTANCE, AND FIRST CRITICAL RATIO ── S2530

OUTPUT PROJECTION IMAGE HAVING FIRST PROJECTION SIZE TO PROJECTION PLANE BASED ON SECOND DISTANCE AND SECOND PROJECTION RATIO
S2545

OUTPUT CHANGED PROJECTION IMAGE HAVING FIRST PROJECTION SIZE TO PROJECTION PLANE BASED ON FIRST DISTANCE, SECOND DISTANCE, AND FIRST CRITICAL RATIO ── S2535

END

Figure 28:
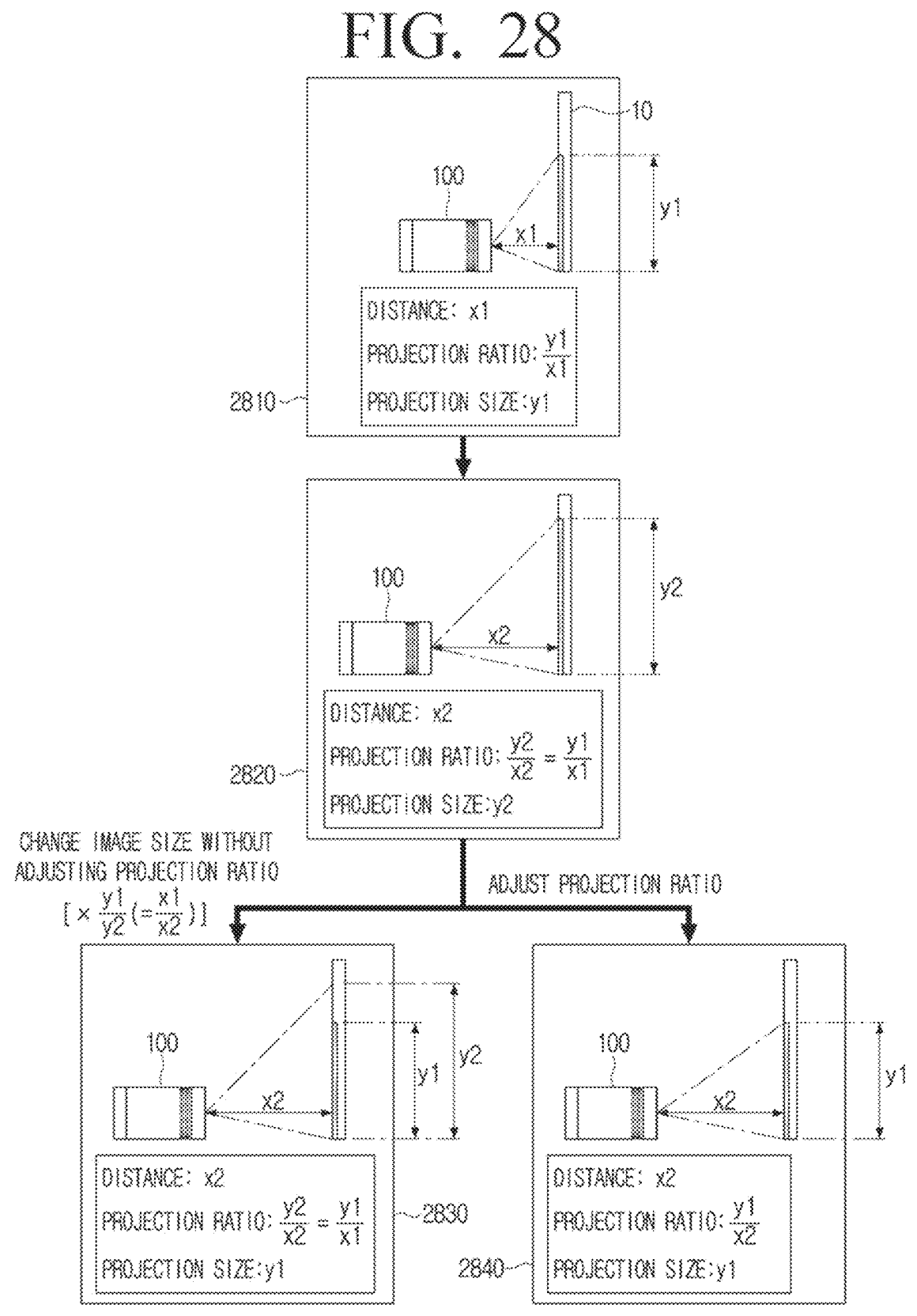

DISTANCE: x1

PROJECTION RATIO: $\frac{y1}{x1}$

PROJECTION SIZE: y1

2810

DISTANCE: x2

PROJECTION RATIO: $\frac{y2}{x2} = \frac{y1}{x1}$

PROJECTION SIZE: y2

2820

CHANGE IMAGE SIZE WITHOUT
ADJUSTING PROJECTION RATIO $[\times \frac{y1}{y2}(=\frac{x1}{x2})]$

ADJUST PROJECTION RATIO

DISTANCE: x2

PROJECTION RATIO: $\frac{y2}{x2} = \frac{y1}{x1}$

PROJECTION SIZE: y1

2830

DISTANCE: x2

PROJECTION RATIO: $\frac{y1}{x2}$

PROJECTION SIZE: y1

2840

$$p\_th1 = \frac{y\_th1}{x\_th}$$

$$p\_th2 = \frac{y\_th2}{x\_th}$$

Figure 30:
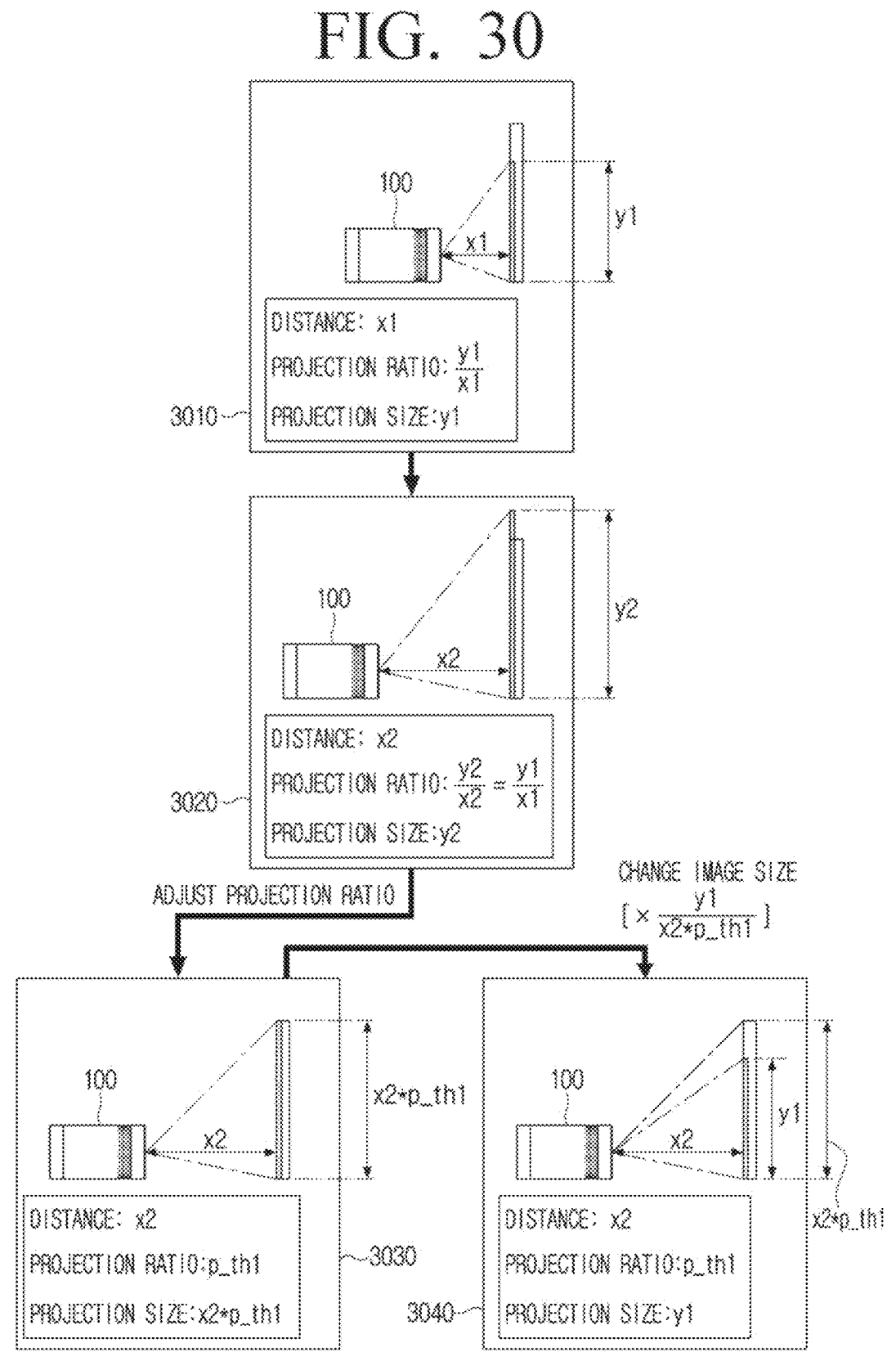

DISTANCE: x1

PROJECTION RATIO: $\dfrac{y1}{x1}$

PROJECTION SIZE: y1

3020

DISTANCE: x2

PROJECTION RATIO: $\dfrac{y2}{x2} = \dfrac{y1}{x1}$

PROJECTION SIZE: y2

ADJUST PROJECTION RATIO

CHANGE IMAGE SIZE $[ \times \dfrac{y1}{x2 \ast p\_th1} ]$

3030

DISTANCE: x2

PROJECTION RATIO: p_th1

PROJECTION SIZE: x2*p_th1

3040

DISTANCE: x2

PROJECTION RATIO: p_th1

PROJECTION SIZE: y1 x2*p_th1

Figure 31:
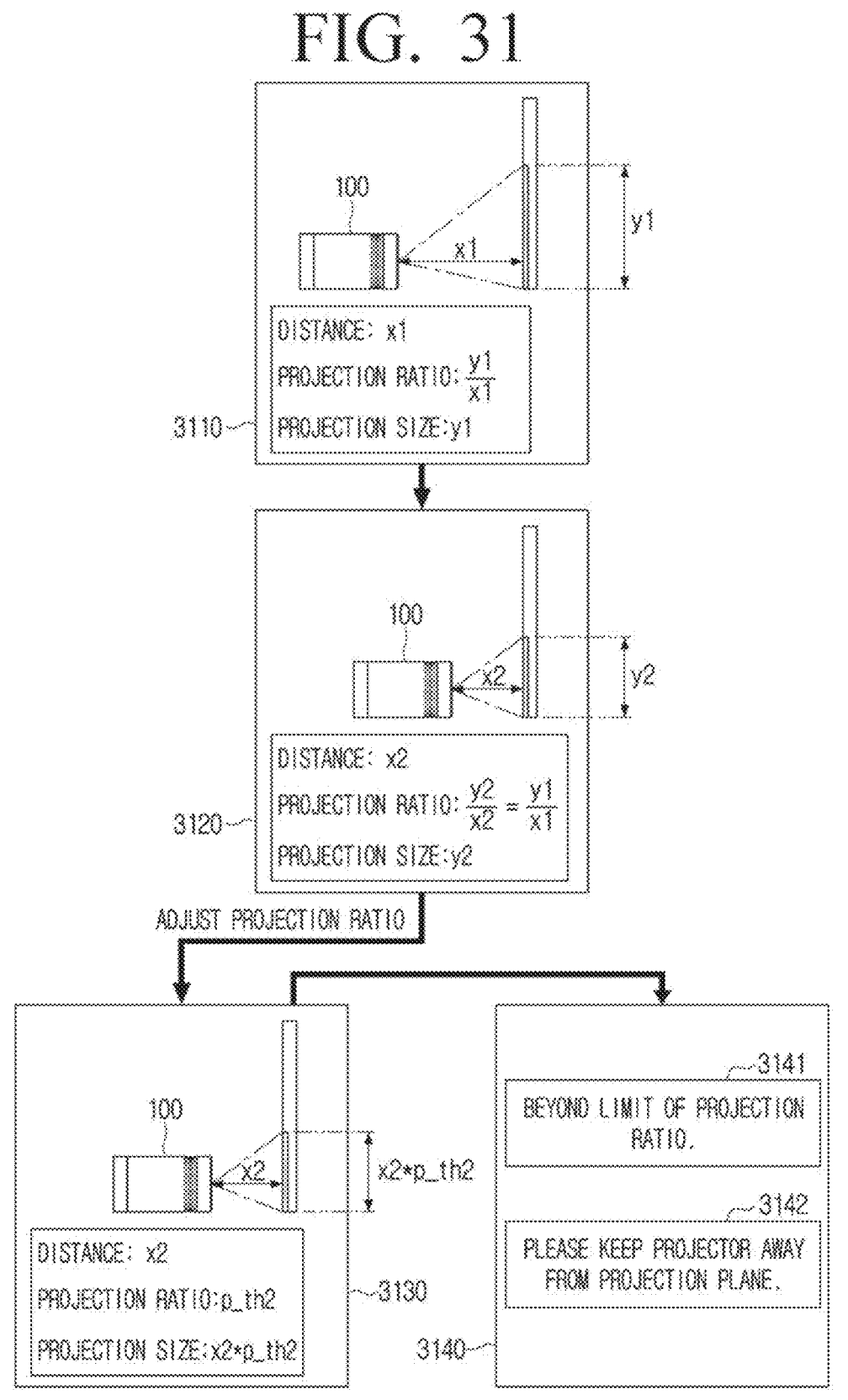

DISTANCE: x1

PROJECTION RATIO: $\frac{y1}{x1}$

PROJECTION SIZE: y1

3110

100

DISTANCE: x2

PROJECTION RATIO: $\frac{y2}{x2} \approx \frac{y1}{x1}$

PROJECTION SIZE: y2

3120

ADJUST PROJECTION RATIO

100

DISTANCE: x2

PROJECTION RATIO: p_th2

PROJECTION SIZE: x2*p_th2

3130

BEYOND LIMIT OF PROJECTION RATIO.

3141

PLEASE KEEP PROJECTOR AWAY FROM PROJECTION PLANE.

3142

3140

FIG. 47
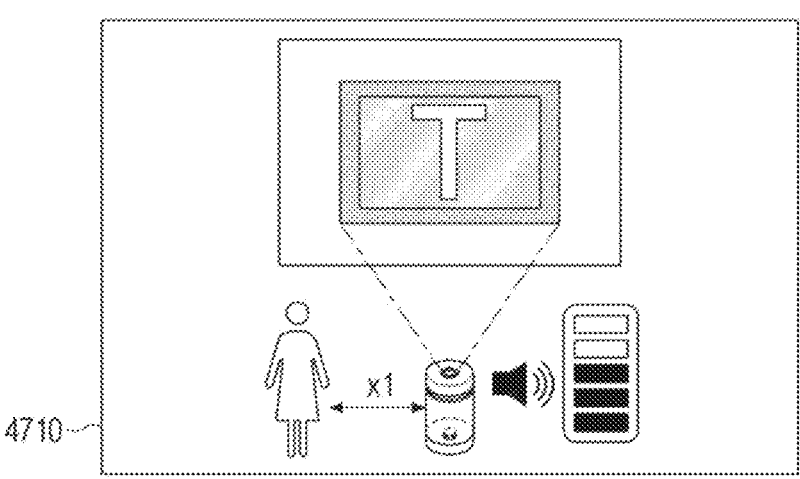
4710
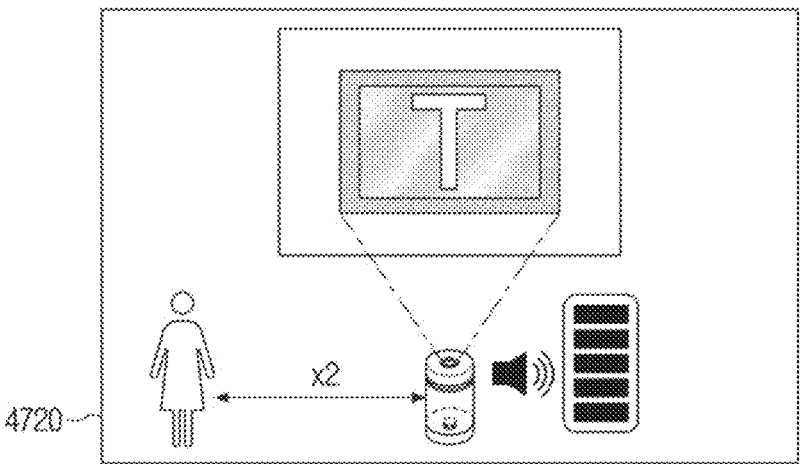
4720

FIG. 49
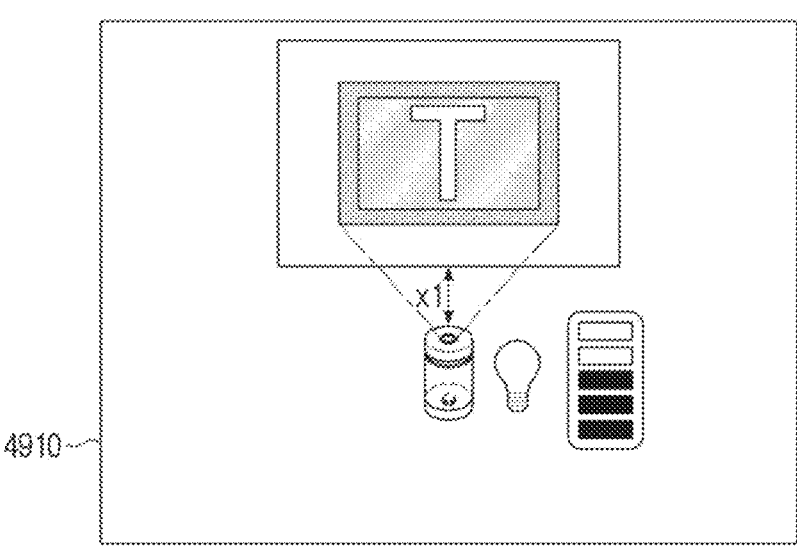
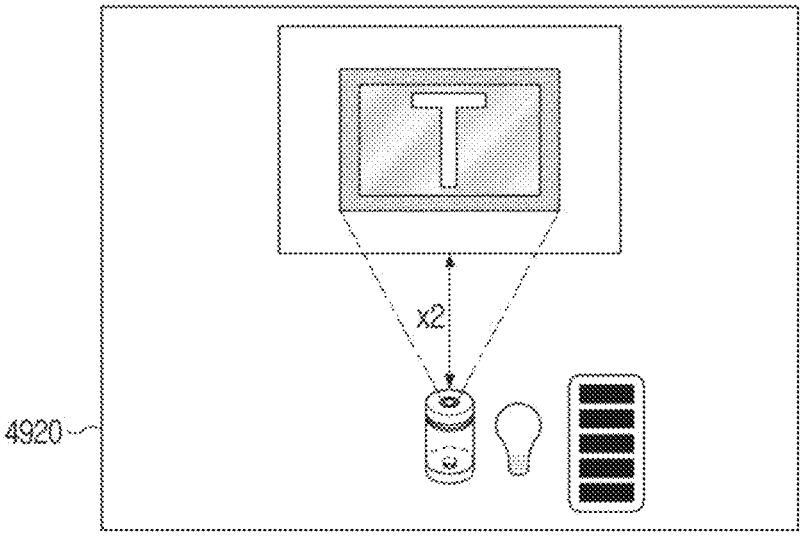

ELECTRONIC APPARATUS FOR PROJECTING IMAGE AND CONTROLLING METHOD THEREOF

CROSS-REFERENCE TO RELATED APPLICATION(S)

This application is a bypass continuation of International Application No. PCT/KR2023/004860, filed on Apr. 11, 2023, which is based on and claims priority to Korean Patent Application No. 10-2022-0093448, filed on Jul. 27, 2022, in the Korean Intellectual Property Office, the disclosures of which are incorporated by reference herein in their entireties.

BACKGROUND

1. Field

The disclosure relates to an electronic apparatus for projecting an image and a controlling method thereof.

2. Description of Related Art

An image projected on a flat projection plane may have various shapes based on a rotation degree of a projector. Even though the projector is squarely facing the projection plane, the projection image may be distorted and output in case that the projector fails to be in a perfect horizontal level.

In related art, to correct the distorted image, the projector may perform correction on the image itself. In addition, the projector may control an output setting through a lens shift function or a projection ratio adjustment function, in addition to the operation of correcting the image itself.

When repeatedly using the projector in a particular space, the user may use the projector with an optimal setting already applied thereto. However, it may be difficult to identically position the projector even once applying the optimal setting thereto.

In addition, the electronic apparatus may be moved while outputting the image even in case that the image having the optimal setting is being already output. The electronic apparatus may be moved due to the user's mistake or an unexpected bump. In case that the electronic apparatus is moved, it may be inconvenient because the user has to manually manipulate the setting again.

SUMMARY

Provided is an electronic apparatus for projecting an image, which may change a setting for projecting the image based on motion of the electronic apparatus, and a controlling method thereof.

Provided is an electronic apparatus which may automatically change an existing setting to output the same projection image in case that the electronic apparatus is moved, and a controlling method thereof.

Additional aspects will be set forth in part in the description which follows and, in part, will be apparent from the description, or may be learned by practice of the presented embodiments.

According to an aspect of the disclosure, an electronic apparatus may include a sensor including a first sensor configured to detect a distance between the electronic apparatus and a projection plane and a second sensor configured to detect an inclination of the electronic apparatus, a memory storing a plurality of setting information, a projecting part, and at least one processor configured to obtain first environment information through the first sensor and the second sensor, control the projecting part to output a projection image to the projection plane based on first setting information of the plurality of setting information, the first setting information corresponding to the first environment information, obtain second environment information through the first sensor and the second sensor based on motion of the electronic apparatus being detected through the second sensor, and control the projecting part to output the projection image to the projection plane based on second setting information corresponding to the second environment information and based on the first environment information being changed to the second environment information.

The first environment information or the second environment information may include at least one of information about the inclination of the electronic apparatus, information about the distance between the electronic apparatus and the projection plane, and information about an object around the electronic apparatus, and the first setting information or the second setting information may include at least one of a projection ratio of an image, resolution of the image, brightness of the image, and a volume of an audio.

The at least one processor may be further configured to obtain the second environment information through the first sensor and the second sensor based on detecting no motion of the electronic apparatus for a predetermined time after detecting the motion of the electronic apparatus through the second sensor.

The at least one processor may be further configured to, based on a first distance between the electronic apparatus and the projection plane being included in the first environment information, control the projecting part to output the projection image having a first projection size to the projection plane based on the first distance and a first projection ratio.

The at least one processor may be further configured to, based on a second distance between the electronic apparatus and the projection plane being included in the second environment information, control the projecting part to output the projection image having the first projection size to the projection plane based on the first distance, the second distance, and the first projection ratio.

The at least one processor may be further configured to control the projecting part to change a size of the projection image based on a ratio of the first distance to the second distance and output the projection image having the changed size to the projection plane.

The at least one processor may be further configured to, based on a second distance between the electronic apparatus and the projection plane being included in the second environment information, control the projecting part to output the projection image having the first projection size to the projection plane based on the second distance and a second projection ratio.

The at least one processor may be further configured to obtain information about the second projection ratio based on the second distance and the first projection size.

The at least one processor may be further configured to, based on a first distance between the electronic apparatus and the projection plane being included in the first environment information, control the projecting part to output the projection image to the projection plane based on a first brightness corresponding to the first distance, and based on a second distance between the electronic apparatus and the projection plane being included in the second environment information, control the projecting part to output the projection image to the projection plane based on a second brightness corresponding to the second distance.

The at least one processor may be further configured to provide a user interface (UI) configured to indicate whether the second setting information corresponding to the second environment information is applied based on the first environment information being changed to the second environment information.

According to an aspect of the disclosure, a controlling method of an electronic apparatus, the electronic apparatus including a first sensor configured to detect a distance between the electronic apparatus and a projection plane and a second sensor configured to detect an inclination of the electronic apparatus, may include obtaining first environment information through the first sensor and the second sensor, outputting a projection image to the projection plane based on first setting information corresponding to the first environment information, obtaining second environment information through the first sensor and the second sensor based on motion of the electronic apparatus being detected through the second sensor, and outputting the projection image to the projection plane based on second setting information corresponding to the second environment information and based on the first environment information being changed to the second environment information.

The first environment information or the second environment information may include at least one of information about the inclination of the electronic apparatus, information about the distance between the electronic apparatus and the projection plane, and information about an object around the electronic apparatus, and the first setting information or the second setting information may include at least one of a projection ratio of an image, resolution of the image, brightness of the image, and a volume of an audio.

The second environment information may be obtained through the first sensor and the second sensor based on no motion of the electronic apparatus being detected for a predetermined time after the motion of the electronic apparatus is detected through the second sensor.

The outputting of the projection image to the projection plane based on the first setting information may include, based on a first distance between the electronic apparatus and the projection plane being included in the first environment information, outputting the projection image having a first projection size to the projection plane based on the first distance and a first projection ratio.

The outputting of the projection image to the projection plane based on the second setting information may include, based on a second distance between the electronic apparatus and the projection plane being included in the second environment information, outputting the projection image having the first projection size to the projection plane based on the first distance, the second distance, and the first projection ratio.

The method may include changing a size of the projection image based on a ratio of the first distance to the second distance and outputting the projection image having the changed size to the projection plane.

The method may include, based on a second distance between the electronic apparatus and the projection plane being included in the second environment information, outputting the projection image having the first projection size to the projection plane based on the second distance and a second projection ratio.

The method may include obtaining information about the second projection ratio based on the second distance and the first projection size.

The method may include, based on a first distance between the electronic apparatus and the projection plane being included in the first environment information, outputting the projection image to the projection plane based on a first brightness corresponding to the first distance, and based on a second distance between the electronic apparatus and the projection plane being included in the second environment information, outputting the projection image to the projection plane based on a second brightness corresponding to the second distance.

According to an aspect of the disclosure, a non-transitory computer-readable storage medium may store instructions that, when executed by at least one processor, cause the at least one processor to obtain first environment information through a first sensor and a second sensor, the first sensor configured to detect a distance between an electronic apparatus and a projection plane, and the second sensor configured detect an inclination of the electronic apparatus, output a projection image to the projection plane based on first setting information corresponding to the first environment information, obtain second environment information through the first sensor and the second sensor based on motion of the electronic apparatus being detected through the second sensor, and output the projection image to the projection plane based on second setting information corresponding to the second environment information and based on the first environment information being changed to the second environment information.

BRIEF DESCRIPTION OF DRAWINGS

The above and other aspects, features, and advantages of certain embodiments of the present disclosure will be more apparent from the following description taken in conjunction with the accompanying drawings, in which:

FIG. 9 is a diagram of information about rotation of the electronic apparatus according to an embodiment of the disclosure;

FIG. 10 is a diagram of information about y-axis rotation of the electronic apparatus; according to an embodiment of the disclosure;

FIG. 11 is a diagram of information about x-axis rotation of the electronic apparatus; according to an embodiment of the disclosure;

FIG. 12 is a diagram of information about rotation of a projection plane; according to an embodiment of the disclosure;

FIG. 14 is a diagram of information about y-rotation of the projection plane; according to an embodiment of the disclosure;

FIG. 20 is a diagram of a table of the spatial information according to an embodiment of the disclosure;

FIG. 25 is a flowchart of an operation of outputting the projection image by adjusting the projection ratio in further consideration of a critical ratio according to an embodiment of the disclosure;

FIG. 26 is a diagram of an example in which a distance is decreased between the electronic apparatus and the projection plane according to an embodiment of the disclosure;

FIG. 27 is a diagram of an example in which the distance is increased between the electronic apparatus and the projection plane according to an embodiment of the disclosure;

FIG. 28 is a diagram of an operation of outputting the projection image by the electronic apparatus in case that the distance is changed between the electronic apparatus and the projection plane according to an embodiment of the disclosure;

FIG. 30 is a diagram of an operation of considering a highest critical ratio in an example in which the distance is increased between the electronic apparatus and the projection plane according to an embodiment of the disclosure;

FIG. 31 is a diagram of an operation of considering a lowest critical ratio in an example in which the distance is decreased between the electronic apparatus and the projection plane according to an embodiment of the disclosure;

FIG. 47 is a flowchart of the operation of outputting audio by the electronic apparatus in case that the distance is changed between the electronic apparatus and the projection plane according to an embodiment of the disclosure;

FIG. 49 is a flowchart of the operation of changing brightness of the projection image by the electronic apparatus in case that the distance between the electronic apparatus and the projection plane is changed according to an embodiment of the disclosure;

DETAILED DESCRIPTION

Figure 1:
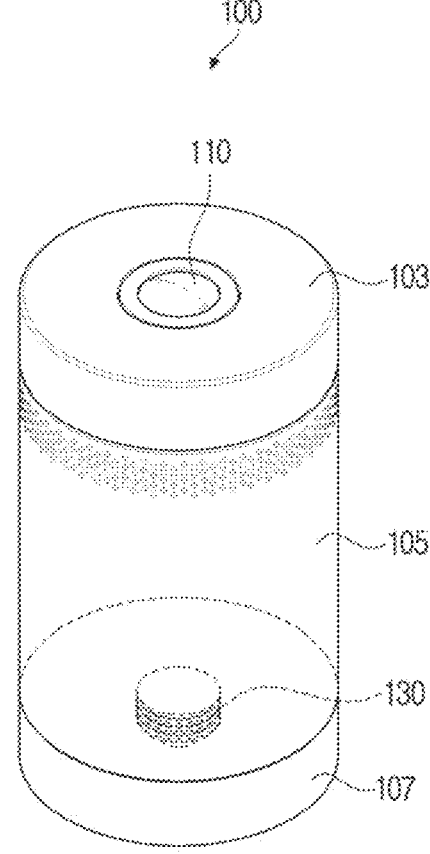
FIG. 1 is a diagram of an exterior of an electronic apparatus according to an embodiment of the disclosure.

Hereinafter, the disclosure is described in detail with reference to the accompanying drawings.

General terms that are currently widely used are selected as terms used in embodiments of the disclosure in consideration of functions in the disclosure, and may be changed based on the intentions of those skilled in the art or a judicial precedent, the emergence of a new technique, or the like. In addition, in a specific case, terms arbitrarily chosen by an applicant may exist. In this case, the meanings of such terms are mentioned in detail in corresponding description portions of the disclosure. Therefore, the terms used in the disclosure need to be defined on the basis of the meanings of the terms and the contents throughout the disclosure rather than simple names of the terms.

In the disclosure, an expression "have," "may have," "include," "may include," or the like, indicates the existence of a corresponding feature (for example, a numerical value, a function, an operation, or a component such as a part), and does not exclude the existence of an additional feature.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Expressions "first," "second," or the like, used in the disclosure may qualify various components regardless of a sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that the any component may be directly coupled to the another component or may be coupled to the another component through still another component (for example, a third component).

A term of a singular number may include its plural number unless explicitly indicated otherwise in the context. It is to be understood that a term "include" or "formed of" used in the disclosure specifies the presence of features, numerals, steps, operations, components, parts or combinations thereof, which is mentioned in the disclosure, and does not preclude the presence or addition of one or more other features, numerals, steps, operations, components, parts or combinations thereof.

In the disclosure, a "module" or a "~er/~or" may perform at least one function or operation, and be implemented by hardware or software, or be implemented by a combination of hardware and software. In addition, a plurality of "modules" or a plurality of "~ers/~ors" may be integrated in at least one module and implemented by at least one processor except for a "module" or a "~er/or" that needs to be implemented in specific hardware.

In the disclosure, such a term as a "user" may refer to a person who uses an electronic apparatus or an apparatus (for example, an artificial intelligence electronic apparatus) which uses an electronic apparatus.

Hereinafter, the embodiments of the disclosure are described in more detail with reference to the accompanying drawings.

FIG. 1 is a diagram of an exterior of an electronic apparatus according to an embodiment of the disclosure.

Referring to FIG. 1, the electronic apparatus 100 may include a head 103, a main body 105, a projection lens 110, a connector 130, or a cover 107.

The electronic apparatus 100 may be devices in various forms. In particular, the electronic apparatus 100 may be a projector device that enlarges and projects an image to a wall or a screen, and the projector device may be a liquid crystal display (LCD) projector or a digital light processing (DLP) type projector that uses a digital micromirror device (DMD).

In addition, the electronic apparatus 100 may be a home or industrial display device, an illumination device used in daily life, or an audio device including an audio module. The electronic apparatus 100 may be implemented as a portable communication device (e.g., smartphone), a computer device, a portable multimedia device, a wearable device, a home appliance device, or the like. The electronic apparatus 100 according to an embodiment of the disclosure is not limited to the above-described device, and may be implemented as an electronic apparatus 100 having two or more functions of the above-described devices. For example, the electronic apparatus 100 may be used as the display device, the illumination device or the audio device while its projector function is turned off and its illumination function or a speaker function is turned on based on a manipulation of the processor, or may be used as an artificial intelligence (AI) speaker including a microphone or a communication device.

The main body 105 is a housing constituting the exterior, and may support or protect components of the electronic apparatus 100 (e.g., components illustrated in FIG. 3) that are arranged inside the main body 105. A shape of the main body 105 may be close to a cylindrical shape as illustrated in FIG. 1. However, the shape of the main body 105 is not limited thereto, and according to various embodiments of the disclosure, the main body 105 may be implemented in various geometrical shapes such as a column having polygonal cross sections, a cone, or a sphere.

The main body 105 may have a size enabling the main body to gripped or moved by a user with his/her one hand, or may be implemented in a micro size enabling the main body to be easily carried by the user or a size enabling the main body to be held on a table or coupled to the illumination device.

A material of the main body 105 may be matt metallic or synthetic resin for the user's fingerprint or dust not to smear the main body. Alternatively, the exterior of the main body 105 may be made of a slick glossy material.

The main body 105 may have a friction area formed in a partial area of the exterior of the main body 105 for the user to grip and move the main body 105. Alternatively, the main body 105 may have a bent gripping part or a support 108a (refer to FIG. 4) positioned in at least a partial area for the user to grip the corresponding part.

The projection lens 110 may be formed on one surface of the main body 105, and project light passed through a lens array to outside the main body 105. The projection lens 110 according to the various embodiments of the disclosure may be an optical lens low-dispersion coated for reducing chromatic aberration. The projection lens 110 may be a convex lens or a condensing lens, and the projection lens 110 according to an embodiment of the disclosure may adjust a focus by adjusting positions of a plurality of sub lenses.

The head 103 may be coupled to one surface of the main body 105 to thus support and protect the projection lens 110. The head 103 may be coupled to the main body 105 to be swiveled within a predetermined angle range based on one surface of the main body 105.

The head 103 may be automatically or manually swiveled by the user or the processor to thus freely adjust a projection angle of the projection lens 110. Alternatively, the head 103 may include a neck that is coupled to the main body 105 and extends from the main body 105, and the head 103 may thus adjust the projection angle of the projection lens 110 by being tilted backward or forward.

The electronic apparatus 100 may project light or the image to a desired position by adjusting a projection angle of the projection lens 110 while adjusting a direction of the head 103 in a state where the position and angle of the main body 105 are fixed. In addition, the head 103 may include a handle that the user may grip after rotating the head in a desired direction.

A plurality of openings may be formed in an outer circumferential surface of the main body 105. Through the plurality of openings, audio output from an audio outputter may be output to outside the main body 105 of the electronic apparatus 100. The audio outputter may include a speaker, and the speaker may be used for general uses such as reproduction of multimedia or reproduction of recording, and output of a voice.

According to an embodiment of the disclosure, the main body 105 may include a radiation fan provided therein, and in case that the radiation fan is operated, air or heat in the main body 105 may be discharged through the plurality of openings. Accordingly, the electronic apparatus 100 may discharge heat occurring due to the driving of the electronic apparatus 100 to the outside, and prevent overheating of the electronic apparatus 100.

The connector 130 may connect the electronic apparatus 100 with an external device to transmit or receive electronic signals, or receive power from the external device. The connector 130 according to an embodiment of the disclosure may be physically connected with the external device. The connector 130 may include an input/output interface to connect its communication with the external device in a wired or wireless manner or receive the power from the external device. For example, the connector 130 may include a high-definition multimedia interface (HDMI) connection terminal, a universal serial bus (USB) connection terminal, a secure digital (SD) card accommodating groove, an audio connection terminal, or a power consent. Alternatively, the connector 130 may include a Bluetooth, wireless-fidelity (Wi-Fi), or wireless charge connection module, connected with the external device in the wireless manner.

In addition, the connector 130 may have a socket structure connected to an external illumination device, and may be connected to a socket accommodating groove of the external illumination device to receive the power. The size and specification of the connector 130 having the socket structure may be implemented in various ways in consideration of an accommodating structure of the external device that may be coupled thereto. For example, a diameter of a joining portion of the connector 130 may be 26 mm according to an international standard E26, and in this case, the electronic apparatus 100 may be coupled to the external illumination device such as a stand in place of a light bulb that is generally used. When being coupled to a conventional socket positioned on a ceiling, the electronic apparatus 100 may vertically perform the projection. Accordingly, the socket-coupled electronic apparatus 100 cannot be rotated, and in this case, the screen cannot be rotated either. Accordingly, the electronic apparatus 100 may project or rotate the screen to the desired position while being socket-coupled to a stand on the ceiling by allowing the head 103 to swivel on one surface of the main body 105 to have an adjusted projection angle for the electronic apparatus 100 to be rotated even when being socket-coupled and receiving power.

The connector 130 may include a coupling sensor, and the coupling sensor may detect whether the connector 130 is coupled to the external device, its coupling state, or its coupling target, and transmit the same to the processor, and the processor may control the driving of the electronic apparatus 100 based on a received detection value.

The cover 107 may be coupled to or separated from the main body 105, and protect the connector 130 for the connector 130 not to be always exposed to the outside. The cover 107 may have a shape continued from the shape of the main body 105 as illustrated in FIG. 1 or a shape corresponding to the shape of the connector 130. The cover 107 may support the electronic apparatus 100, and the electronic apparatus 100 may be used by being coupled to or held on an external holder while being coupled to the cover 107.

In the electronic apparatus 100 according to the various embodiments of the disclosure, a battery may be positioned inside the cover 107. The battery may include, for example, a primary cell that cannot be recharged, a secondary cell that may be recharged, or a fuel cell.

The electronic apparatus 100 may include a camera module, and the camera module may capture a still image or a video. According to an embodiment of the disclosure, the camera module may include at least one lens, an image sensor, an image signal processor, or a flash.

The electronic apparatus 100 may include a protection case for the electronic apparatus 100 to be easily carried while being protected. Alternatively, the electronic apparatus 100 may include a stand that supports or fixes the main body 105, or a bracket that may be coupled to a wall surface or a partition.

In addition, the electronic apparatus 100 may be connected with the various external devices by using its socket structure, and provide various functions. For example, the electronic apparatus 100 may be connected to an external camera device by using the socket structure. The electronic apparatus 100 may provide an image stored in the connected camera device or an image that is currently being captured using a projecting part 111. For an example, the electronic apparatus 100 may be connected to a battery module by using the socket structure to receive power. The electronic apparatus 100 may be connected to the external device by using the socket structure, which is merely an example, and may be connected to the external device by using another interface (e.g., USB).

Figure 2:
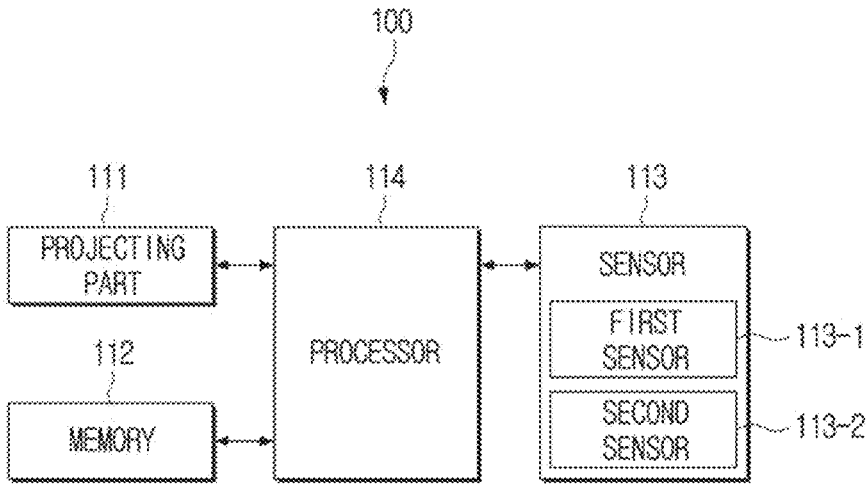
FIG. 2 is a diagram of a configuration of the electronic apparatus according to an embodiment of the disclosure.

FIG. 2 is a diagram of a configuration of the electronic apparatus according to an embodiment of the disclosure.

Referring to FIG. 2, the electronic apparatus 100 may include a projecting part 111, a sensor 113, and a processor 114. The processor 114 may include one or more processors, each of which may be deployed on a single electronic apparatus or multiple electronic apparatus. That is, the processing described herein may be performed by the electronic apparatus, by an external device(s), or both in combination. As described herein, the processor 114 and other described processors may be referred to as at least one processor.

The projecting part 111 (or projection part or projecting unit or projecting device or projecting element) may output the image to be output from the electronic apparatus 100 to a projection plane. The projecting part 111 may described as light outputter. The projecting part 111 may include the projection lens 110.

The projecting part 111 may perform a function of outputting the image to the projection plane. A detailed description of the projecting part 111 is described with reference to FIG. 3. Although described as projecting the image by using the projecting part, the electronic apparatus 100 may project the image in various ways. The projecting part 111 may include the projection lens 110. The projection plane may be a portion of a physical space where the image is output, or may be a separate screen.

The sensor 113 may include at least one of a first sensor 113-1 or a second sensor 113-2. The first sensor 113-1 may be a sensor that obtains sensing data for analyzing state information of the electronic apparatus 100. The second sensor 113-2 may be a sensor that obtains sensing data for analyzing state information of the projection plane 10.

The processor 114 may perform overall control operations of the electronic apparatus 100. The processor 114 may function to control the overall operations of the electronic apparatus 100.

A keystone correction function may be performed in various ways.

In an example, the processor 114 may automatically perform the keystone correction function. The processor 114 may automatically perform the keystone correction function based on the obtained state information. In case that the keystone correction function is automatically performed, the keystone correction function may be described as an auto-keystone function.

In an example, the keystone correction function may be manually performed. The processor 114 may perform the keystone correction function based on a user input or a user manipulation. For example, the user may use the keystone correction function for the projection image to have a rectangle shape by manipulating the electronic apparatus 100 while viewing the image projected on the projection plane.

The keystone correction function may be a function to solve a problem that a trapezoidal image is output on the projection plane due to the tilted electronic apparatus 100. The keystone correction function may be a function of correcting the image for the trapezoidal image output on the projection plane to be output as the rectangular or square image. The keystone correction function may be described as keystone correction. The keystone correction may be divided into horizontal keystone correction or vertical keystone correction based on its direction.

A leveling correction function may be performed in various ways.

In an example, the processor 114 may automatically perform the leveling correction function. The processor 114 may automatically perform the leveling correction function based on the obtained state information. In case that the leveling correction function is automatically performed, the leveling correction function may be described as an auto-leveling function.

In an example, the leveling correction function may be manually performed. The processor 114 may perform the leveling correction function based on the user input or the user manipulation. For example, the user may use the leveling correction function for the projection image to be rotated by manipulating the electronic apparatus 100 while viewing the image projected on the projection plane.

The leveling correction function may be a function of rotating the image. The processor 114 may control the projection image to be output by rotating the image by a specific angle by using the leveling correction function.

In an example, the processor 114 may perform the leveling correction function by using software. The processor 114 may correct the image for the rotated image is output using the leveling correction function. In addition, the processor 114 may control the projecting part 111 to output the rotated image.

In an example, the processor 114 may perform the leveling correction function by using hardware. The processor 114 may rotate the image by rotating the projection lens 110 included in the projecting part 111. In addition, the processor 114 may rotate the image by controlling a fixing member included in the electronic apparatus 100. The fixing member may be a member in contact with a specific surface for the electronic apparatus 100 to be fixed thereto. The processor 114 may control the image to be rotated and output by rotating the fixing member or adjusting its length.

In addition, the processor 114 may obtain a final projection image by performing at least one of the keystone correction function or the leveling correction function, and control the projecting part 111 to output the final projection image to the projection plane.

The electronic apparatus 100 may output the projection image after at least one of the keystone correction function or the leveling correction function is performed, thus providing the projection image suitable for the user.

The processor 114 may provide the projection image in various ways.

In an example, the processor 114 may output a corrected projection image after at least one of the keystone correction function or the leveling correction function is performed thereon.

In an example, the processor 114 may output an original projection image before the keystone correction function or the leveling correction function is performed thereon, and output the corrected projection image after at least one of the keystone correction function or the leveling correction function is performed thereon.

The electronic apparatus 100 may include the sensor 113, and the sensor 113 may include the first sensor 113-1 and the second sensor 113-2.

The state information of the electronic apparatus 100 may include inclination of the electronic apparatus 100 or a rotation angle of the electronic apparatus 100. The state information of the electronic apparatus 100 may include at least one of information about x-axis rotation of the electronic apparatus 100, information about y-axis rotation of the electronic apparatus 100, or information about z-axis rotation of the electronic apparatus 100. A detailed description thereof is described with reference to FIGS. 10 to 13. A description of the information about the x-axis rotation of the electronic apparatus 100 is described with reference to FIG. 12. A description of the information about the y-axis rotation of the electronic apparatus 100 is described with reference to FIG. 11. A description of the information about the z-axis rotation of the electronic apparatus 100 is described with reference to FIG. 10.

The state information of the projection plane 10 may include inclination of the projection plane 10 or the rotation angle of the electronic apparatus 100. The state information of the projection plane 10 may include at least one of information about x-axis rotation of the projection plane 10, information about y-axis rotation of the projection plane 10, or information about z-axis rotation of the projection plane 10.

An x-axis may be described as a first axis, a y-axis as a second axis, and a z-axis as a third axis.

The sensor 113 may include the first sensor 113-1 that detects a distance between the electronic apparatus 100 and the projection plane (e.g., referred to as projection plane 10 described in later figures) and the second sensor 113-2 that detects the inclination of the electronic apparatus 100.

At least one processor 114 may obtain first environment information through the first sensor 113-1 and the second sensor 113-2, control the projecting part 111 to output the projection image to the projection plane 10 based on first setting information corresponding to the first environment information among plurality of setting information stored in a memory 112, obtain second environment information through the first sensor 113-1 and the second sensor 113-2 in case that motion of the electronic apparatus 100 is detected through the second sensor 113-2, and control the projecting part 111 to output (or project) the projection image to the projection plane 10 based on second setting information corresponding to the second environment information in case that the first environment information is changed to the second environment information.

At least one processor 114 may obtain the sensing data through the first sensor 113-1 and the second sensor 113-2. At least one processor 114 may obtain the first environment information based on the sensing data. The first environment information may be various information affecting an operation of outputting the projection image.

The electronic apparatus 100 may store the plurality of setting information, corresponding to environment information, in the memory 112. The setting information may indicate a setting suitable for specific environment information. For example, a projection ratio suitable for a first distance may exist in case that the first distance is the distance between the electronic apparatus 100 and the projection plane 10. The projection ratio may be used as the setting information.

The first sensor 113-1 may be a distance sensor. In addition, the second sensor 113-2 may be an acceleration sensor or a gyro sensor.

The first sensor 113-1 may include at least one sensor for detecting a state of the projection plane 10 and its distance to the projection plane 10. The state of the projection plane 10 may indicate its inclination or rotation angle. That is, the first sensor 113-1 may include the sensor for measuring the inclination of the projection plane 10 or the rotation angle of the projection plane 10. The first sensor 113-1 may include the distance sensor for measuring its distance to the projection plane 10. For example, the first sensor 113-1 may include at least one time of flight (ToF) sensor.

The second sensor 113-2 may include at least one sensor for detecting the state of the electronic apparatus 100. The state of the electronic apparatus 100 may indicate its inclination or rotation angle. That is, the second sensor 113-2 may include the sensor for measuring the inclination of the electronic apparatus 100 or the rotation angle of the electronic apparatus 100. For example, the second sensor 113-2 may include at least one of a gravity sensor, the acceleration sensor, or the gyro sensor.

While outputting the projection image based on the first setting information, at least one processor 114 may obtain the sensing data through the second sensor 113-2. At least one processor 114 may analyze the motion of the electronic apparatus 100 based on the sensing data. When detecting the motion of the electronic apparatus 100, at least one processor 114 may obtain the sensing data through the first sensor 113-1 and the second sensor 113-2.

At least one processor 114 may obtain the second environment information based on the sensing data obtained after the motion of the electronic apparatus 100 is detected. The electronic apparatus 100 is already moved, and the first environment information may thus be different from the second environment information.

At least one processor 114 may identify whether the first environment information is changed to the second environment information. In case that it is identified that the first environment information is changed to the second environment information, at least one processor 114 may identify the second setting information suitable for the second environment information. At least one processor 114 may output the projection image to the projection plane 10 based on the second setting information.

The first environment information or the second environment information may include at least one of information about the inclination of the electronic apparatus 100, information about the distance between the electronic apparatus 100 and the projection plane 10, or information about an object around the electronic apparatus 100, and the first setting information or the second setting information may include at least one of the projection ratio of the image, resolution of the image, brightness of the image, or a volume of the audio.

The first setting information or the second setting information may include at least one of information about the keystone correction function, information about a function of changing an image size, or information about a focusing function. Information about each function may indicate information about whether the function is performed, necessary for performing the function, or the like.

The information about the inclination of the electronic apparatus 100 may indicate a degree of the inclination or rotation of the electronic apparatus 100. The information about the inclination may include at least one of the information about the x-axis rotation of the electronic apparatus, the information about the y-axis rotation of the electronic apparatus, or the information about the z-axis rotation of the electronic apparatus. A detailed description of the information about the inclination of the electronic apparatus 100 is described with reference to FIGS. 9 to 11.

The information about the distance between the electronic apparatus 100 and the projection plane 10 may be obtained based on the sensing data obtained from the first sensor 113-1.

The information about the object may be obtained based on the sensing data obtained from the first sensor 113-1. The object may be described as an obstacle.

A detailed description of the setting information is described with reference to FIG. 20.

At least one processor 114 may output the projection image based on projection information. The projection information may include at least one of the environment information or the setting information.

The environment information may further include reflectivity of the projection plane, a size of the projection plane, a shape of the projection plane, and the information about the inclination of the projection plane. The information about the inclination of the projection plane may include at least one of the information about the x-axis rotation of the projection plane, the information about the y-axis rotation of the projection plane, or the information about the z-axis rotation of the projection plane.

The setting information may further include information such as the lightness or contrast of the image. In addition, the setting information may further include information such as the quality, channel, left and right balance of the audio.

At least one processor 114 may detect the motion of the electronic apparatus 100 in real time. At least one processor 114 may obtain the sensing data from the second sensor 113-2 in real time. In addition, at least one processor 114 may detect the motion of the electronic apparatus 100 based on the sensing data obtained through the second sensor 113-2. At least one processor 114 may further obtain the sensing data from the first sensor 113-1 and the second sensor 113-2 only in case that the electronic apparatus 100 is moved. A detailed description thereof is described with reference to FIG. 22.

In various examples, at least one processor 114 may obtain the sensing data through the first sensor 113-1 and the second sensor 113-2 in real time after detecting the motion of the electronic apparatus 100. At least one processor 114 may obtain the second environment information in real time based on the sensing data.

In various examples, at least one processor 114 may obtain the sensing data through the first sensor 113-1 and the second sensor 113-2 in case of detecting no motion of the electronic apparatus 100 for a predetermined time after detecting the motion of the electronic apparatus 100.

At least one processor 114 may obtain the second environment information through the first sensor 113-1 and the second sensor 113-2 in case of detecting no motion of the electronic apparatus 100 for the predetermined time after detecting the motion of the electronic apparatus 100 through the second sensor 113-2.

At least one processor 114 may control the projecting part 111 to output the projection image having a first projection size to the projection plane 10 based on the first distance and a first projection ratio in case that the first distance between the electronic apparatus 100 and the projection plane 10 is included in the first environment information.

At least one processor 114 may obtain the distance between the electronic apparatus 100 and the projection plane 10 as the first distance based on the sensing data. In case that the distance included in the first environment information is the first distance, at least one processor 114 may obtain information about the first projection ratio corresponding to the first distance.

In various examples, the first projection ratio may be a basic projection ratio.

In various examples, the first projection ratio may be determined based on the first distance and the size of the projection plane 10. At least one processor 114 may obtain the information about an optimal projection ratio for the projection image not to deviate from the projection plane 10. The identified projection ratio may be the first projection ratio.

In various examples, the first projection ratio may be a ratio stored based on the user's existing setting.

At least one processor 114 may output the projection image to the projection plane 10 having the first projection ratio at the first distance. The size of the output projection image may be the first projection size. The first projection size may indicate the size of the projection image actually output to the projection plane 10 based on the first setting information.

The electronic apparatus 100 may be moved while outputting the projection image having the first setting information at the first time point. The existing environment information is highly likely to be changed, and at least one processor 114 may thus need to apply new setting information.

The user may desire the same size as the size of the projection image output at a first time point. The reason is that at the first time point, the user already views a content with an optimal setting.

At least one processor 114 may need to change the setting information based on the environment information changed based on the motion of the electronic apparatus 100.

In various examples, in case that the environment information is changed, at least one processor 114 may change the resolution of the image. Changing the resolution of the image may indicate an operation of changing an original size of the projection image.

At least one processor 114 may control the projecting part 111 to output the projection image having the first projection size to the projection plane 10 based on the first distance, a second distance, and the first projection ratio in case that the second distance between the electronic apparatus 100 and the projection plane 10 is included in the second environment information.

At least one processor 114 may control the projecting part 111 to change the size of the projection image based on a ratio of the first distance to the second distance, and output the changed projection image having the first projection size to the projection plane 10.

A specific operation of changing the size of the projection image is described with reference to FIGS. 23, 26, 27, and 28.

In various examples, in case that the environment information is changed, at least one processor 114 may change the projection ratio. Changing the projection ratio may indicate adjusting a refractive index of the lens included in projecting part 111 while maintaining the original size of the image. At least one processor 114 may change the projection ratio by using an optical characteristic.

At least one processor 114 may control the projecting part 111 to output the projection image having the first projection size to the projection plane 10 based on the second distance and a second projection ratio in case that the second distance between the electronic apparatus 100 and the projection plane 10 is included in the second environment information.

At least one processor 114 may obtain information about the second projection ratio based on the second distance and the first projection size.

A specific operation of changing the projection ratio is described with reference to FIGS. 24, 26, 27, and 28.

The electronic apparatus 100 may have a critical projection ratio based on a characteristic of the lens included in the projecting part 111. For example, the electronic apparatus 100 may have the projection ratio changed between a first critical ratio and a second critical ratio.

A specific operation related to the critical ratio is described with reference to FIGS. 25, 29, 30, and 31.

At least one processor 114 may control the projecting part 111 to output the projection image to the projection plane 10 based on a first brightness corresponding to the first distance in case that the first distance between the electronic apparatus 100 and the projection plane 10 is included in the first environment information, and control the projecting part 111 to output the projection image to the projection plane 10 based on second brightness corresponding to the second distance in case that the second distance between the electronic apparatus 100 and the projection plane 10 is included in the second environment information.

An example in which the brightness is changed based on the distance is described with reference to FIGS. 48 and 49. An example in which the setting information of the audio is changed based on the distance is described with reference to FIGS. 46 and 47.

At least one processor 114 may perform control for the projection image such that the at least one processor 114 may provide a user interface (UI) (e.g., the projection image may include a user interface) for guiding/for indicating whether the second setting information corresponding to the second environment information is applied in case that the first environment information is changed to the second environment information. At least one processor 114 may generate a second projection image by including the UI in a first projection image. In addition, at least one processor 114 may output the second projection image including the UI.

A specific operation of the UI for guiding the user input is described with reference to FIGS. 42 to 45.

The electronic apparatus 100 may detect that a factor affecting the output of the projection image is changed. The electronic apparatus 100 may then change the setting information to provide the user with an existing projection quality based on the changed factor. The electronic apparatus 100 may automatically change the setting information, and accordingly, the user may not have to perform separate manual manipulation. The electronic apparatus 100 may provide the user with the projection image having the same quality or size even though the information about the inclination is changed or whether the object exists is changed based on the motion of the electronic apparatus 100.

Figure 3:
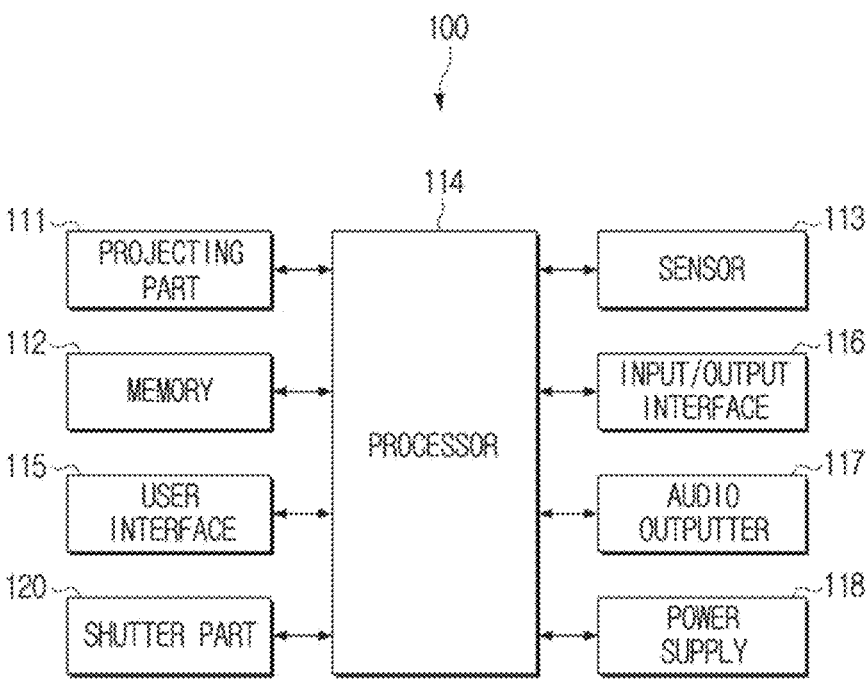
FIG. 3 is a block diagram of the configuration of the electronic apparatus of FIG. 2 according to an embodiment of the disclosure.

FIG. 3 is a block diagram of the configuration of the electronic apparatus of FIG. 2 according to an embodiment of the disclosure.

Referring to FIG. 3, the electronic apparatus 100 may include the projecting part 111, the memory 112, the sensor 113, the processor 114, a user interface 115, an input/output interface 116, an audio outputter 117, a power supply 118, and a shutter 120. The configuration illustrated in FIG. 3 is only an example, from which some configurations may be omitted, and to which a new configuration may be added.

Description duplicative of that described with reference to FIG. 2 are omitted.

The projecting part 111 may be a component that projects the image to the outside. The projecting part 111 according to an embodiment of the disclosure may be implemented in various projection types (e.g., cathode-ray tube (CRT) type, LCD type, DLP type, or laser type). As an example, the CRT type has basically the same principle as the principle of a CRT monitor. The CRT type may display the image on the screen by enlarging the image by using a lens in front of a CRT. The CRT type may be divided into a one-tube type and a three-tube type based on the number of cathode-ray tubes, and in the three-tube type, the cathode-ray tubes of red, green, and blue are separated from one another.

For an example, the LCD type may display the image by allowing light emitted from a light source to pass through a liquid crystal. The LCD type may be divided into a single-panel type and a three-panel type. When the three-plate type, the light emitted from the light source may be separated into red, green and blue in a dichroic mirror (which is a mirror that reflects only light of a specific color and allows the rest to pass therethrough), may then pass through the liquid crystal, and may then be collected into one place again.

For still an example, the DLP type may display the image by using a digital micromirror device (DMD) chip. The DLP type projecting part may include a light source, a color wheel, the DMD chip, a projection lens, etc. Light emitted from the light source may be colored as passing through a rotating color wheel. Light passed through the color wheel may be input into the DMD chip. The DMD chip may include numerous micromirrors and reflect light input to the DMD chip. The projection lens may expend light reflected from the DMD chip to the image size.

For yet an example, the laser type may include a diode pumped solid state (DPSS) laser and a galvanometer. The laser type that outputs various colors may use a laser in which three DPSS lasers are respectively installed for red, green, and blue (RGB) colors, and their optical axes overlap each other by using a special mirror. The galvanometer may include a mirror and a high-power motor, and move the mirror at a high speed. For example, the galvanometer may rotate the mirror at up to 40 KHz/sec. The galvanometer may be mounted in a scanning direction, and in general, a projector device performs planar scanning, and the galvanometer may thus also be disposed by being divided into x and y axes.

The projecting part 111 may include light sources of various types. For example, the projecting part 111 may include at least one light source of a lamp, a light emitting diode (LED), and a laser.

The projecting part 111 may output the image in a screen ratio of 4:3, a screen ratio of 5:4, and a wide screen ratio of 16:9, based on a purpose of the electronic apparatus 100, the user's setting or the like, and may output the image having various resolutions such as wide video graphics array WVGA (854*480 pixels), super video graphics array SVGA (800*600 pixels), extended graphics array XGA (1024*768 pixels), wide extended graphics array WXGA (1280*720 pixels), WXGA (1280*800 pixels), super extended graphics array SXGA (1280*1024 pixels), ultra extended graphics array UXGA (1600*1200 pixels) and full high-definition HD (1920*1080 pixels), based on the screen ratio.

The projecting part 111 may perform various functions for adjusting the output image under the control of the processor 114. For example, the projecting part 111 may perform a zoom function, the keystone function, a quick corner (or four corner) keystone function and a lens shift function, or the like.

The projecting part 111 may enlarge or reduce the image based its distance (i.e., projection distance) to the screen. That is, the projecting part 111 may perform the zoom function based on its distance to the screen. The zoom function may include a hardware method of adjusting a screen size by moving a lens, and a software method of adjusting the screen size by cropping the image, or the like. In case that the zoom function is performed, it is necessary to adjust a focus of the image. For example, a method of adjusting the focus may include a manual focusing method, an electric focusing method, etc. The manual focusing method may indicate a method of manually adjusting the focus, and the electric focusing method may indicate a method in which the projector automatically adjusts the focus by using a motor built therein when performing the zoom function. When performing the zoom function, the projecting part 111 may provide a digital zoom function through software, and may provide an optical zoom function in which the zoom function is performed by moving the lens by using a driving part.

In addition, the projecting part 111 may perform the keystone correction function. When a height does not match a front projection, the screen may be distorted up or down. The keystone correction function may be a function of correcting a distorted screen. For example, in case that the distortion occurs on the screen in a horizontal direction, the distortion may be corrected using a horizontal keystone, and in case that the distortion occurs on the screen in a vertical direction, the distortion may be corrected using a vertical keystone. The quick corner (or four corner) keystone correction function may be a function of correcting the distortion in case that a balance between corner areas of the screen is not appropriate while a central area of the screen is normal. The lens shift function may be a function of moving the screen as it is in case that the screen is outside a screen area.

The projecting part 111 may provide the zoom/keystone/focusing functions by automatically analyzing a surrounding environment and a projection environment without the user input. The projecting part 111 may automatically provide the zoom/keystone/focusing functions, based on the distance between an electronic apparatus 100 and the screen, information about a space where the electronic apparatus 100 is currently positioned, information about an amount of ambient light, or the like, detected by the sensor (e.g., depth camera, distance sensor, infrared sensor, or illumination sensor).

In addition, the projecting part 111 may provide an illumination function by using the light source. In particular, the projecting part 111 may provide the illumination function by outputting the light source by using the LED. In an example, the projecting part 111 may include one LED, and in an example, the electronic apparatus may include the plurality of LEDs. The projecting part 111 may output the light source by using a surface-emitting LED in an implementation example. The surface-emitting LED may be an LED in which an optical sheet is disposed on an upper side of the LED for the light source to be evenly dispersed and output. When being output through the LED, the light source may be evenly dispersed through the optical sheet, and the light source dispersed through the optical sheet may be introduced into a display panel.

The projecting part 111 may provide the user with a dimming function for adjusting intensity of the light source. The projecting part 111 may control the LED to output the intensity of the light source that corresponds to a received user input when receiving the user input for adjusting the intensity of the light source from the user through the user interface 115 (e.g., touch display button or dial).

In addition, the projecting part 111 may provide the dimming function, based on the content analyzed by the processor 114 without the user input. The projecting part 111 may control the LED to output the intensity of the light source, based on information (e.g., content type or content brightness) on the currently-provided content.

The projecting part 111 may control a color temperature by the control of the processor 114. The processor 114 may control a color temperature based on the content. In case that it is identified that the content is to be output, the processor 114 may obtain color information for each frame of the content whose output is determined. The processor 114 may then control the color temperature based on the obtained color information for each frame. The processor 114 may obtain at least one main color of the frame based on the color information for each frame. The processor 114 may then adjust the color temperature based on the obtained at least one main color. For example, the color temperature that the processor 114 may adjust may be divided into a warm type or a cold type. The frame to be output (hereinafter, output frame) may include a fire scene. The processor 114 may identify (or obtain) that the main color is red based on the color information included in the current output frame. The processor 114 may then identify the color temperature corresponding to the identified main color (red). The color temperature corresponding to the red color may be the warm type. The processor 114 may use an artificial intelligence model to obtain the color information or main color of the frame. In an example, the artificial intelligence model may be stored in the electronic apparatus 100 (e.g., memory 112). In an example, the artificial intelligence model may be stored in an external server which may communicate with the electronic apparatus 100.

The electronic apparatus 100 may be interlocked with the external device to control the illumination function. The electronic apparatus 100 may receive illumination information from the external device. The illumination information may include at least one of brightness information or color temperature information, set by the external device. The external device may be a device connected to the same network as the electronic apparatus 100 (e.g., internet of things (IoT) device included in the same home/work network) or a device not connected to the same network as the electronic apparatus 100 but capable of communicating with the electronic apparatus (e.g., remote control server). For example, an external illumination device (e.g., IoT device) included in the same network as the electronic apparatus 100 may output red light having brightness of 50. The external lighting device (e.g., IoT device) may directly or indirectly transmit the illumination information (e.g., information indicating that the red light is being output with the brightness of 50) to the electronic apparatus 100. The electronic apparatus 100 may control the output of the light source based on the illumination information received from the external illumination device. For example, in case that the illumination information received from the external illumination device includes the information indicating that the red light is output with the brightness of 50, the electronic apparatus 100 may output the red light having the brightness of 50.

The electronic apparatus 100 may control the illumination function based on biometric information. The processor 114 may obtain the user's biometric information. The biometric information may include at least one of the body temperature, heart rate, blood pressure, breath or electrocardiogram of the user. The biometric information may include various information other than the aforementioned information. For example, the electronic apparatus may include a sensor for measuring the biometric information. The processor 114 may obtain the biometric information of the user through the sensor, and control the output of the light source based on the obtained biometric information. For an example, the processor 114 may receive the biometric information from the external device through the input/output interface 116. The external device may be the portable communication device (e.g., smart phone or wearable device) of the user. The processor 114 may obtain the biometric information of the user from the external device, and control the output of the light source based on the obtained biometric information. In an example, the electronic apparatus may identify whether the user is sleeping and the processor 114 may control the output of the light source based on the user's biometric information in case that it is identified that the user is sleeping (or preparing to sleep).

The memory 112 may store at least one instruction on the electronic apparatus 100. In addition, the memory 112 may store an operating system (O/S) for driving the electronic apparatus 100. The memory 112 may also store various software programs or applications for operating the electronic apparatus 100 in various examples of the disclosure. Further, the memory 112 may include a semiconductor memory such as a flash memory, or a magnetic storing medium such as a hard disk.

The memory 112 may store various software modules for operating the electronic apparatus 100 in the various examples of the disclosure, and the processor 114 may control the operation of the electronic apparatus 100 by executing the various software modules stored in the memory 112. That is, the memory 112 may be accessed by the processor 114, and the processor 114 may perform readout, recording, correction, deletion, update and the like of data in the memory 112.

In the disclosure, the term "memory 112" may include the memory 112, a read only memory (ROM) or a random access memory (RAM) in the processor 114, or a memory card (for example, a micro secure digital (SD) card or a memory stick) mounted in the electronic apparatus 100.

The sensor 113 may include at least one sensor. The sensor 113 may include at least one of an inclination sensor for detecting the inclination of the electronic apparatus 100 or an image sensor for capturing the image. The inclination sensor may be the acceleration sensor or the gyro sensor, and the image sensor may be the camera module or the depth camera. The inclination sensor may be described as a motion sensor. In addition, the sensor 113 may include various sensors other than the inclination sensor or the image sensor. For example, the sensor 113 may include the illumination sensor and the distance sensor. The sensor 113 may also include a lidar sensor.

The user interface 115 may include various types of input devices. For example, the user interface 115 may include a physical button. The physical button may include a function key, a direction key (e.g., a four-direction key), or a dial button. In an example, the physical button may be implemented as a plurality of keys. In an example, the physical button may be implemented as one key. In case that the physical button is implemented as one key, the electronic apparatus 100 may receive the user input in which the one key is pressed for a critical time or longer. When receiving the user input in which one key is pressed for the critical time or longer, the processor 114 may perform a function corresponding to the user input. For example, the processor 114 may provide the illumination function based on the user input.

In addition, the user interface 115 may receive the user input by using a non-contact method. In the case of receiving the user input by using a contact method, a physical force may be required to be transmitted to the electronic apparatus. There may thus be a need for a method of controlling the electronic apparatus regardless of the physical force. The user interface 115 may receive a user gesture and may perform an operation corresponding to the received user gesture. The user interface 115 may receive the user gesture through the sensor (e.g., image sensor or infrared sensor).

In addition, the user interface 115 may receive the user input by using a touch method. For example, the user interface 115 may receive the user input through a touch sensor. In an example, the touch method may be implemented as the non-contact method. For example, the touch sensor may determine whether a user body approaches within a critical distance. The touch sensor may identify the user input even in case that the user does not touch the touch sensor. In an example, the touch sensor may identify the user input in which the user touches the touch sensor.

The electronic apparatus 100 may receive the user input in various ways other than the user interface described above. In an example, the electronic apparatus 100 may receive the user input from an external remote control device. The external remote control device may be a remote control device corresponding to the electronic apparatus 100 (e.g., control device dedicated to the electronic apparatus) or the portable communication device (e.g., smartphone or wearable device) of the user. The portable communication device of the user may store an application for controlling the electronic apparatus. The portable communication device may obtain the user input from the application stored therein, and transmit the obtained user input to the electronic apparatus 100. The electronic apparatus 100 may receive the user input from the portable communication device, and perform an operation corresponding to the user's control command.

The electronic apparatus 100 may receive the user input by using voice recognition. In an example, the electronic apparatus 100 may receive a user voice through the microphone included in the electronic apparatus. In an example, the electronic apparatus 100 may receive the user voice from the microphone or the external device. The external device may obtain the user voice through the microphone of the external device, and transmit the obtained user voice to the electronic apparatus 100. The user voice transmitted from the external device may be audio data or digital data converted from the audio data (e.g., audio data converted to a frequency domain). The electronic apparatus 100 may perform an operation corresponding to the received user voice. The electronic apparatus 100 may receive the audio data corresponding to the user voice through the microphone. The electronic apparatus 100 may then convert the received audio data to the digital data. The electronic apparatus 100 may then convert the converted digital data to text data by using a speech-to-text (STT) function. In an example, the speech-to-text (STT) function may be directly performed by the electronic apparatus 100, and in an example, the speech-to-text (STT) function may be performed by the external server.

The electronic apparatus 100 may transmit the digital data to the external server. The external server may convert the digital data to the text data, and obtain control command data based on the converted text data. The external server may transmit the control command data (which may here also include the text data) to the electronic apparatus 100. The electronic apparatus 100 may perform an operation corresponding to the user voice based on the obtained control command data.

The electronic apparatus 100 may provide a voice recognition function by using one assistance (or an artificial intelligence agent such as Bixby™), which is only an example, and the electronic apparatus 100 may provide the voice recognition function by using a plurality of assistances. The electronic apparatus 100 may provide the voice recognition function by selecting one of the plurality of assistances based on a trigger word corresponding to the assistance or a specific key included in a remote controller.

The electronic apparatus 100 may receive the user input by using a screen interaction. The screen interaction may indicate a function in which the electronic apparatus identifies whether a predetermined event is generated through the image projected to the screen (or projection plane), and obtains the user input based on the predetermined event. The predetermined event may be an event in which a predetermined object is identified at a specific position (e.g., position to which the UI for receiving the user input is projected). The predetermined object may include at least one of a user body part (e.g., finger), a pointer, or a laser point. The electronic apparatus 100 may identify that the electronic apparatus 100 receives the user input for selecting the projected UI in case that it is identified that the predetermined object exists at the position corresponding to the projected UI. For example, the electronic apparatus 100 may project a guide image displaying the UI on the screen. The electronic apparatus 100 may then identify whether the user selects the projected UI. The electronic apparatus 100 may identify that the user selects the projected UI in case that the predetermined event is identified at the position of the projected UI. The projected UI may include at least one item. The electronic apparatus 100 may perform spatial analysis to identify whether the predetermined event exists at the position of the projected UI. The electronic apparatus 100 may perform the spatial analysis through the sensor (e.g., image sensor, infrared sensor, depth camera, or distance sensor). The electronic apparatus 100 may identify whether the predetermined event is generated at the specific position (i.e., position to which the UI is projected) by performing the spatial analysis. In addition, in case that it is identified that the predetermined event is generated at the specific position (i.e., position to which the UI is projected), the electronic apparatus 100 may identify that the electronic apparatus 100 receives the user input for selecting the UI corresponding to the specific position.

The input/output interface 116 is a component for inputting or outputting at least one of an audio signal or an image signal. The input/output interface 116 may receive at least one of the audio signal or the image signal from the external device, and output the control command to the external device.

The input/output interface 116 according to an embodiment of the disclosure may be implemented as a wired input/output interface of at least one of a HDMI, a mobile high-definition link (MHL), a USB, a USB C-type, a display port (DP), a thunderbolt, a video graphics array (VGA) port, a RGB port, a D-subminiature (D-SUB) and a digital visual interface (DVI). In an example, the wired input/output interface may be implemented as an interface inputting or outputting only the audio signal and an interface inputting or outputting only the image signal, or implemented as one interface inputting or outputting both the audio signal and the image signal.

In addition, the electronic apparatus 100 may receive the data through the wired input/output interface, which is only an example, and the electronic apparatus 100 may receive power through the wired input/output interface. For example, the electronic apparatus 100 may receive power from an external battery through the USB C-type, or receive power from an outlet through a power adapter. For an example, the electronic apparatus may receive power from the external device (e.g., laptop computer or monitor) through the display port (DP).

The input/output interface 116 according to an embodiment of the disclosure may be implemented as the wireless input/output interface that performs the communication by using at least one of communication methods such as wireless-fidelity (Wi-Fi), Wi-Fi direct, Bluetooth, ZigBee, third generation (3G), 3rd generation partnership project (3GPP), or long term evolution (LTE). In an example, the wireless input/output interface may be implemented as the interface inputting or outputting only the audio signal and the interface inputting or outputting only the image signal, or implemented as one interface inputting or outputting both the audio signal and the image signal.

In addition, the audio signal may be input through the wired input/output interface, and the image signal may be input through a wireless input/output interface. Alternatively, the audio signal may be input through the wireless input/output interface, and the image signal may be input through the wired input/output interface.

The audio outputter 117 is a component that outputs the audio signal. In particular, the audio outputter 117 may include an audio output mixer, an audio signal processor, and an audio output module. The audio output mixer may mix the plurality of audio signals to be output as at least one audio signal. For example, the audio output mixer may mix an analog audio signal and another analog audio signal (e.g., analog audio signal received from the outside) as at least one analog audio signal. The audio output module may include the speaker or an output terminal. According to an embodiment, the audio output module may include the plurality of speakers. In this case, the audio output module may be disposed in the main body, and audio emitted while covering at least a portion of a diaphragm of the audio output module may pass through a waveguide to be transmitted to the outside the main body. The audio output module may include a plurality of audio output units, and the plurality of audio output units may be symmetrically arranged on the exterior of the main body, and accordingly, the audio may be emitted to all directions, i.e. all directions in 360 degrees.

The power supply 118 may receive power from the outside and supply power to the various components of the electronic apparatus 100. The power supply 118 according to an embodiment of the disclosure may receive power in various ways. In an example, the power supply 118 may receive power by using the connector 130 as illustrated in FIG. 1. In addition, the electronic apparatus may receive power by using a direct current (DC) power cord of 220V. However, the disclosure is not limited thereto, and the power supply 118 may receive power by using a USB power cord, or may receive power by using a wireless charging method.

In addition, the power supply 118 may receive power by using an internal battery or the external battery. The power supply 118 according to an embodiment of the disclosure may receive power through the internal battery. For example, the power supply 118 may charge power of the internal battery by using at least one of the DC power cord of 220V, the USB power cord, or a USB C-Type power cord, and may receive power through the charged internal battery. In addition, the power supply 118 according to an embodiment of the disclosure may receive power through the external battery. For example, the power supply 118 may receive power through the external battery in case that the electronic apparatus and the external battery is connected through various wired communication methods such as the USB power code, the USB C-type power code, or a socket groove. That is, the power supply 118 may directly receive power from the external battery, or charge the internal battery through the external battery and receive power from the charged internal battery.

The power supply 118 according to the disclosure may receive power by using at least one of the aforementioned plurality of power supply methods.

With respect to power consumption, the electronic apparatus 100 may have the power consumption of a predetermined value (e.g., 43 W) or less due to a socket type, another standard, etc. The electronic apparatus 100 may change power consumption to reduce the power consumption when using the battery. That is, the electronic apparatus 100 may change the power consumption based on the power supply method, power usage amount, or the like.

The electronic apparatus 100 according to an embodiment of the disclosure may provide various smart functions.

The electronic apparatus 100 may be connected to a portable terminal device controlling the electronic apparatus 100, and the screen output from the electronic apparatus 100 may be controlled by the user input which is input from the portable terminal device. For example, the portable terminal device may be implemented as a smartphone including a touch display, the electronic apparatus 100 may receive screen data provided by the portable terminal device from the portable terminal device and output the data, and the screen output by the electronic apparatus 100 may be controlled based on the user input that is input from the portable terminal device.

The electronic apparatus 100 may be connected to the portable terminal device by using various communication methods such as miracast, airplay, wireless dalvik executable (DEX) and a remote personal computer (PC) method, and may share a content or music, provided by the portable terminal device.

In addition, the portable terminal device and the electronic apparatus 100 may be connected to each other by various connection methods. In an example, the portable terminal device may search for the electronic apparatus 100 and perform wireless connection therebetween, or the electronic apparatus 100 may search for the portable terminal device and perform the wireless connection therebetween. The electronic apparatus 100 may then output the content provided from the portable terminal device.

In an example, the electronic apparatus 100 may output the content or music being output from the portable terminal device in case that the portable terminal device is positioned around the electronic apparatus and the predetermined gesture (e.g., motion tap view) is then detected through the display of the portable terminal device, while the specific content or music is being output from the portable terminal device.

In an example, the electronic apparatus 100 may output the content or music being output from the portable terminal device in case that it is detected that the portable terminal device is positioned around the electronic apparatus 100 by a predetermined distance or less (e.g., non-contact tap view), or the portable terminal device touches the electronic apparatus 100 twice at short intervals (e.g., contact tap view) in the state where the specific content or music is being output from the portable terminal device.

In the above example, the screen provided by the portable terminal device is the same as the screen provided by the electronic apparatus 100. However, the disclosure is not limited thereto. That is, in case that the portable terminal device and the electronic apparatus 100 are connected to each other, the portable terminal device may output a first screen provided by the portable terminal device, and the electronic apparatus 100 may output a second screen provided by the portable terminal device, which is different from the first screen. For example, the first screen may be a screen provided by a first application installed in the portable terminal device, and the second screen may be a screen provided by a second application installed in the portable terminal device. For example, the first screen and the second screen may be the screens different from each other that are provided by one application installed in the portable terminal device. In addition, for example, the first screen may be a screen including the UI in a remote controller form for controlling the second screen.

The electronic apparatus 100 according to the disclosure may output a standby screen. For example, the electronic apparatus 100 may output the standby screen in case that the electronic apparatus 100 and the external device are not connected to each other or in case that there is no input received from the external device for the predetermined time. A condition for the electronic apparatus 100 to output the standby screen is not limited to the above-described example, and the standby screen may be output based on various conditions.

The electronic apparatus 100 may output the standby screen in the form of a blue screen, and the disclosure is not limited thereto. For example, the electronic apparatus 100 may obtain an atypical object by extracting only the shape of a specific object from the data received from the external device, and output the standby screen including the obtained atypical object.

The shutter 120 may include at least one of a shutter, a fixing member, a rail, a body, or a motor.

The shutter may block light output from the projecting part 111. The fixing member may fix position of the shutter. The rail may be a path to move the shutter or the fixing member. The body may be a component including the shutter and the fixing member. The motor may be a component that generates driving power for movement of a component (e.g., movement of the body) or rotation of a component (e.g., rotation of the shutter), included in the shutter 120.

Figure 4:
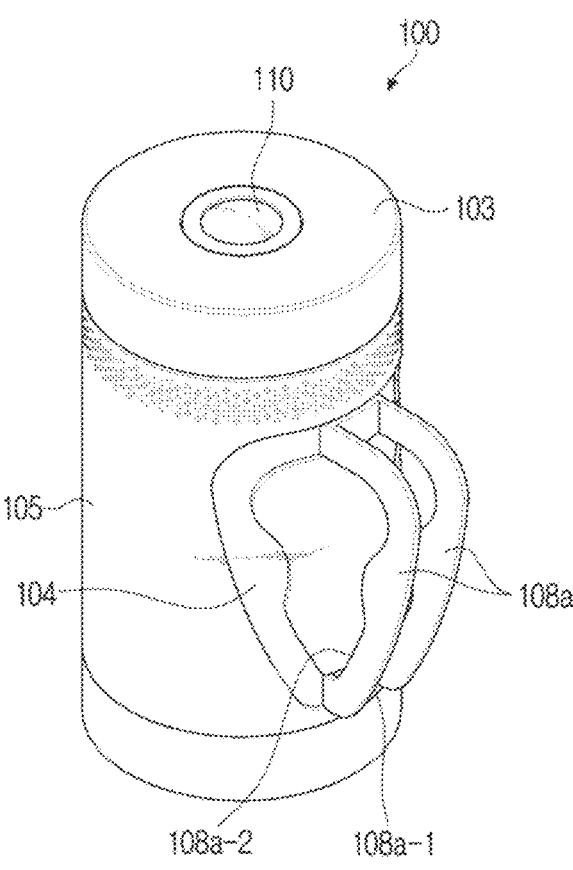
FIG. 4 is a diagram of the exterior of the electronic apparatus according to an embodiment of the disclosure.

FIG. 4 is a diagram of the exterior of the electronic apparatus according to an embodiment of the disclosure.

Referring to FIG. 4, the electronic apparatus 100 may include a support (or a "handle") 108a.

The support 108a in various examples may be the handle or a ring that is provided for the user to grip or move the electronic apparatus 100. Alternatively, the support 108a may be a stand that supports the main body 105 while the main body 105 is laid sideways.

As illustrated in FIG. 4, the support 108a may have a hinge structure for the support to be coupled to or separated from an outer circumferential surface of the main body 105, and may be selectively separated from or fixed to the outer circumferential surface of the main body 105 based on the user's need. The number, shape, or disposition structure of the support 108a may be implemented in various ways without restriction. The support 108a may be built in the main body 105, and taken out and used by the user based on the user need. Alternatively, the support 108a may be implemented as a separate accessory, and attached to or detached from the electronic apparatus 100.

The support 108a may include a first support surface 108a-1 and a second support surface 108a-2. The first support surface 108a-1 may be a surface that faces the outside of the main body 105 while the support 108a is separated from the outer circumferential surface of the main body 105, and the second support surface 108a-2 may be a surface that faces the inside of the main body 105 while the support 108a is separated from the outer circumferential surface of the main body 105.

The first support surface 108a-1 may be developed from the lower portion to upper portion of the main body 105 to be farther away from the main body 105, and the first support surface 108a-1 may have a flat or uniformly curved shape. The first support surface 108a-1 may support the main body 105 in case the electronic apparatus 100 is held in such a manner that the outer side surface of the main body 105 is in contact with the bottom, i.e., in case that the electronic apparatus 100 is disposed in such a manner that the projection lens 110 is toward the front. In an example in which the electronic apparatus 100 includes two or more supports 108a, the head 103 and the projection angle of the projection lens 110 may be adjusted by adjusting the interval or hinge opening angle of the two supports 108a.

The second support surface 108a-2 may be a surface touched by the user or an external holding structure in case that the support 108a is supported by the user or the external holding structure, and may have a shape corresponding to a gripping structure of the user's hand or the external holding structure for the electronic apparatus 100 not to slip in case that the electronic apparatus 100 is supported or moved. The user may move the electronic apparatus 100 by making the projection lens 110 face toward the front, fixing the head 103 and holding the support 108a, and use the electronic apparatus 100 like a flashlight.

The support groove 104 may be a groove structure which is provided in the main body 105 and accommodates the support 108a in case that the support 108a is not used, and as illustrated in FIG. 4, the support groove 104 may be implemented as a groove structure corresponding to the shape of the support 108*a* in the outer circumferential surface of the main body 105. By using the support groove 104, the support 108*a* may be stored on the outer circumferential surface of the main body 105 in case that the support 108*a* is not used, and the outer circumferential surface of the main body 105 may be maintained to be slick.

Alternatively, the support 108*a* may be stored inside the main body 105, and may be taken out to the outside of the main body 105 in case that the support 108*a* is needed. In this case, the support groove 104 may be led into the inside of the main body 105 to accommodate the support 108*a*, and the second support surface 108*a*-2 may have a door that adheres to the outer circumferential surface of the main body 105 or opens or closes the separate support groove 104.

The electronic apparatus 100 may include various kinds of accessories that are helpful in using or storing the electronic apparatus 100. For example, the electronic apparatus 100 may include a protection case for the electronic apparatus 100 to be easily carried while being protected. Alternatively, the electronic apparatus 100 may include a tripod that supports or fixes the main body 105, or a bracket that may be coupled to the outer surface of the electronic apparatus and fix the electronic apparatus 100.

Figure 5:
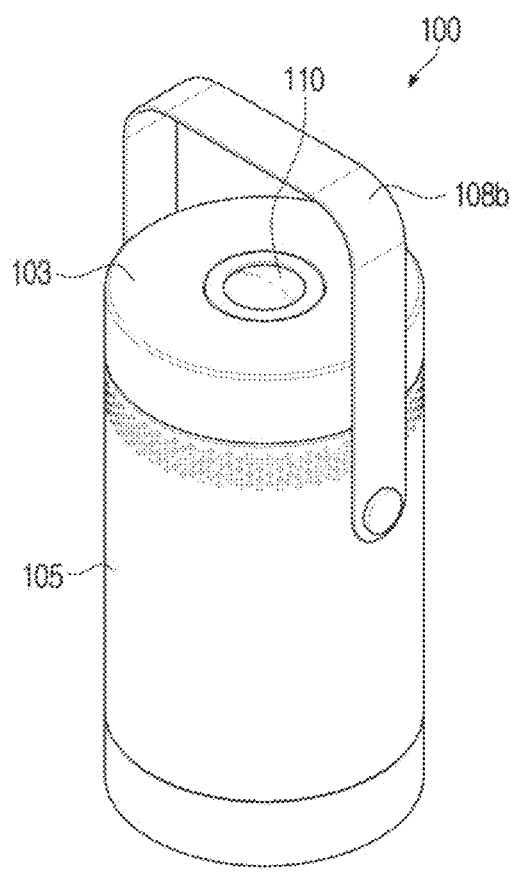
FIG. 5 is a diagram of the exterior of the electronic apparatus according to an embodiment of the disclosure.

FIG. 5 is a diagram of the exterior of the electronic apparatus according to an embodiment of the disclosure.

Referring to FIG. 5, the electronic apparatus 100 may include a support (or a "handle") 108*b*.

The support 108*b* in various examples may be the handle or the ring that is provided for the user to grip or move the electronic apparatus 100. Alternatively, the support 108*b* may be the stand that supports the main body 105 to be oriented at any angle while the main body 105 is laid sideways.

As illustrated in FIG. 5, the support 108*b* may be connected with the main body 105 at a predetermined point (e.g., ⅔-¾ point of a height of the main body) of the main body 105. In case that the support 108 is rotated toward the main body, the support 108*b* may support the main body 105 for the main body 105 to be oriented at any angle while the main body 105 is laid sideways.

Figure 6:
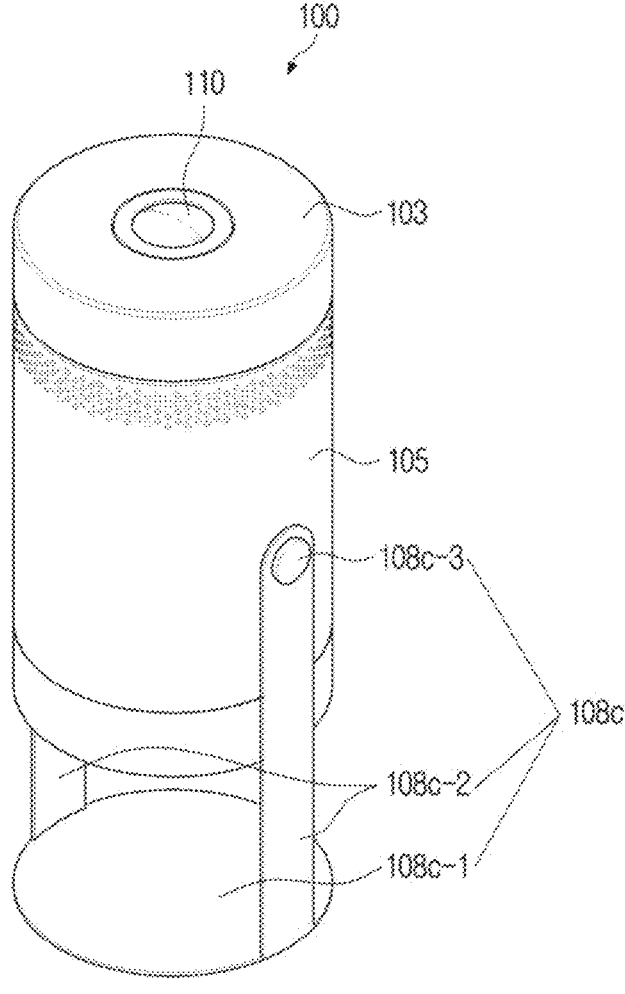
FIG. 6 is a diagram of the exterior of the electronic apparatus according to an embodiment of the disclosure.

FIG. 6 is a diagram of the exterior of the electronic apparatus according to an embodiment of the disclosure.

Referring to FIG. 6, the electronic apparatus 100 may include a support (or a "handle") 108*c*. The support 108*c* in various examples may include a base plate 108*c*-1 supporting the electronic apparatus 100 on the ground and two support members 108*c*-2 connecting the base plate 108*c*-1 with the main body 105.

In an example of the disclosure, the two support members 108*c*-2 may have the same height, and one cross section of each of the two support members 108*c*-2 may be coupled to or separated from each other by a groove and a hinge member 108*c*-3 provided on one outer circumferential surface of the main body 105.

The two support members may be hinge-coupled to the main body 105 at a predetermined point (e.g., ⅓ to ¾ point of the height of the main body) of the main body 105.

In case that the two support members and the main body are coupled with each other by the hinge member 108*c*-3, the main body 105 may be rotated based on a virtual horizontal axis formed by the two hinge members 108*c*-3, thus adjusting the projection angle of the projection lens 110.

Figure 7:
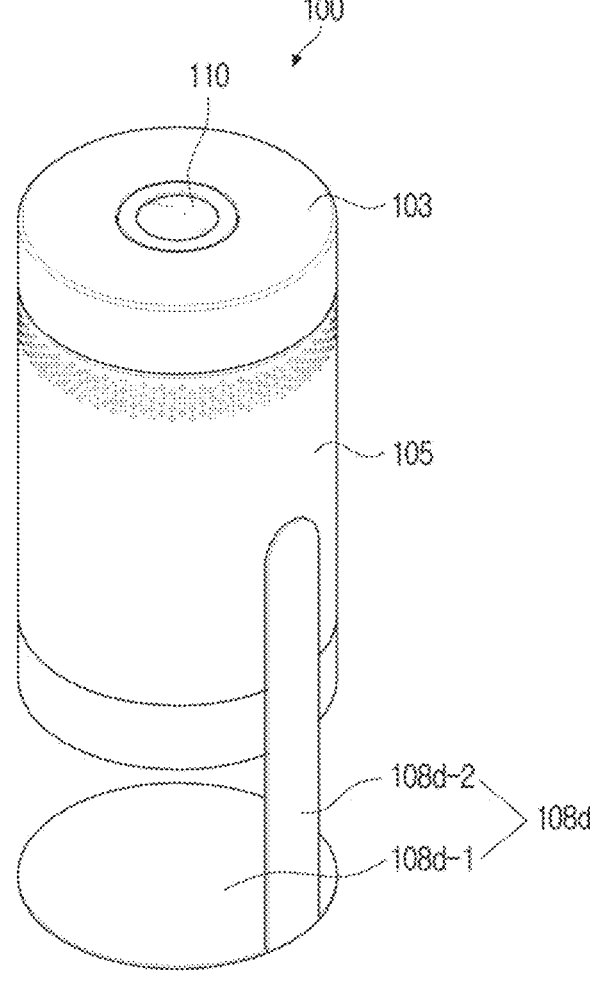
FIG. 7 is a diagram of the exterior of the electronic apparatus according to an embodiment of the disclosure.
Figure 8:
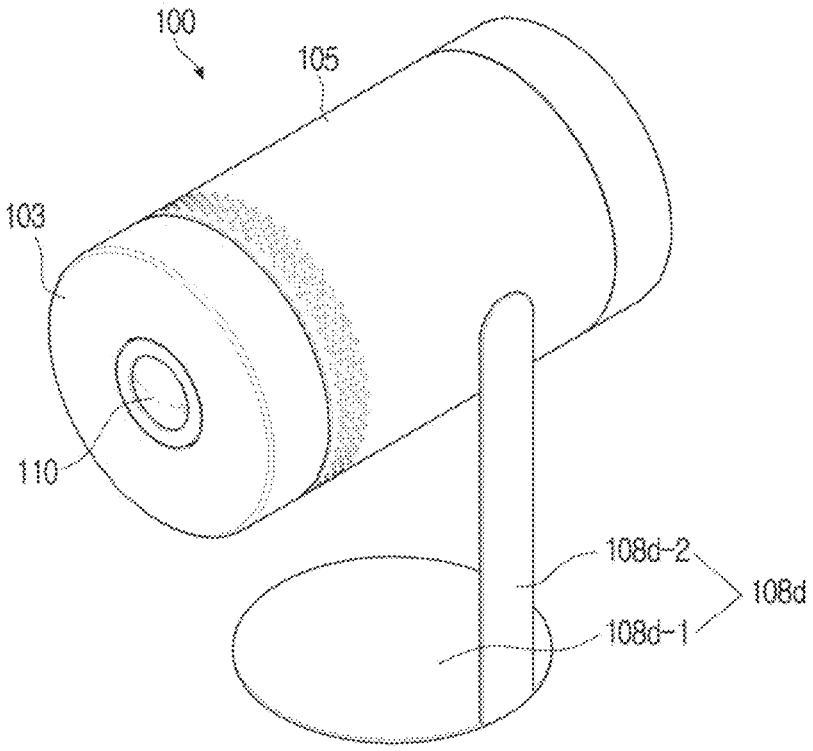
FIG. 8 is a diagram of a state where the electronic apparatus of FIG. 7 is rotated according to an embodiment of the disclosure.

FIG. 6 illustrates an example in which the two support members 108*c*-2 are connected with the main body 105, the disclosure is not limited thereto, and as in FIGS. 7 and 8, one support member and the main body 105 may be connected with each other by one hinge member.

FIG. 7 is a diagram of the exterior of the electronic apparatus according to an embodiment of the disclosure.

FIG. 8 is a diagram of a state where the electronic apparatus of FIG. 7 is rotated according to an embodiment of the disclosure.

Referring to FIGS. 7 and 8, a support 108*d* in various examples of the disclosure may include a base plate 108*d*-1 supporting the electronic apparatus 100 on the ground and one support member 108*d*-2 connecting a base plate 108*d*-1 with the main body 105.

In addition, a cross section of the one support member 108*d*-2 may be coupled to or separated from the main body by a groove and a hinge member provided on one outer circumferential surface of the main body 105.

In case that the one support member 108*d*-2 and the main body 105 are coupled with each other by one hinge member, the main body 105 may be rotated based on a virtual horizontal axis formed by the one hinge member, as in FIG. 8.

The support illustrated in FIG. 4, 5, 6, 7, or 8 is only an example, and the electronic apparatus 100 may include the support in various positions or shapes.

FIG. 9 is a diagram of information about rotation of the electronic apparatus according to an embodiment of the disclosure.

Example 910 of FIG. 9 shows a graph defining rotational directions along x, y, or z axes. A roll may be rotation around the x-axis, a pitch may be rotation around the y-axis, and a yaw may be rotation around the z-axis.

With reference to Example 920 of FIG. 9, a rotation direction of the projection plane 10 may be described as the rotation direction defined in the Example 910. The information about the x-axis rotation of the projection plane 10 may correspond to the roll (i.e., rotation performed based on the x-axis of the projection plane 10). The information about the y-axis rotation of the projection plane 10 may correspond to the pitch (i.e. rotation performed based on the y-axis of the projection plane 10). The information about the z-axis rotation of the projection plane 10 may correspond to the yaw (i.e., rotation performed based on the z-axis of the projection plane 10).

The information about the x-axis rotation may be described as information about rotation of a first-axis, information about inclination of the first-axis, or horizontal distortion information. In addition, the information about the y-axis rotation may be described as information about rotation of a second-axis, information about inclination of the second-axis, or vertical inclination information. In addition, the information about the z-axis rotation may be described as information about rotation of a third-axis, information about inclination of the third-axis, or horizontal inclination information.

The first sensor 113-1 may obtain the state information (or information about the inclination) of the electronic apparatus 100. The state information of the electronic apparatus 100 may indicate a rotation state of the electronic apparatus 100. The first sensor 113-1 may include at least one of the gravity sensor, the acceleration sensor, or the gyro sensor. The information about the x-axis rotation of the electronic apparatus 100 and the information about the y-axis rotation of the electronic apparatus 100 may be determined based on the sensing data obtained through the first sensor 113-1.

The information about the z-axis rotation may be obtained based on how much the electronic apparatus 100 is rotated based on the motion of the electronic apparatus 100. For example, the information about z-axis rotation may indicate how much the electronic apparatus 100 is rotated in the z-axis at a second time point based on a first time point.

FIG. 10 is a diagram of information about y-axis rotation of the electronic apparatus; according to an embodiment of the disclosure.

Example 1010 in FIG. 10 illustrates a state where the electronic apparatus 100 is not rotated around the y-axis.

Example 1020 in FIG. 10 illustrates a state where the electronic apparatus 100 is rotated around the y-axis. The electronic apparatus 100 may be rotated by a predetermined angle 1022 around the y-axis.

FIG. 11 is a diagram of information about x-axis rotation of the electronic apparatus; according to an embodiment of the disclosure.

Example 1110 in FIG. 11 illustrates a state where the electronic apparatus 100 is not rotated around the x-axis. A reference horizontal line 1111 may be the same as a horizontal line of the electronic apparatus 100 not rotated around the x-axis.

Example 1120 in FIG. 11 illustrates a state where the electronic apparatus 100 is rotated around the x-axis. The electronic apparatus 100 may be rotated by a predetermined angle 1122 around the x-axis. The reference horizontal line 1111 and a horizontal line 1121 of the electronic apparatus may differ from each other by a predetermined angle 1122.

FIG. 12 is a diagram of information about rotation of a projection plane; according to an embodiment of the disclosure.

Example 1210 of FIG. 12 shows a graph defining the rotational directions along the x, y, or z axes. The roll may be the rotation around the x-axis, the pitch may be the rotation around the y-axis, and the yaw may be the rotation around the z-axis.

With reference to Example 1220 of FIG. 12, the rotation direction of the projection plane 10 may be described as the rotation direction defined in the Example 1210. The information about the x-axis rotation of the projection plane 10 may correspond to the roll (i.e., rotation performed based on the x-axis of the projection plane 10). The information about the y-axis rotation of the projection plane 10 may correspond to the pitch (i.e., rotation performed based on the y-axis of the projection plane 10). The information about the z-axis rotation of the projection plane 10 may correspond to the yaw (i.e., rotation performed based on the z-axis of the projection plane 10).

The information about the x-axis rotation may be described as the information about the rotation of the first-axis or the information about the inclination of the first-axis. In addition, the information about the y-axis rotation may be described as the information about the rotation of the second-axis or the information about the inclination of the second-axis. In addition, the information about the z-axis rotation may be described as the information about the rotation of the third-axis or the information about the inclination of the third-axis.

Figure 13:
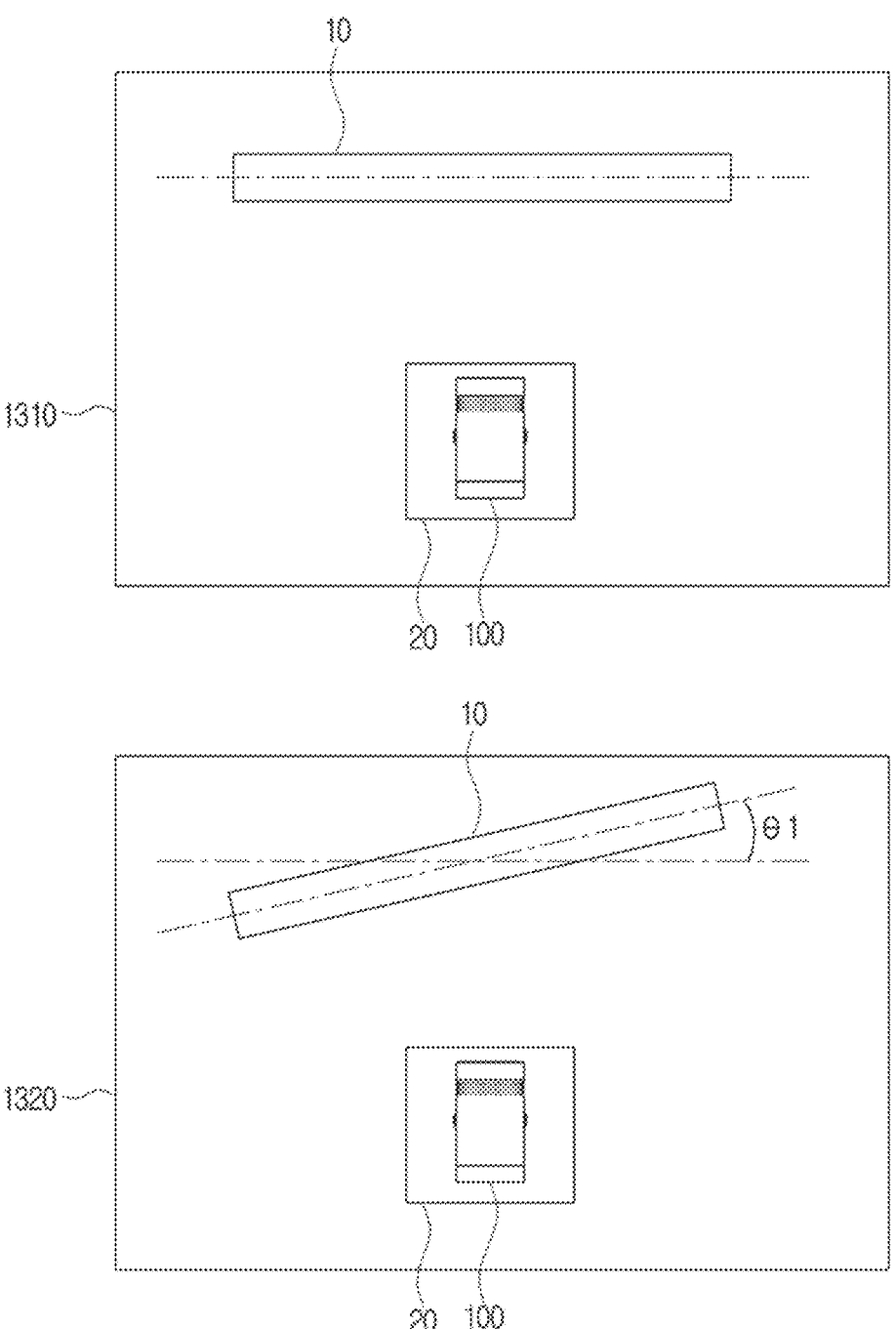
FIG. 13 is a diagram of information about z-axis rotation of the projection plane; according to an embodiment of the disclosure.

FIG. 13 is a diagram of information about z-axis rotation of the projection plane; according to an embodiment of the disclosure.

Example 1310 of FIG. 13 shows the electronic apparatus 100 viewed from above in which the electronic apparatus 100 outputs the projection image in a state where the projection plane 10 is not rotated in the z-axis. The electronic apparatus 100 may be positioned on a table 20.

Example 1320 of FIG. 13 shows the electronic apparatus 100 viewed from above in which the electronic apparatus 100 outputs the projection image in a state where the projection plane 10 is rotated counterclockwise by a predetermined angle θ1 based on the z-axis. The electronic apparatus 100 may be positioned on the table 20.

FIG. 14 is a diagram of information about y-rotation of the projection plane; according to an embodiment of the disclosure.

Example 1410 of FIG. 14 shows a state where the projection plane 10 is not rotated around the y-axis.

Example 1420 of FIG. 14 shows a state where the projection plane 10 is rotated around the y-axis. The projection plane 10 may be rotated by a predetermined angle θ2 around the y-axis.

Figure 15:
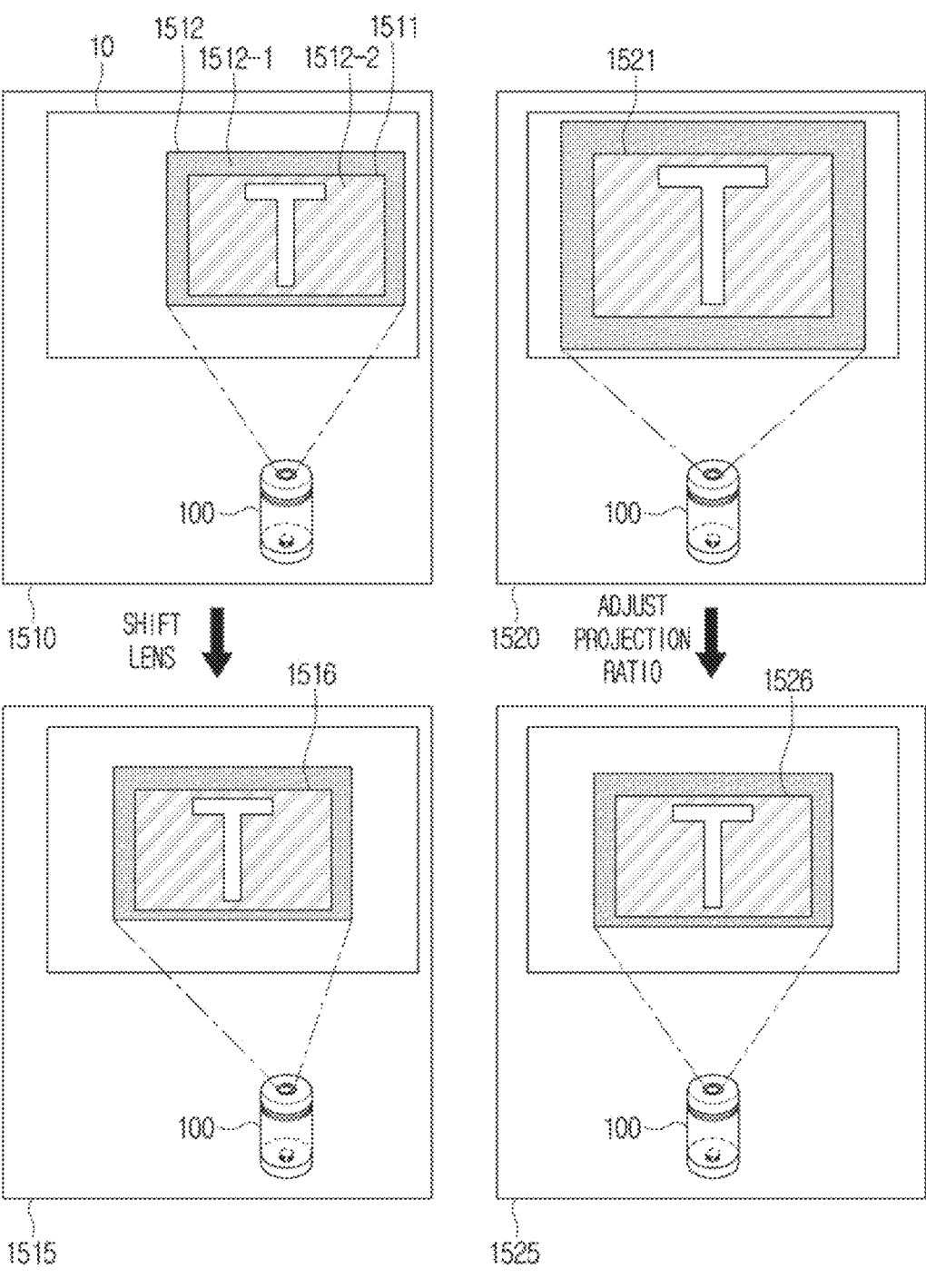
FIG. 15 is a diagram of functions of adjusting the lens shift function and projection ratio of the electronic apparatus; according to an embodiment of the disclosure.

FIG. 15 is a diagram of functions of adjusting the lens shift function and projection ratio of the electronic apparatus; according to an embodiment of the disclosure.

Referring to FIG. 15, the electronic apparatus 100 may perform the lens shift function. The lens shift function may include an operation of changing the arrangement of lenses.

For example, in Example 1510, the electronic apparatus 100 may be positioned rightward based on a center of the projection plane 10. The electronic apparatus 100 may output a projection image 1511 rightward based on the center of the projection plane 10. An area where the electronic apparatus 100 outputs light may be described as an output area 1512. The output area 1512 may include at least one of a projection area 1512-1 or the remaining area 1512-2. Projection area 1512-1 may indicate an area where the projection image is output. The remaining area 1512-2 may indicate an area where light irradiated by the electronic apparatus 100 is output although the projection image is not output. The remaining area may be described as a gray area.

The electronic apparatus 100 may change a direction in which the lens outputs light by moving the lens. In Example 1515, the electronic apparatus 100 may output light in a left direction of the electronic apparatus 100 instead of the front of the electronic apparatus 100 by shifting the lens. As a result, a projection image 1516 may be output at the center of the projection plane 10 through the lens shift function.

Referring to FIG. 15, the electronic apparatus 100 may perform the projection ratio (or a throw ratio) adjustment function. The projection ratio adjustment function may include an operation of adjusting a predetermined projection ratio based on the characteristic of the lens included in the electronic apparatus 100.

For example, in Example 1520, the electronic apparatus 100 may output a projection image 1521 to the projection plane 10 based on the first projection ratio. The electronic apparatus 100 may change the first projection ratio to the second projection ratio. Changing the projection ratio indicates that the size of the output projection image is changed even though the distance between the electronic apparatus 100 and the projection plane 10 is the same. In case that the first projection ratio and the second projection ratio are different from each other, the electronic apparatus 100 may change the size of the projection image output to the projection plane 10 by adjusting the projection ratio. In Example 1525, the changed projection image 1526 may be larger or smaller than the existing projection image 1521 based on a degree of change in the projection ratio. The projection ratio may differ based on the characteristic of the lens included in the electronic apparatus 100.

Figure 16:
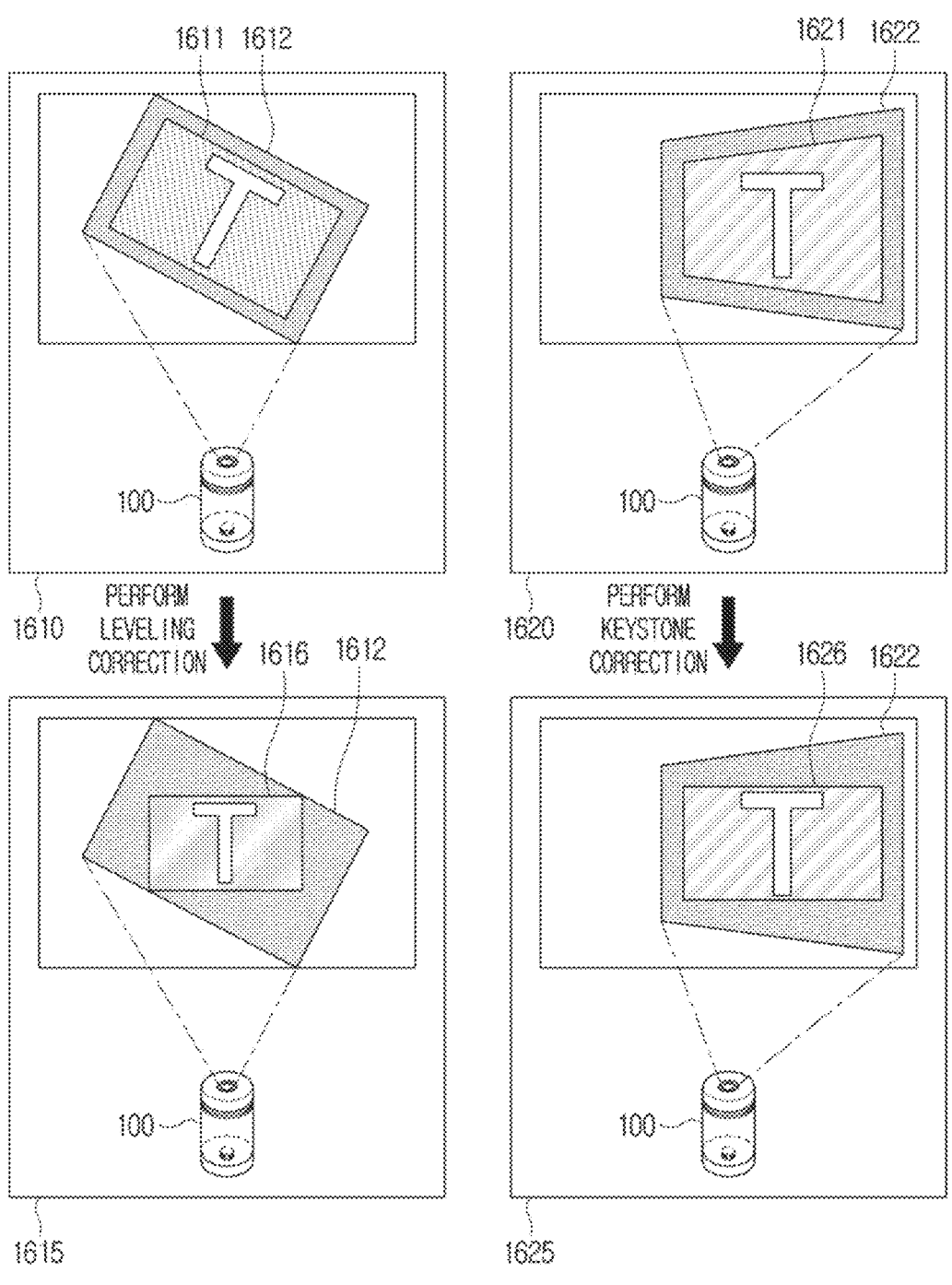
FIG. 16 is a diagram of leveling correction and keystone correction functions; according to an embodiment of the disclosure.

FIG. 16 is a diagram of leveling correction and keystone correction functions; according to an embodiment of the disclosure.

Referring to FIG. 16, the electronic apparatus 100 may perform the leveling correction function. The leveling correction function may be described as the leveling function.

The leveling correction may be described as a concept included in that of the keystone correction. For example, the keystone correction may include at least one of the keystone correction based on the x-axis rotation, keystone correction based on the y-axis rotation, or keystone correction based on the z-axis rotation of the electronic apparatus 100. The leveling correction may indicate the keystone correction based on the x-axis rotation.

For example, the electronic apparatus 100 may be rotated around the x-axis in Example 1610. In a state where the electronic apparatus 100 is rotated around the x-axis, a projection image 1611 may be rotated and then output to an output area 1612 of the projection plane 10.

Accordingly, the electronic apparatus 100 may correct (or change) the image by performing the leveling correction (or the keystone correction based on the x-axis rotation). In Example 1615, after performing the leveling correction, the electronic apparatus 100 may output a corrected projection image 1616 to the projection plane 10. The electronic apparatus 100 may change the size of the projection image based on the output area 1612 in addition to the operation of rotating the projection image. The electronic apparatus 100 may change the size of the projection image for the corrected projection image 1616 to be output in the output area 1612.

Referring to FIG. 16, the electronic apparatus 100 may perform the keystone correction function.

For example, the electronic apparatus 100 may be rotated around the z-axis in Example 1620. In a state where the electronic apparatus 100 is rotated around the z-axis, a projection image 1621 may be distorted and then output to an output area 1622 of the projection plane 10. Its distorted shape may be a trapezoid or a rotated trapezoid.

Accordingly, the electronic apparatus 100 may correct (or change) the image by performing the keystone correction based on the z-axis rotation. The keystone correction may indicate an operation of artificially correcting the original image for the image to be output in a rectangular shape. In Example 1625, after performing the keystone correction, the electronic apparatus 100 may output a corrected projection image 1626 to the projection plane 10. The electronic apparatus 100 may change the size of the projection image based on the output area 1622 in addition to the operation of correcting the projection image. The electronic apparatus 100 may change the size of the projection image for the corrected projection image 1626 to be output in the output area 1622.

Figure 17:
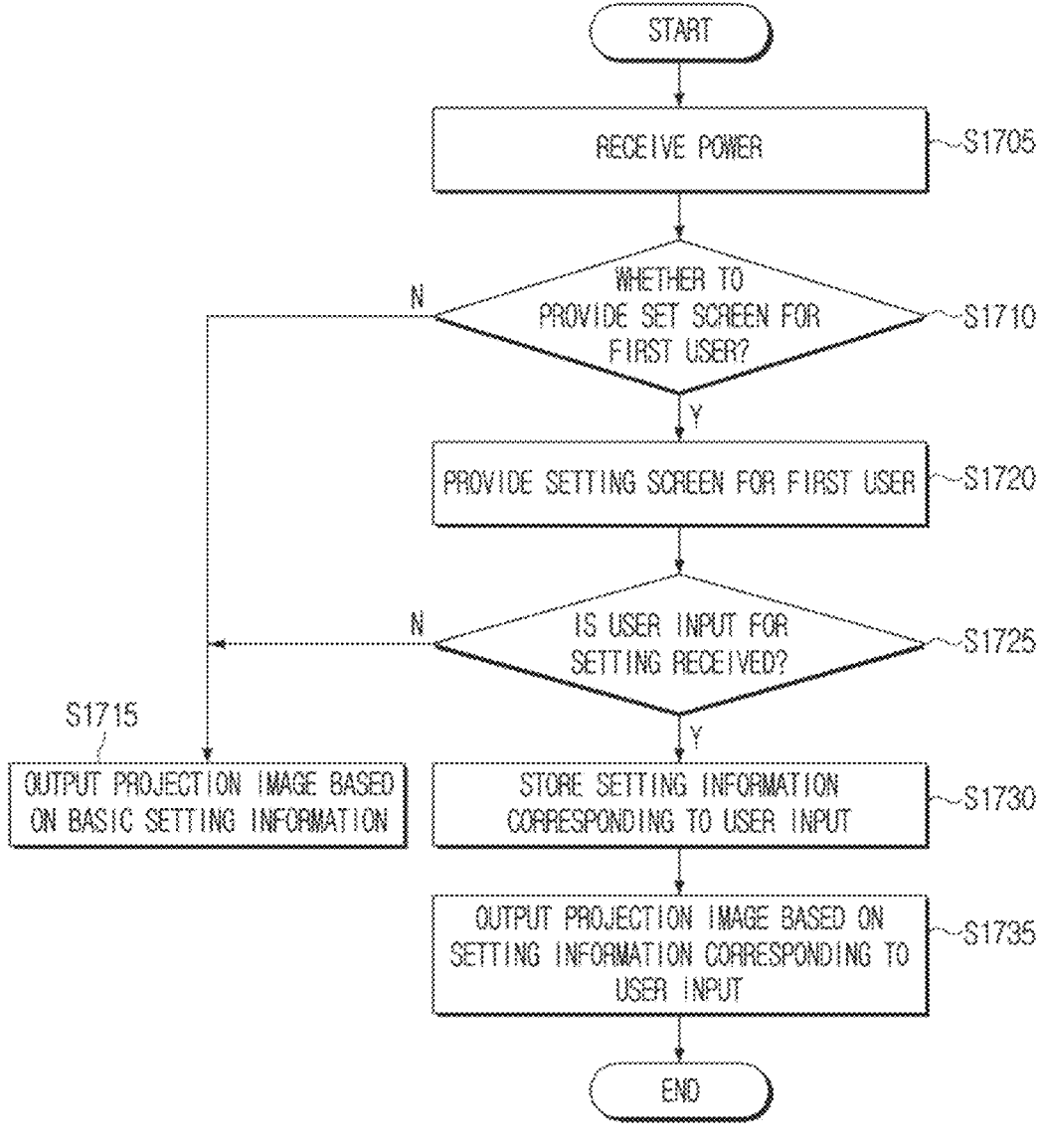
FIG. 17 is a flowchart of an operation of applying setting information according to an embodiment of the disclosure.

FIG. 17 is a flowchart of an operation of applying setting information according to an embodiment of the disclosure.

Referring to FIG. 17, the electronic apparatus 100 may receive power in operation S1705. Power may be supplied to each hardware component included in the electronic apparatus 100. The electronic apparatus 100 may identify whether to provide a set screen for a first user in operation S1710. In case that the set screen is not provided for the first user (S1710—N), the electronic apparatus 100 may output the projection image based on basic setting information in operation S1715.

When identifying that the setting screen is provided for the first user (S1710—Y), the electronic apparatus 100 may provide the setting screen for the first user in operation S1720. The electronic apparatus 100 may identify whether the user input for the setting is received in operation S1725. When receiving no user input for the setting (S1725—N), the electronic apparatus 100 may output the projection image based on the basic setting information in operation S1715.

When receiving the user input for the setting (S1725—Y), the electronic apparatus 100 may store the setting information corresponding to the user input in operation S1730. The electronic apparatus 100 may output the projection image based on the setting information corresponding to the user input in operation S1735.

Figure 18:
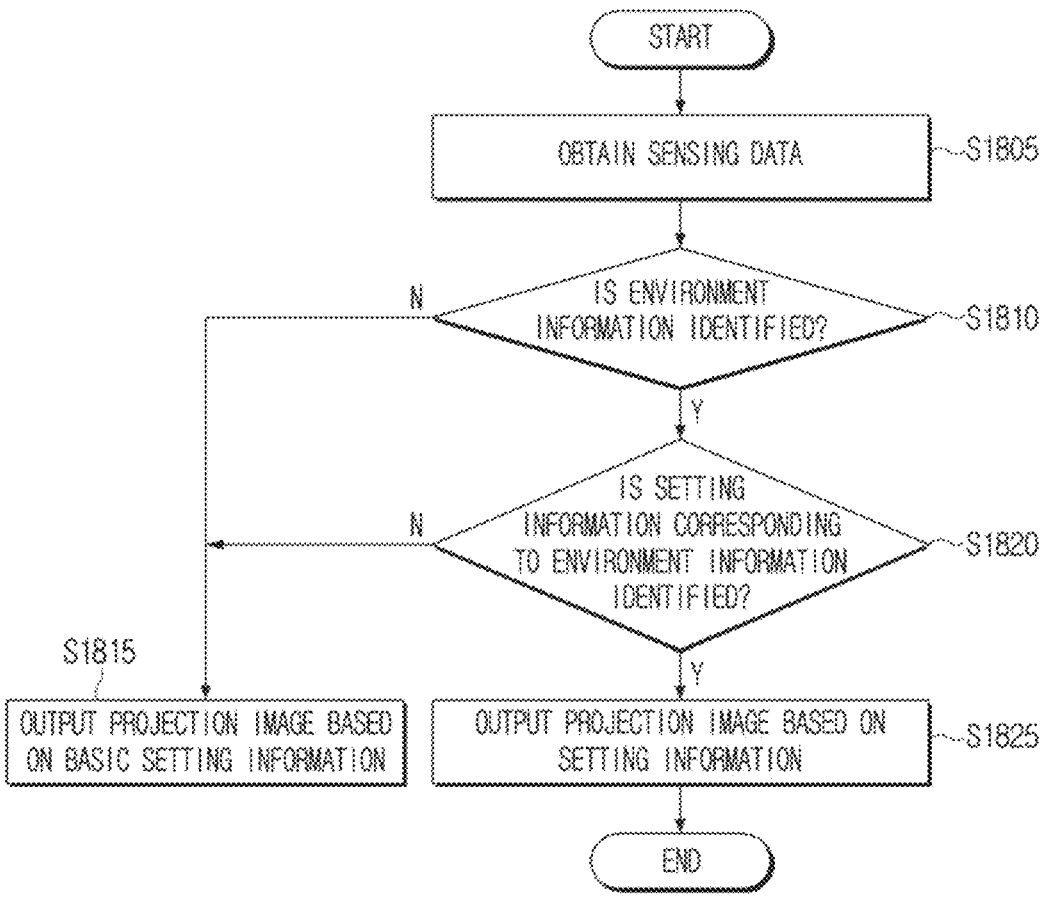
FIG. 18 is a flowchart of an operation of applying setting information corresponding to environment information according to an embodiment of the disclosure.

FIG. 18 is a flowchart of an operation of applying setting information corresponding to environment information according to an embodiment of the disclosure.

Referring to FIG. 18, the electronic apparatus 100 may obtain the sensing data through the sensor 113 in operation S1805. The electronic apparatus 100 may determine whether the environment information is identified in operation S1810. When identifying no environment information (S1810—N), the electronic apparatus 100 may output the projection image based on the basic setting information in operation S1815. The environment information may include at least one of information about the device, information about the projection plane, and information about the object. The electronic apparatus 100 may identify the environment information based on the sensing data.

When identifying the environment information (S1810—Y), the electronic apparatus 100 may determine whether the setting information corresponding to the environment information is identified in operation S1820. When identifying no setting information corresponding to the environment information (S1810—N), the electronic apparatus 100 may output the projection image based on the basic setting information in operation S1815.

When identifying the setting information corresponding to the environment information (S1820—Y), the electronic apparatus 100 may output the projection image based on the setting information in operation S1815.

Figure 19:
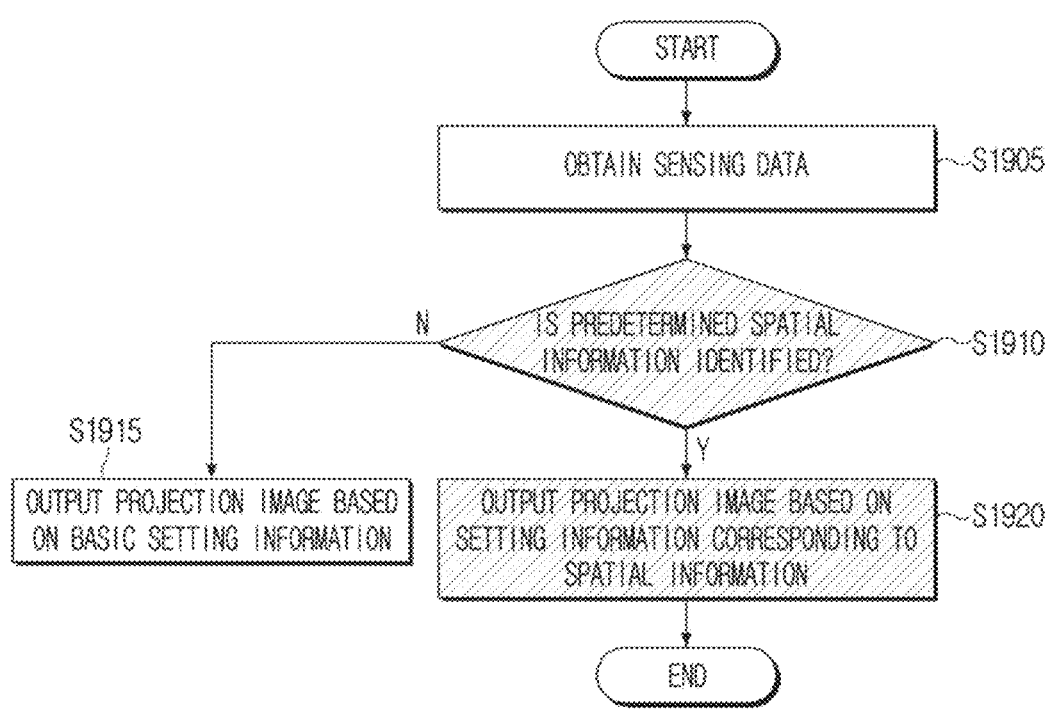
FIG. 19 is a flowchart of an operation of applying setting information corresponding to spatial information according to an embodiment of the disclosure.

FIG. 19 is a flowchart of an operation of applying setting information corresponding to spatial information according to an embodiment of the disclosure.

Referring to FIG. 19, the electronic apparatus 100 may obtain the sensing data through the sensor 113 in operation S1905. The electronic apparatus 100 may determine whether the predetermined spatial information is identified based on the sensing data in operation S1910. The spatial information may indicate information about a space pre-stored in the electronic apparatus 100. For example, the user may pre-store information about a space the user frequently uses, and the electronic apparatus 100 may apply the pre-stored setting information to output the projection image in the corresponding spaceI.

When identifying no predetermined spatial information (S1910—N), the electronic apparatus 100 may output the projection image based on the basic setting information in operation S1915.

When identifying the predetermined spatial information (S1910—Y), the electronic apparatus 100 may output the projection image based on the setting information corresponding to the spatial information in operation S1920.

FIG. 20 is a diagram of a table of the spatial information according to an embodiment of the disclosure.

Referring to table 2010 of FIG. 20, the electronic apparatus 100 may include different setting information for each space. The setting information may include at least one of information about the image, information about the audio, and the information about the object. The information about the image may include at least one of the projection ratio, resolution, brightness, and contrast of the image. The information about the audio may include at least one of the volume, channel, and effect of the audio. The effect may indicate a sound effect based on a spatial characteristic. The effect may be described as enhancement. The information about the object may include at least one of the type and position of the object.

The electronic apparatus 100 may pre-store the different setting information for each space based on the user's setting. When identifying a specific space based on the sensing data, the electronic apparatus 100 may output the projection image based on the setting information corresponding to the identified space.

Figure 21:
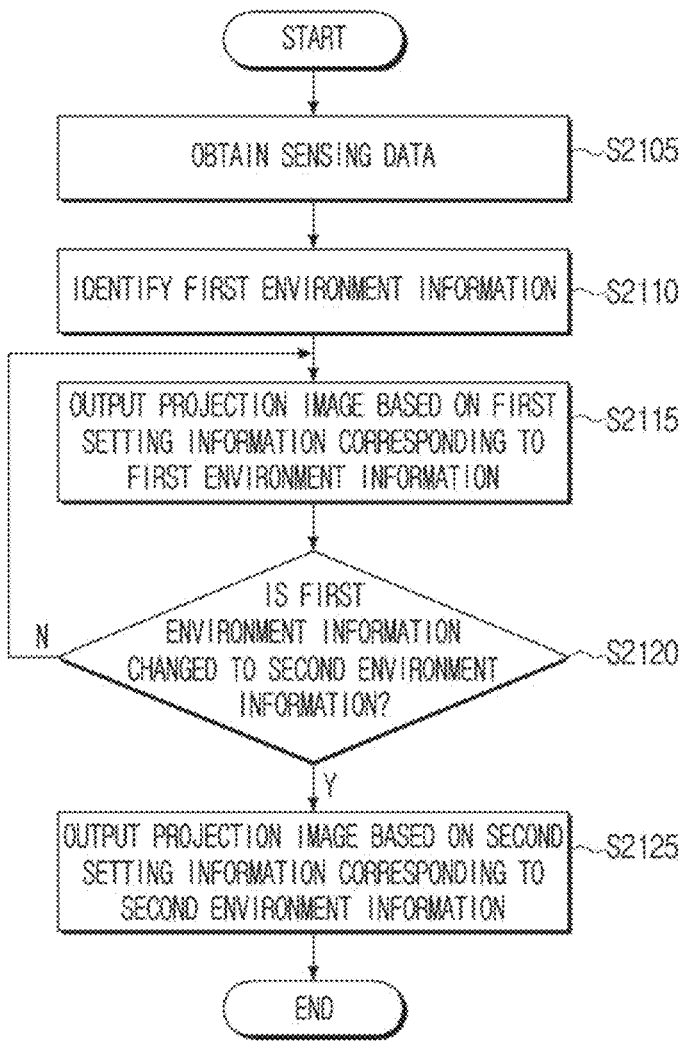
FIG. 21 is a flowchart of an operation in which the environment information is changed according to an embodiment of the disclosure.

FIG. 21 is a flowchart of an operation in which the environment information is changed according to an embodiment of the disclosure.

Referring to FIG. 21, the electronic apparatus 100 may obtain the sensing data through the sensor 113 in operation S2105. The electronic apparatus 100 may identify the first environment information based on the sensing data in operation S2110. The electronic apparatus 100 may output the projection image based on the first setting information corresponding to the first environment information in operation S2115.

The electronic apparatus 100 may identify whether the first environment information is changed to the second environment information in operation S2120. In case that the first environment information is not changed to the second environment information (S2120—N), the electronic apparatus 100 may repeatedly output the projection image based on the first setting information.

In case that the first environment information is changed to the second environment information (S2120—Y), the electronic apparatus 100 may output the projection image based on the second setting information corresponding to the second environment information in operation S2125.

Figure 22:
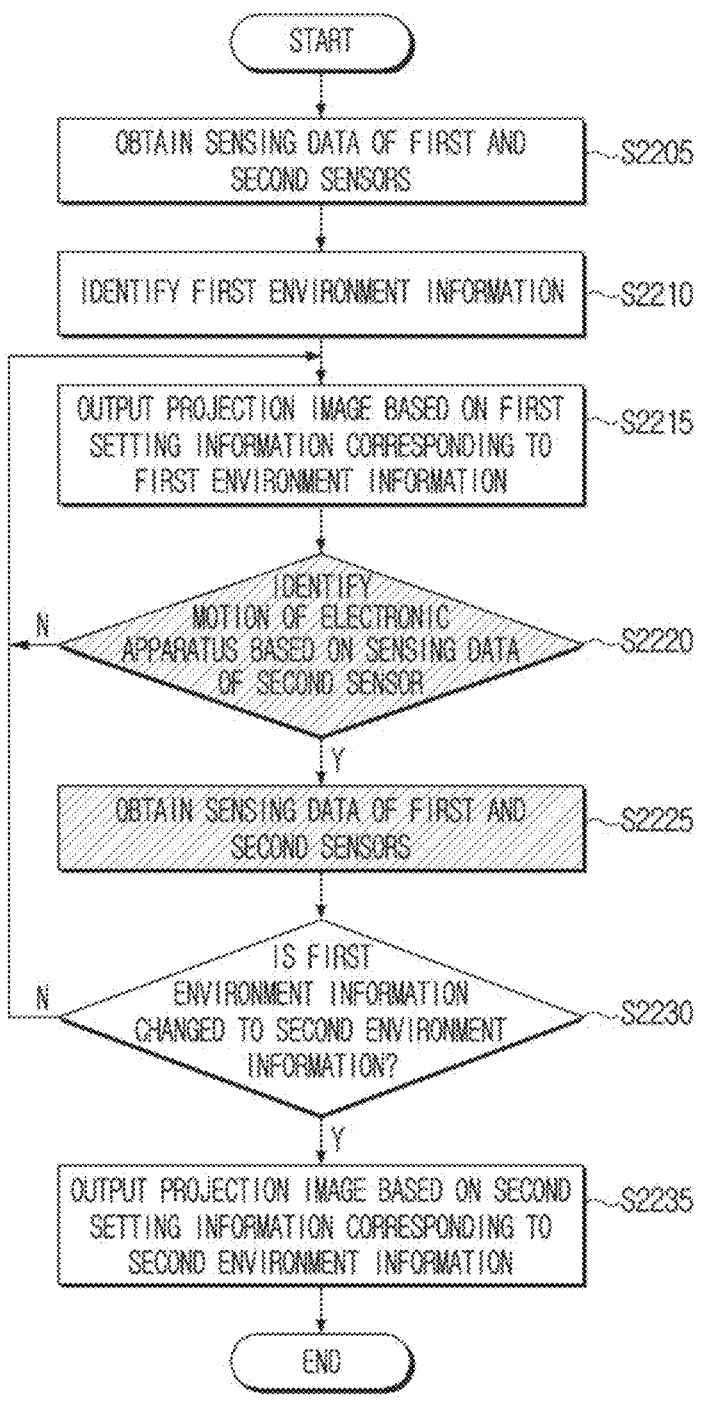
FIG. 22 is a flowchart of an operation of obtaining sensing data based on motion of the electronic apparatus according to an embodiment of the disclosure.

FIG. 22 is a flowchart of an operation of obtaining sensing data based on motion of the electronic apparatus according to an embodiment of the disclosure.

Referring to FIG. 22, the electronic apparatus 100 may obtain the sensing data of the first and second sensors in operation S2205. The electronic apparatus 100 may identify the first environment information based on the sensing data in operation S2210. The electronic apparatus 100 may output the projection image based on the first setting information corresponding to the first environment information in operation S2215. The electronic apparatus 100 may identify the motion of the electronic apparatus 100 based on the sensing data of the second sensor in operation S2220.

When identifying that the electronic apparatus 100 is not moved (S2220—N), the electronic apparatus 100 may repeatedly output the projection image based on the first setting information.

When identifying that the electronic apparatus 100 is moved (S2220—Y), the electronic apparatus 100 may obtain the sensing data of the first and second sensors in operation S2225. The electronic apparatus 100 may identify whether the first environment information is changed to the second environment information in operation S2230.

In various examples, the electronic apparatus 100 may obtain the sensing data in real time through the first sensor 113-1 and the second sensor 113-2 after detecting the motion of the electronic apparatus 100. The electronic apparatus 100 may obtain the second environment information in real time based on the sensing data.

In various examples, the electronic apparatus 100 may obtain the sensing data through the first sensor 113-1 and the second sensor 113-2 in case of detecting no motion of the electronic apparatus 100 for the predetermined time after detecting the motion of the electronic apparatus 100. The electronic apparatus 100 may obtain the second environment information based on the sensing data.

In case that the first environment information is not changed to the second environment information (S2230—N), the electronic apparatus 100 may repeatedly output the projection image based on the first setting information.

In case that the first environment information is changed to the second environment information (S2230—Y), the electronic apparatus 100 may output the projection image based on the second setting information corresponding to the second environment information in operation S2235.

Figure 23:
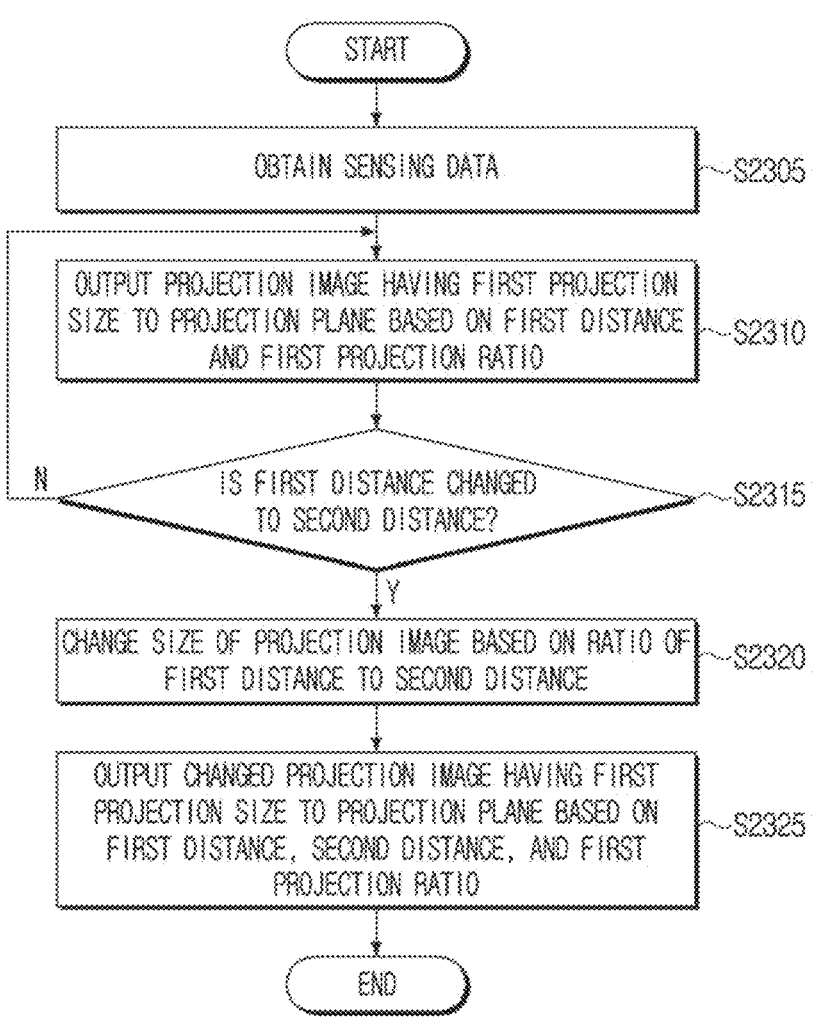
FIG. 23 is a flowchart of an operation of outputting a projection image without adjusting the projection ratio according to an embodiment of the disclosure.

FIG. 23 is a flowchart of an operation of outputting a projection image without adjusting the projection ratio according to an embodiment of the disclosure.

Referring to FIG. 23, the electronic apparatus 100 may obtain the sensing data in operation S2305. The electronic apparatus 100 may obtain the first distance between the electronic apparatus 100 and the projection plane 10. The electronic apparatus 100 may output the projection image having the first projection size to the projection plane 10 based on the first distance and the first projection ratio in operation S2310. The electronic apparatus 100 may identify whether the first distance is changed to the second distance in operation S2315.

In case that the first distance is not changed to the second distance (S2315—N), the electronic apparatus 100 may repeatedly output the projection image having the first projection size to the projection plane 10 based on the first distance and first projection ratio.

In case that the first distance is changed to the second distance (S2315—Y), the electronic apparatus 100 may change the size of the projection image based on the ratio of the first distance to the second distance in operation S2320. The electronic apparatus 100 may output the changed projection image having the first projection size to the projection plane 10 based on the first distance, the second distance, and the first projection ratio in operation S2325. A detailed calculation method related thereto is described with reference to FIG. 28.

Figure 24:
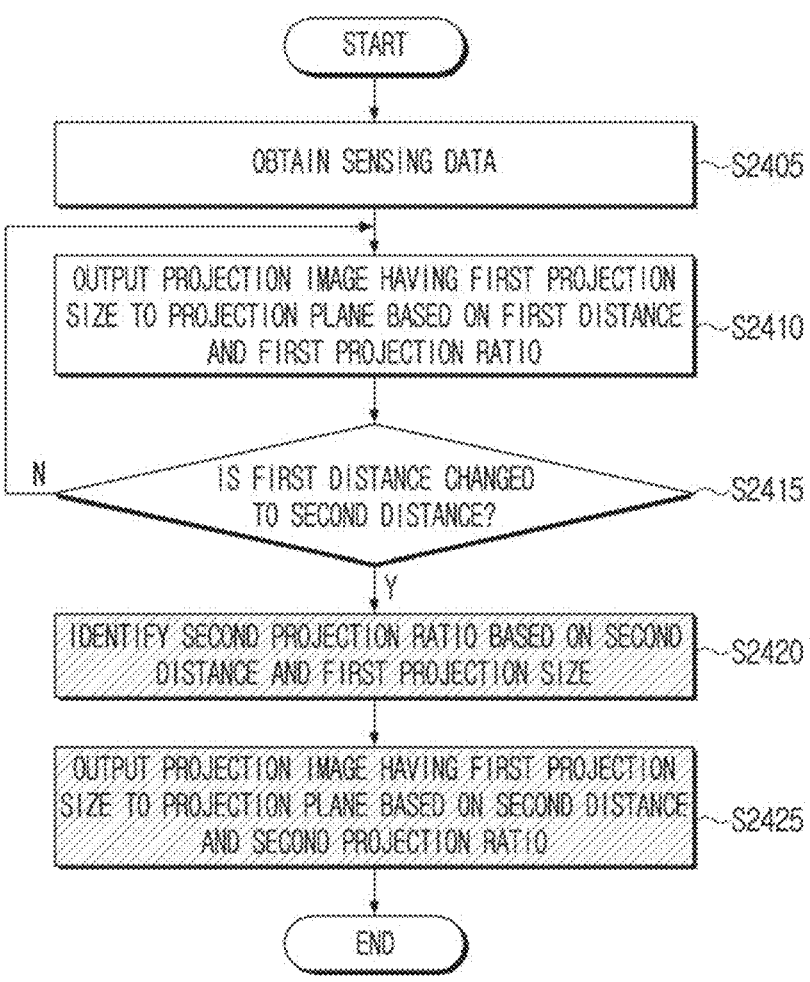
FIG. 24 is a flowchart of an operation of outputting the projection image by adjusting the projection ratio according to an embodiment of the disclosure.

FIG. 24 is a flowchart of an operation of outputting the projection image by adjusting the projection ratio according to an embodiment of the disclosure.

Operations S2405, S2410, and S2415 of FIG. 24 may correspond to operations S2305, S2310, and S2315 of FIG. 23. Therefore, a repeated description thereof is omitted.

In case that the first distance is changed to the second distance (S2415—Y), the electronic apparatus 100 may identify the second projection ratio based on the second distance and the first projection size in operation S2420. The electronic apparatus 100 may output the projection image having the first projection size to the projection plane 10 based on the second distance and the second projection ratio in operation S2425. A detailed calculation method related thereto is described with reference to FIG. 28.

FIG. 25 is a flowchart of an operation of outputting the projection image by adjusting the projection ratio in further consideration of a critical ratio according to an embodiment of the disclosure.

Operations S2505, S2510, S2515, and S2520 of FIG. 25 may correspond to operations S2405, S2410, S2415, and S2420 of FIG. 24. Therefore, a repeated description thereof is omitted.

After obtaining the second projection ratio, the electronic apparatus 100 may identify whether the second projection ratio is less than the first critical ratio in operation S2525. The first critical ratio may indicate a lowest critical projection ratio of the electronic apparatus 100. In case that the second projection ratio is less than the first critical ratio (S2525—Y), the electronic apparatus 100 may change the size of the projection image based on the first projection size, the second distance, and the first critical ratio in operation S2530. The electronic apparatus 100 may output the changed projection image having the first projection size to the projection plane 10 based on the first distance, the second distance, and the first critical ratio in operation S2535. A calculation related thereto is described with reference to FIG. 30.

In case that the second projection ratio is not less than the first critical ratio (S2525—N), the electronic apparatus 100 may identify whether the second projection ratio is the second critical ratio or less in operation S2540. The second critical ratio may indicate a highest critical projection ratio of the electronic apparatus 100. In case that the second projection ratio is the second critical ratio or less (S2540—Y), the electronic apparatus 100 may output the projection image having the first projection size to the projection plane 10 based on the second distance and the second projection ratio in operation S2545.

In case that the second projection ratio is not the second critical ratio or less (S2540—Y), the electronic apparatus 100 may provide the user with information for guiding the motion of the electronic apparatus 100 in operation S2550. In case that the second projection ratio is more than the second critical ratio, the electronic apparatus 100 may display a guide screen to the user.

Figure 26:
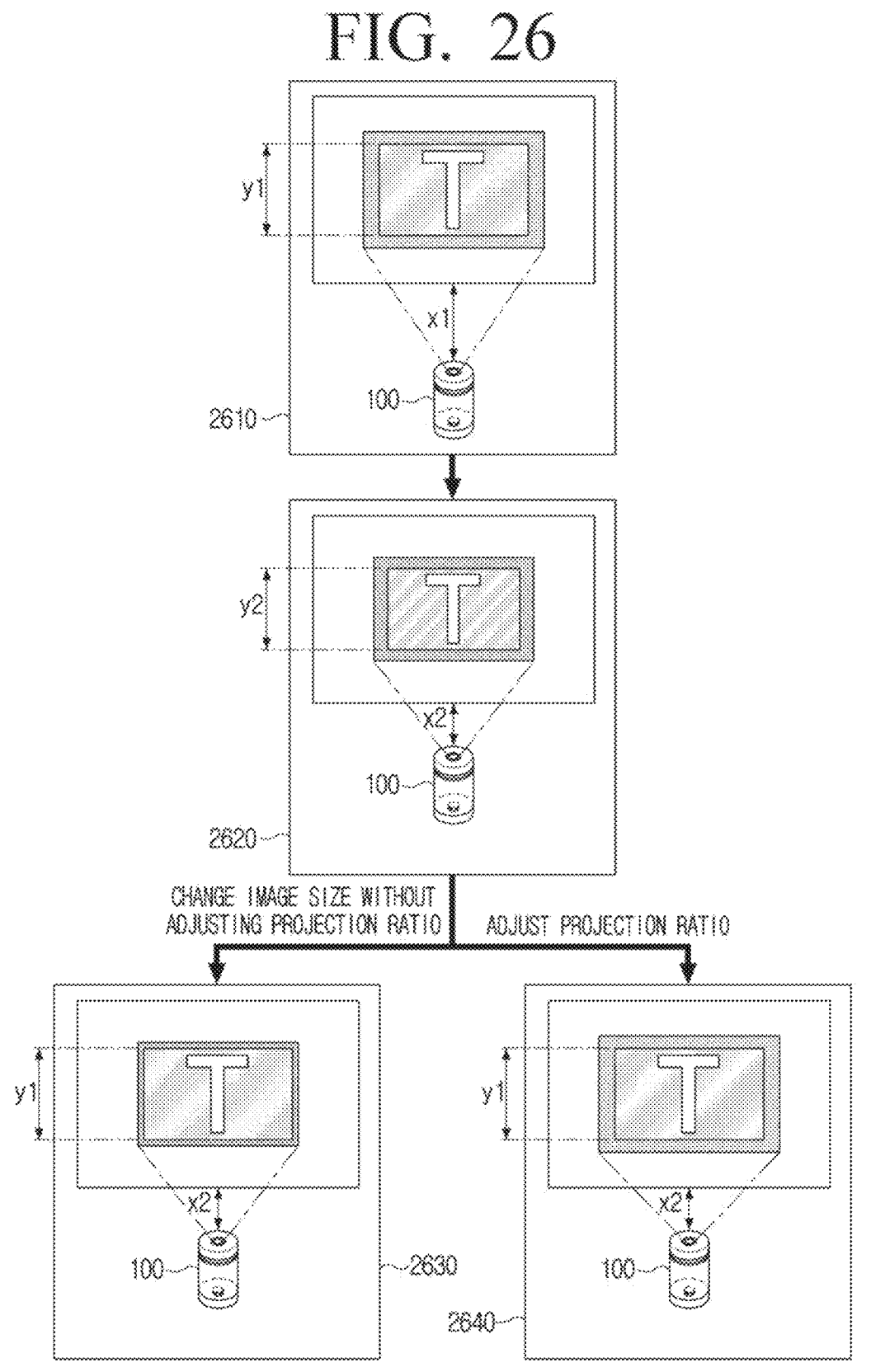

FIG. 26 is a diagram of an example in which a distance is decreased between the electronic apparatus and the projection plane according to an embodiment of the disclosure.

FIG. 26 shows an example in which the electronic apparatus 100 approaches the projection plane 10.

In Example 2610, x1 may be the distance between the electronic apparatus 100 and the projection plane 10, y1 may be the projection size of the output projection image.

In Example 2620, x2 may be the distance between the electronic apparatus 100 and the projection plane 10, y2 may be the projection size of the output projection image. In FIG. 26, x2 may be a value smaller than x1, and y2 may be a value smaller than y1.

In Example 2630, in case that the distance is decreased between the electronic apparatus 100 and the projection plane 10, the electronic apparatus 100 may change the image size without adjusting the projection ratio. For example, the electronic apparatus 100 may not have a function to adjust the projection ratio or may not be able to output the projection image having the existing projection size y1 when adjusting the projection ratio. In this case, the electronic apparatus 100 may output the projection image having the first projection size by changing the image size itself. In Example 2630, the image size may be changed (or increased) without adjusting the projection ratio, and the image area may thus be increased and the remaining area may be decreased compared to Example 2620.

In Example 2640, in case that the distance is decreased between the electronic apparatus 100 and the projection plane 10, the electronic apparatus 100 may adjust the projection ratio. The electronic apparatus 100 may output the projection image having the existing projection size y1 by adjusting the projection ratio.

Figure 27:
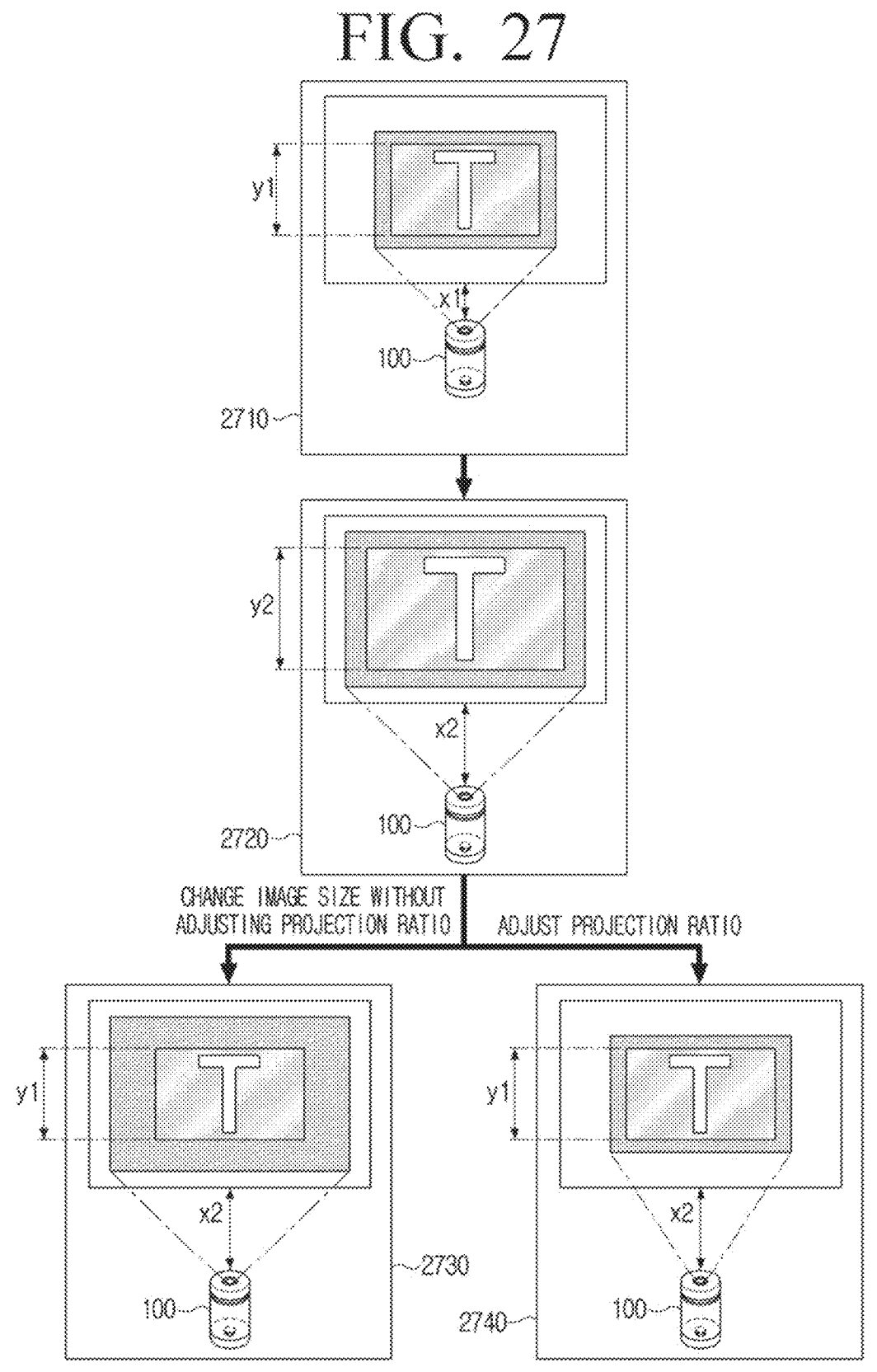

FIG. 27 is a diagram of an example in which the distance is increased between the electronic apparatus and the projection plane according to an embodiment of the disclosure.

In Example 2710, x1 may be the distance between the electronic apparatus 100 and the projection plane 10, y1 may be the projection size of the output projection image.

In Example 2720, x2 may be the distance between the electronic apparatus 100 and the projection plane 10, y2 may be the projection size of the output projection image. In FIG. 27, x2 may be a value greater than x1, and y2 may be a value greater than y1.

In Example 2730, in case that the distance is increased between the electronic apparatus 100 and the projection plane 10, the electronic apparatus 100 may change the image size without adjusting the projection ratio. For example, the electronic apparatus 100 may not have the function to adjust the projection ratio or may not be able to output the projection image having the existing projection size y1 even adjusting the projection ratio. In this case, the electronic apparatus 100 may output the projection image having the first projection size by changing the image size itself. In Example 2730, the image size may be changed (or decreased) without adjusting the projection ratio, and the image area may thus be decreased and the remaining area may be increased compared to Example 2720.

In Example 2740, in case that the distance is increased between the electronic apparatus 100 and the projection plane 10, the electronic apparatus 100 may adjust the projection ratio. The electronic apparatus 100 may output the projection image having the existing projection size y1 by adjusting the projection ratio.

FIG. 28 is a diagram of an operation of outputting the projection image by the electronic apparatus in case that the distance is changed between the electronic apparatus and the projection plane according to an embodiment of the disclosure.

Referring to FIG. 28, in Example 2810, x1 may be the distance between the electronic apparatus 100 and the projection plane 10, y1 may be the projection size of the output projection image. The projection ratio may be y1/x1.

In Example 2820, x2 may be the distance between the electronic apparatus 100 and the projection plane 10, y2 may be the projection size of the output projection image. The projection ratio may be y2/x2 (or y1/x1).

In Example 2830, in case that the distance is changed between the electronic apparatus 100 and the projection plane 10, the electronic apparatus 100 may change the image size without adjusting the projection ratio. The electronic apparatus 100 may change the size by multiplying the existing image size by y1/y2 (or x1/x2). The electronic apparatus 100 may then output the changed projection image. The projection ratio may be y2/x2 (or y1/x1). y1 may be the projection size of the projection image.

In Example 2840, in case that the distance is changed between the electronic apparatus 100 and the projection plane 10, the electronic apparatus 100 may adjust the projection ratio. The electronic apparatus 100 may output the projection image having the existing projection size y1 by adjusting the projection ratio. The projection ratio may be y1/x2. y1 may be the projection size of the projection image.

Figure 29:
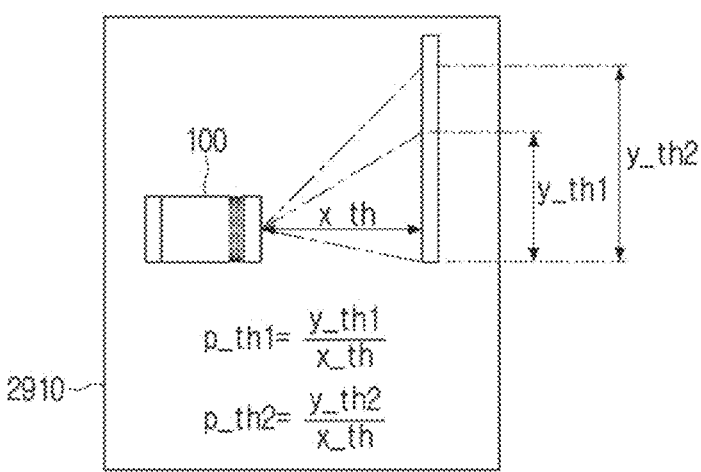
FIG. 29 is a diagram of the critical ratio according to an embodiment of the disclosure.

FIG. 29 is a diagram of the critical ratio according to an embodiment of the disclosure.

Referring to FIG. 29, the projection ratio may be set to a predetermined range based on the characteristic of the electronic apparatus 100. For example, the projection ratio may be limited to 1 to 1.5. This projection ratio is only an example, and may be different based on the characteristic of the lens included in the electronic apparatus 100.

Referring to Example 2910, the range of the projection ratio of the electronic apparatus 100 may be the first critical ratio or more and the second critical ratio or less. The first critical ratio may be y_th1/x_th. The second critical ratio may be yth2_xth. x_th, y_th1, or y_th2 may only indicate a value measured at a reference distance, and may not be an absolute value required to calculate the projection ratio.

y_th1 may be the projection size of the projection image when being projected at the first critical ratio at the reference distance x_th. Therefore, the first critical ratio may indicate the lowest critical projection ratio.

y_th2 may be the projection size of the projection image when being projected at the second critical ratio at the reference distance x_th. Therefore, the second critical ratio may indicate the highest critical projection ratio.

FIG. 30 is a diagram of an operation of considering a highest critical ratio in an example in which the distance is increased between the electronic apparatus and the projection plane according to an embodiment of the disclosure.

Referring to FIG. 30, the electronic apparatus 100 may change the projection ratio and the image size in consideration of the critical ratio.

In Example 3010, x1 may be the distance between the electronic apparatus 100 and the projection plane 10, y1 may be the projection size of the output projection image. The projection ratio may be y1/x1.

In Example 3020, x2 may be the distance between the electronic apparatus 100 and the projection plane 10, y2 may be the projection size of the output projection image. The projection ratio may be y2/x2 (or y1/x1).

The electronic apparatus 100 may not be able to provide the projection ratio required to output the projection image having the existing projection size y1. The electronic apparatus 100 may adjust the projection ratio as much as the first critical ratio, which is the lowest critical ratio.

In Example 3030, the electronic apparatus 100 may minimize the projection ratio for the projection image having the smallest size to be displayed. The electronic apparatus 100 may adjust the projection ratio to be a first critical ratio p_th1. The projection size may be x2*p_th1. Projection size x2*p_th1 may indicate the smallest size of the projection image at the current distance x2. The electronic apparatus 100 may change the image size to output the projection image having existing projection size y1.

In Example 3040, the electronic apparatus 100 may change the size by multiplying the existing image size by y1/(x2*p_th1). The electronic apparatus 100 may then output the changed projection image to the projection plane 10. The projection ratio may be p_th1. y1 may be the projection size of the projection image.

FIG. 31 is a diagram of an operation of considering a lowest critical ratio in an example in which the distance is decreased between the electronic apparatus and the projection plane according to an embodiment of the disclosure.

Referring to FIG. 31, the electronic apparatus 100 may change the projection ratio and the image size in consideration of the critical ratio.

In Example 3110, x1 may be the distance between the electronic apparatus 100 and the projection plane 10, y1 may be the projection size of the output projection image. The projection ratio may be y1/x1.

In Example 3120, x2 may be the distance between the electronic apparatus 100 and the projection plane 10, y2 may be the projection size of the output projection image. The projection ratio may be y2/x2 (or y1/x1).

The electronic apparatus 100 may not be able to provide the projection ratio required to output the projection image having the existing projection size y1. The electronic apparatus 100 may adjust the projection ratio to the maximum up to the second critical ratio, which is the highest critical ratio.

In Example 3130, the electronic apparatus 100 may maximize the projection ratio for the projection image having the largest size to be displayed. The electronic apparatus 100 may adjust the projection ratio to be a second critical ratio p_th2. The projection size may be x2*p_th2. Projection size x2*p_th2 may indicate the largest size of the projection image at the current distance x2. Unlike the example of FIG. 30, in case that the distance becomes too close, the size may exceed a limit of the projection ratio. Accordingly, the projection image having the original projecting size y1 cannot be output even though the image size is changed. Accordingly, the electronic apparatus 100 may inform the user of this restriction.

In Example 3140, the electronic apparatus 100 may provide the user with at least one of information 3141 indicating that a current situation is beyond the limit of the projection ratio or information 3142 guiding that the electronic apparatus 100 needs to be moved. The information 3142 guiding that the electronic apparatus 100 needs to be moved may include information requesting to keep the projector away from the projection plane.

Figure 32:
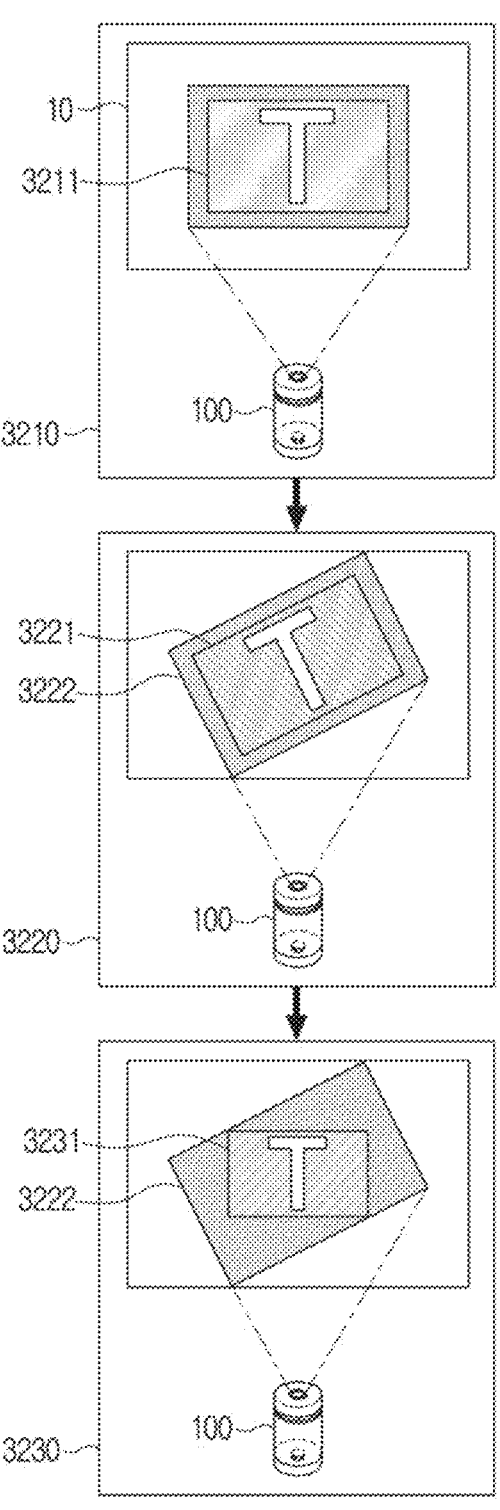
FIG. 32 is a diagram of the leveling correction in various examples according to an embodiment of the disclosure.

FIG. 32 is a diagram of the leveling correction in various examples according to an embodiment of the disclosure.

In Example 3210, the electronic apparatus 100 may output a projection image 3211 to the projection plane 10 in a stable state.

In Example 3220, based on the motion of the electronic apparatus 100, the electronic apparatus 100 may be rotated counterclockwise around the x-axis while facing the projection plane 10. Accordingly, a projection image 3221 and an output area 3222 in which the projection image 3221 is output may all be rotated.

In Example 3230, the electronic apparatus 100 may correct (or change) the image by performing the leveling correction (or keystone correction based on the x-axis rotation). The electronic apparatus 100 may then output a corrected projection image 3231 to the projection plane 10. The electronic apparatus 100 may change the size of the projection image based on an output area 3222 in addition to the operation of rotating the projection image. The electronic apparatus 100 may change the size of the projection image for the corrected projection image 3231 to be output in the output area 3222.

Figure 33:
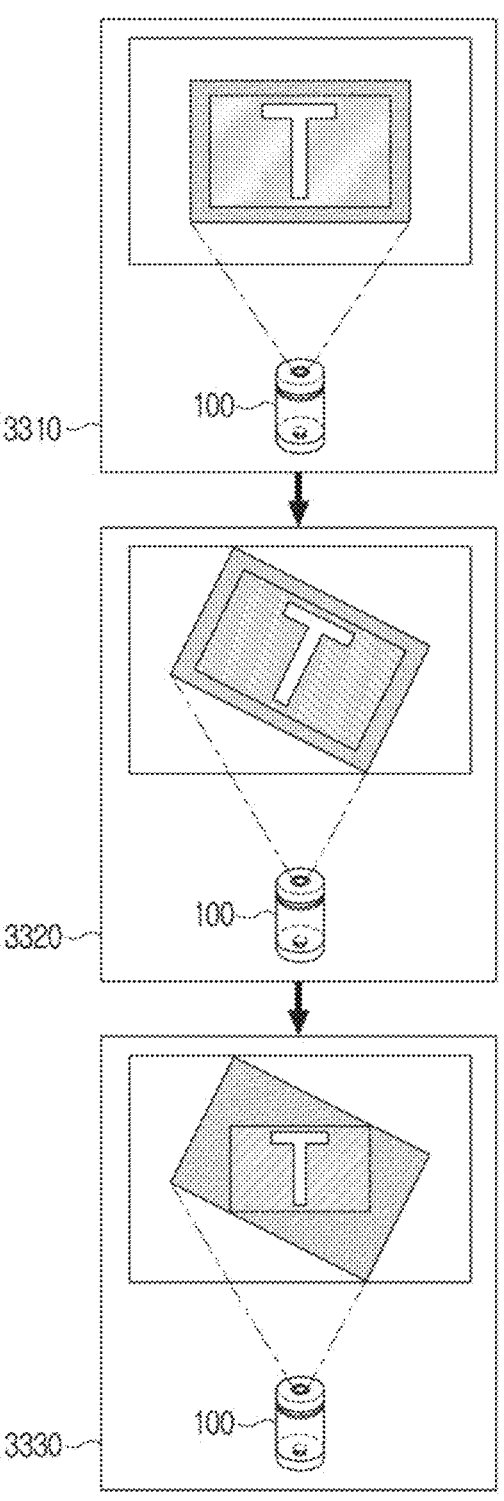
FIG. 33 is a diagram of the leveling correction in various examples according to an embodiment of the disclosure.

FIG. 33 is a diagram of the leveling correction in various examples according to an embodiment of the disclosure.

Examples 3310, 3320, and 3330 of FIG. 33 may correspond to Examples 3210, 3220, and 3230 of FIG. 32. Therefore, repeated description thereof is omitted.

However, unlike FIG. 32, the examples of FIG. 33 show that the electronic apparatus 100 is rotated clockwise around the x-axis.

Figure 34:
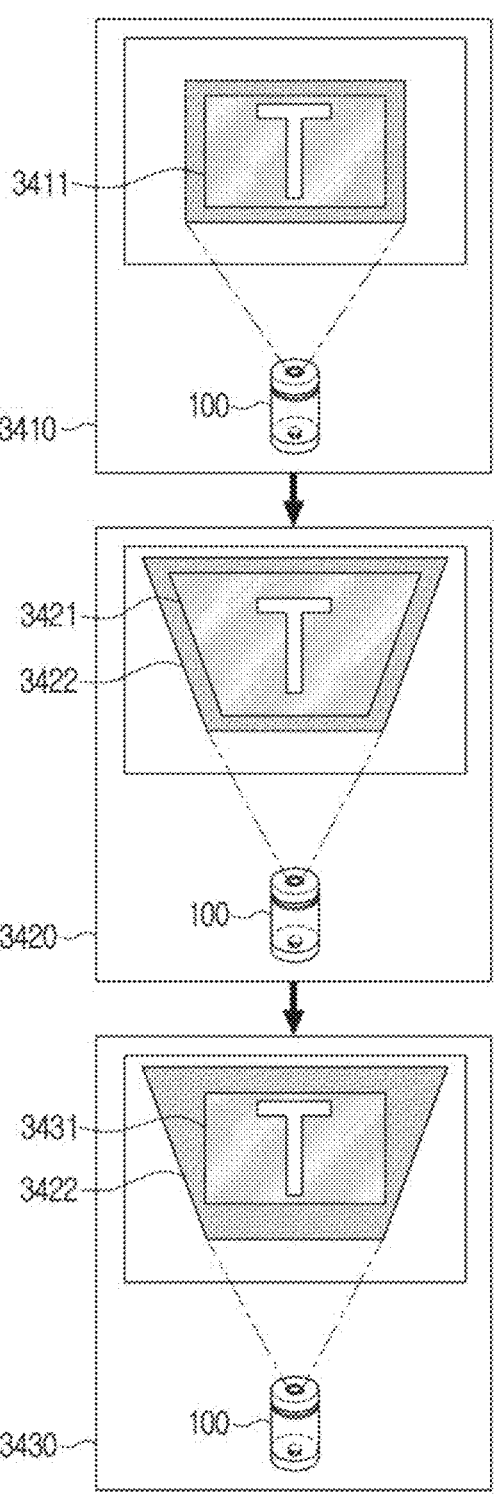
FIG. 34 is a diagram of the keystone correction function in various examples according to an embodiment of the disclosure.

FIG. 34 is a diagram of the keystone correction function in various examples according to an embodiment of the disclosure.

In Example 3410, the electronic apparatus 100 may output a projection image 3411 to the projection plane 10 in a stable state.

In Example 3420, based on the motion of the electronic apparatus 100, the electronic apparatus 100 may be rotated in a specific direction (e.g., counterclockwise) around the y-axis while facing the projection plane 10. Accordingly, a projection image 3421 and an output area 3422 in which the projection image 3421 is output may all be rotated. In a state where the electronic apparatus 100 is rotated around the y-axis, the projection image 3421 may be distorted and then output to the output area 3422 of the projection plane 10. The distorted shape may be the trapezoid or the rotated trapezoid.

In Example 3430, the electronic apparatus 100 may correct (or change) the image by performing the keystone correction based on the y-axis rotation. The keystone correction may indicate the operation of artificially correcting the original image for the image to be output in the rectangular shape. After performing the keystone correction, the electronic apparatus 100 may output a corrected projection image 3431 to the projection plane 10. The electronic apparatus 100 may change the size of the projection image based on the output area 3422 in addition to the operation of correcting the projection image. The electronic apparatus 100 may change the size of the projection image for the corrected projection image 3431 to be output in the output area 3422.

Figure 35:
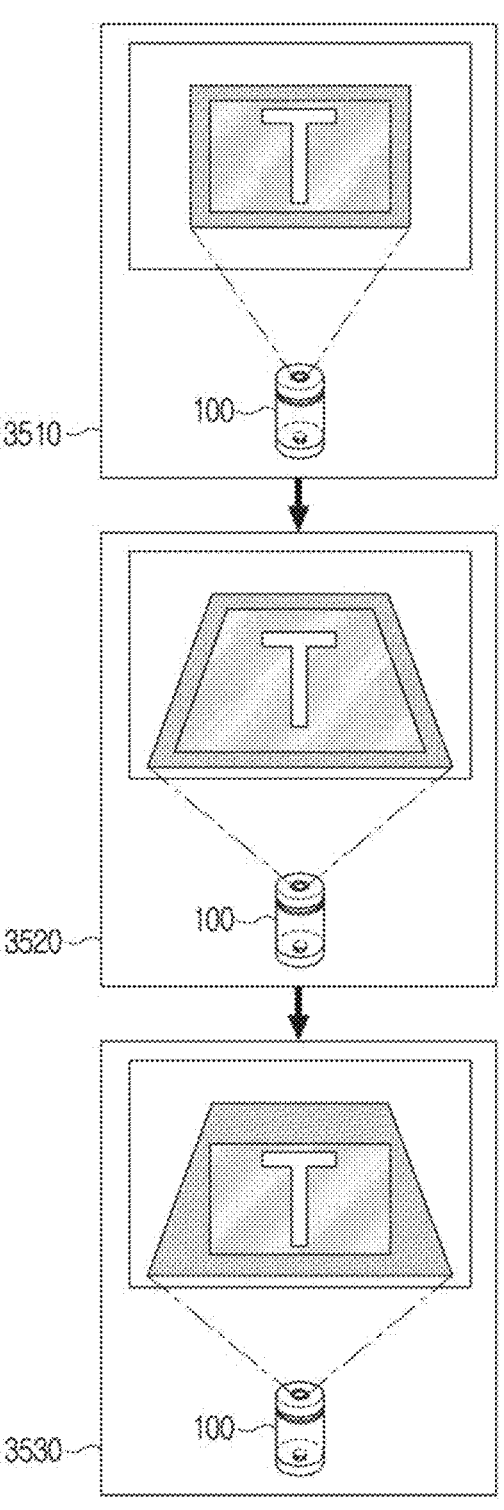
FIG. 35 is a diagram of the keystone correction function in various examples according to an embodiment of the disclosure.

FIG. 35 is a diagram of the keystone correction function in various examples according to an embodiment of the disclosure.

Examples 3510, 3520, and 3530 of FIG. 35 may correspond to Examples 3410, 3420, and 3430 of FIG. 34. Therefore, repeated description thereof is omitted.

However, unlike FIG. 34, the examples of FIG. 35 show that the electronic apparatus 100 is rotated clockwise around the y-axis.

Figure 36:
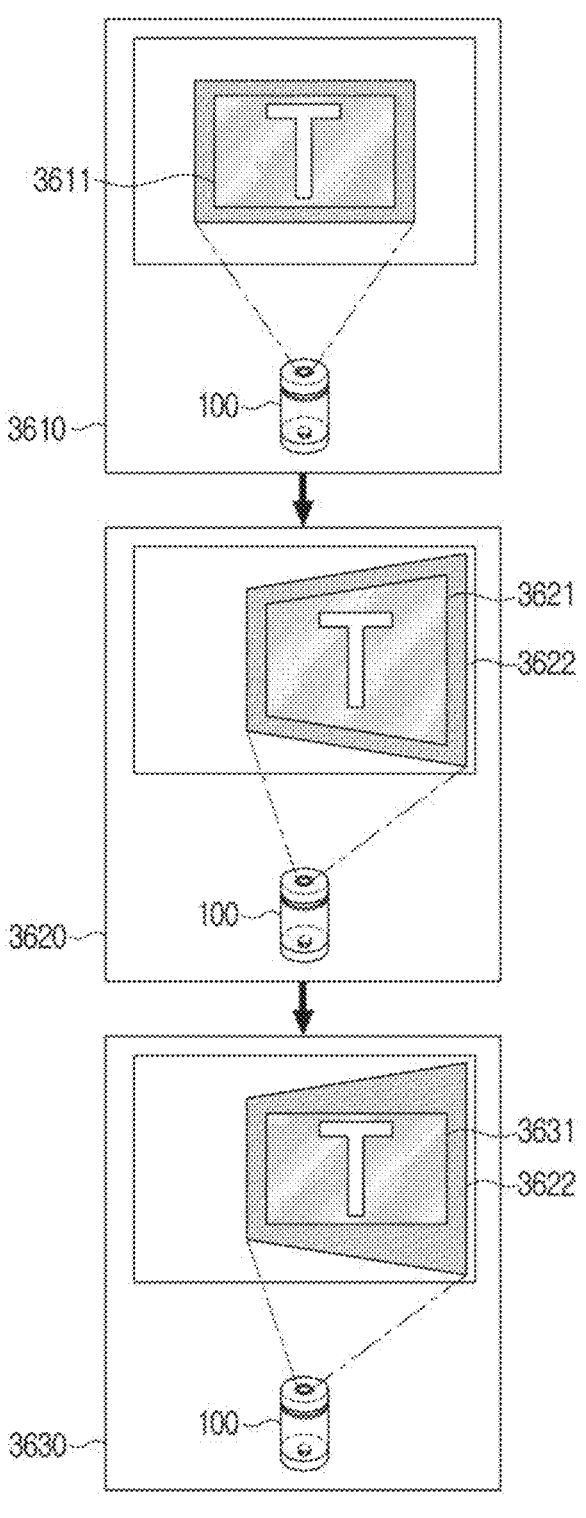
FIG. 36 is a diagram of the keystone correction function in various examples according to an embodiment of the disclosure.

FIG. 36 is a diagram of the keystone correction function in various examples according to an embodiment of the disclosure.

In Example 3610, the electronic apparatus 100 may output a projection image 3611 to the projection plane 10 in a stable state.

In Example 3620, based on the motion of the electronic apparatus 100, the electronic apparatus 100 may be rotated in a specific direction (e.g., counterclockwise) around the z-axis while facing the projection plane 10. Accordingly, a projection image 3621 and an output area 3622 in which the projection image 3621 is output may all be rotated. In a state where the electronic apparatus 100 is rotated around the z-axis, the projection image 3621 may be distorted and then output to the output area 3622 of the projection plane 10. The distorted shape may be the trapezoid or the rotated trapezoid.

In Example 3630, the electronic apparatus 100 may correct (or change) the image by performing the keystone correction based on the z-axis rotation. The keystone correction may indicate the operation of artificially correcting the original image for the image to be output in the rectangular shape. After performing the keystone correction, the electronic apparatus 100 may output a corrected projection image 3631 to the projection plane 10. The electronic apparatus 100 may change the size of the projection image based on the output area 3622 in addition to the operation of correcting the projection image. The electronic apparatus 100 may change the size of the projection image for the corrected projection image 3631 to be output in the output area 3622.

Figure 37:
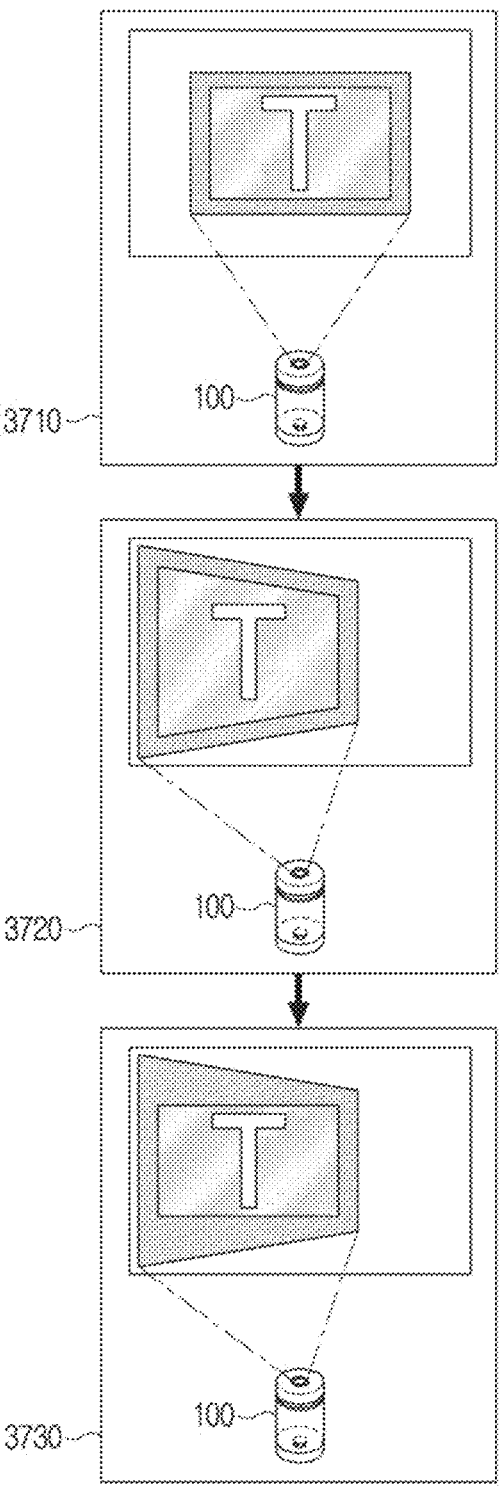
FIG. 37 is a diagram of the keystone correction function in various examples according to an embodiment of the disclosure.

FIG. 37 is a diagram of the keystone correction function in various examples according to an embodiment of the disclosure.

Examples 3710, 3720, and 3730 of FIG. 37 may correspond to Examples 3610, 3620, and 3630 of FIG. 36. Therefore, repeated description thereof is omitted.

However, unlike FIG. 36, the examples of FIG. 37 show that the electronic apparatus 100 is rotated clockwise around the z-axis.

Figure 38:
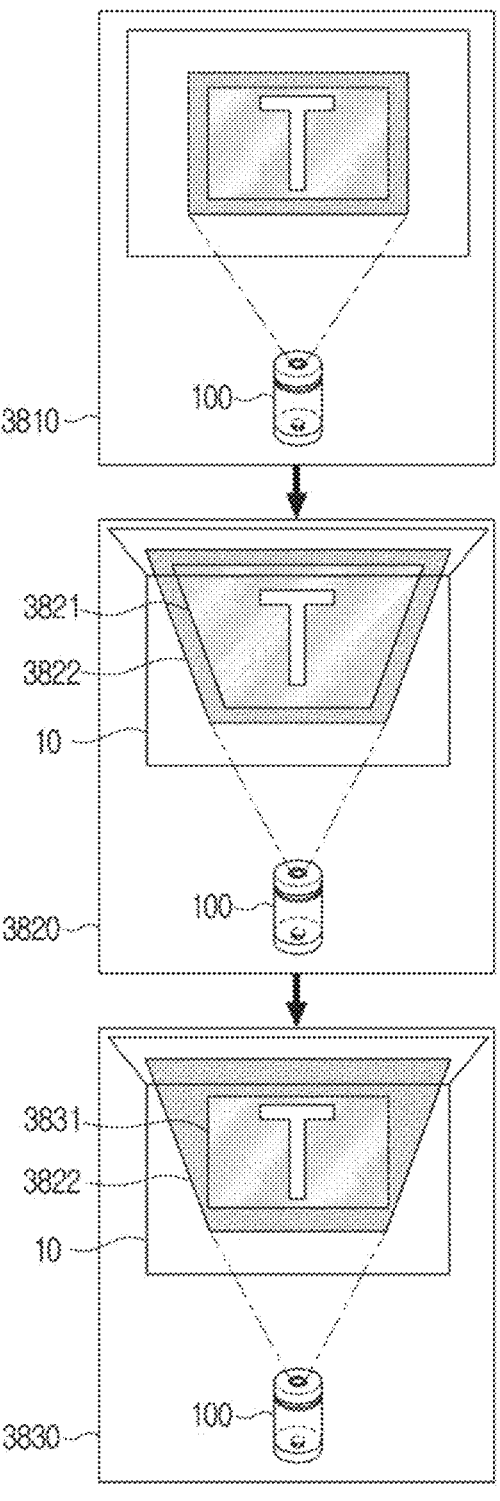
FIG. 38 is a diagram of the keystone correction function in various examples according to an embodiment of the disclosure.

FIG. 38 is a diagram of the keystone correction function in various examples according to an embodiment of the disclosure.

Examples 3810, 3820, and 3830 of FIG. 38 may correspond to Examples 3410, 3420, and 3430 of FIG. 37. Therefore, a redundant description thereof is omitted.

In Example 3820, in case that the motion of the electronic apparatus 100 is relatively severe, an projection image 3821 and an output area 3822 in which the projection image 3821 is output may be output beyond the projection plane 10.

In Example 3830, the electronic apparatus 100 may further consider the projection plane 10 as well as the output area 3822 in performing the keystone correction. The electronic apparatus 100 may adjust the image size for the projection image 3831 not to be output beyond the projection plane 10.

Figure 39:
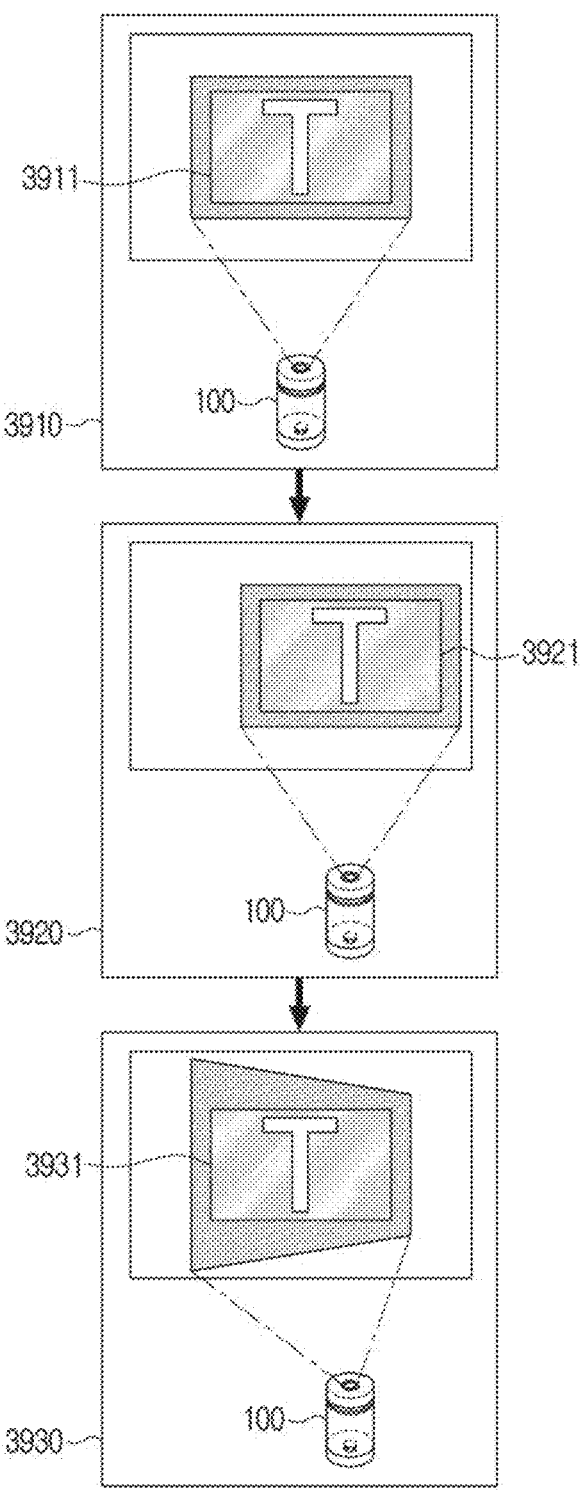
FIG. 39 is a diagram of the lens shift function in various examples according to an embodiment of the disclosure.

FIG. 39 is a diagram of the lens shift function in various examples according to an embodiment of the disclosure.

In Example 3910, the electronic apparatus 100 may output a projection image 3911 to the projection plane 10 in a stable state.

In Example 3920, based on the motion of the electronic apparatus 100, the electronic apparatus 100 may be positioned rightward based on the center of the projection plane 10. The electronic apparatus 100 may output a projection image 3921 rightward based on the center of the projection plane 10.

In Example 3930, the electronic apparatus 100 may change the direction in which the lens outputs light by moving the lens. The electronic apparatus 100 may shift the lens to output light leftward based on the front of the projection plane 10 rather than to the front of the electronic apparatus 100. As a result, a projection image 3931 may be output at the center of the projection plane 10 through the lens shift function. As the lens shift function is performed, the keystone correction may be further performed in case that the image distortion occurs. Embodiment 3930 in FIG. 39 shows that the keystone correction is performed for correcting the distortion. However, as the lens shift function is performed, the keystone correction may not be performed in case that no image distortion occurs.

Figure 40:
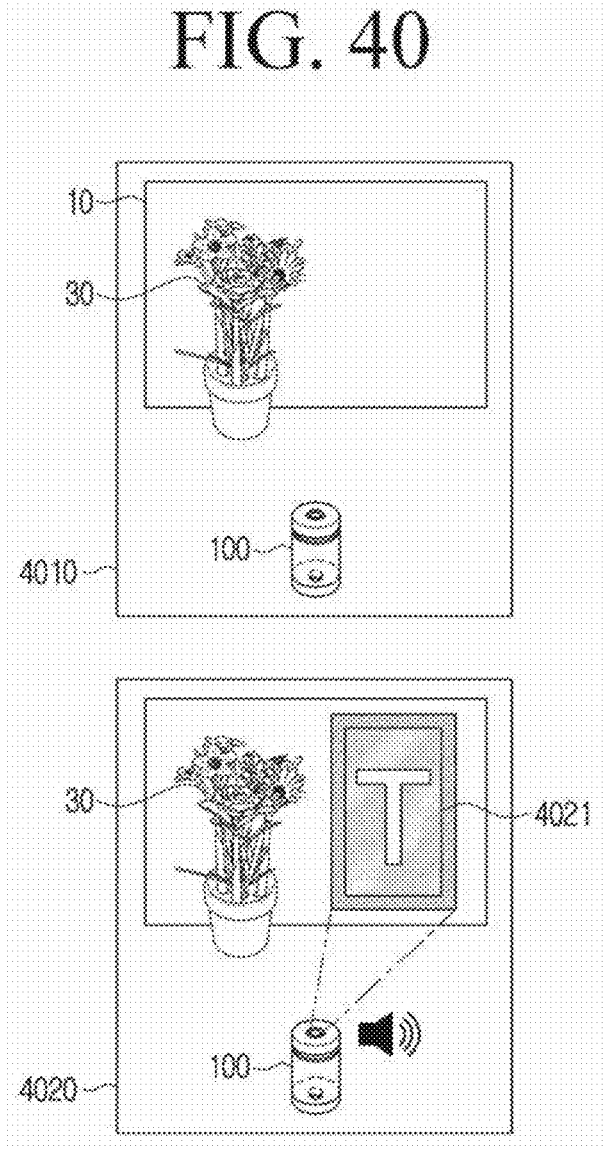
FIG. 40 is a diagram of an operation using object information in various examples according to an embodiment of the disclosure.

FIG. 40 is a diagram of an operation using object information in various examples according to an embodiment of the disclosure.

Referring to FIG. 40, the electronic apparatus 100 may change position at which the projection image is output by using the information about the object.

In Example 4010, the electronic apparatus 100 may identify the object around the electronic apparatus 100 through the camera module. The electronic apparatus 100 may identify an object 30 existing around the projection plane 10.

In Example 4020, the electronic apparatus 100 may output a projection image 4021 by avoiding position of the object 30 on the projection plane 10. The electronic apparatus 100 may determine, as the output area, a remaining area other than an area where the object 30 is positioned in the projection plane 10. The electronic apparatus 100 may output a projection image 4021 to the determined remaining area.

When identifying the predetermined object 30, the electronic apparatus 100 may output audio corresponding to the predetermined object 30. For example, in case of identifying a flower pot, the electronic apparatus 100 may output music represented as A corresponding to the flower pot through the audio outputter 117 (e.g., a speaker).

Figure 41:
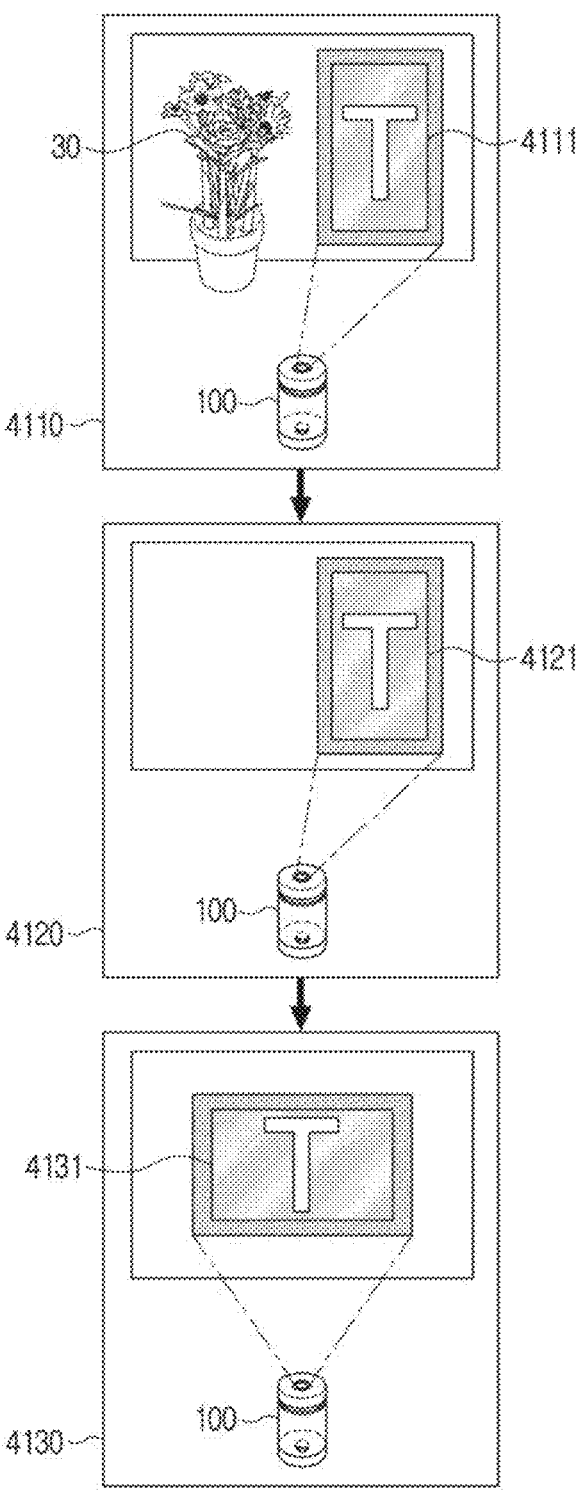
FIG. 41 is a diagram of the operation using object information in various examples according to an embodiment of the disclosure.

FIG. 41 is a diagram of the operation using object information in various examples according to an embodiment of the disclosure.

Referring to FIG. 41, the electronic apparatus 100 may change the position at which the projection image is output by using the information about the object.

In Example 4110, the electronic apparatus 100 may obtain the information about the object. The information about the object may be information indicating that the object 30 exists in a left area of the projection plane 10. Accordingly, the projection image 4111 may be output to a right area of the projection plane 10.

In Example 4120, the electronic apparatus 100 may identify whether the object exists in real time (or every predetermined time unit). In case that the object 30 does not exist, the electronic apparatus 100 may display a projection image 4121 on the right area of the projection plane 10 as before.

In Example 4130, the electronic apparatus 100 may detect that the object 30 does not exist. In case that it is identified that the object 30 does not exist, the electronic apparatus 100 may output a projection image 4131 based on an entire area of the projection plane 10. Accordingly, a size of the projection image 4131 displayed in Example 4131 may be larger than a size of the projection image 4121 displayed in Example 4020. Therefore, visibility from the user's point of view may be better.

Figure 42:
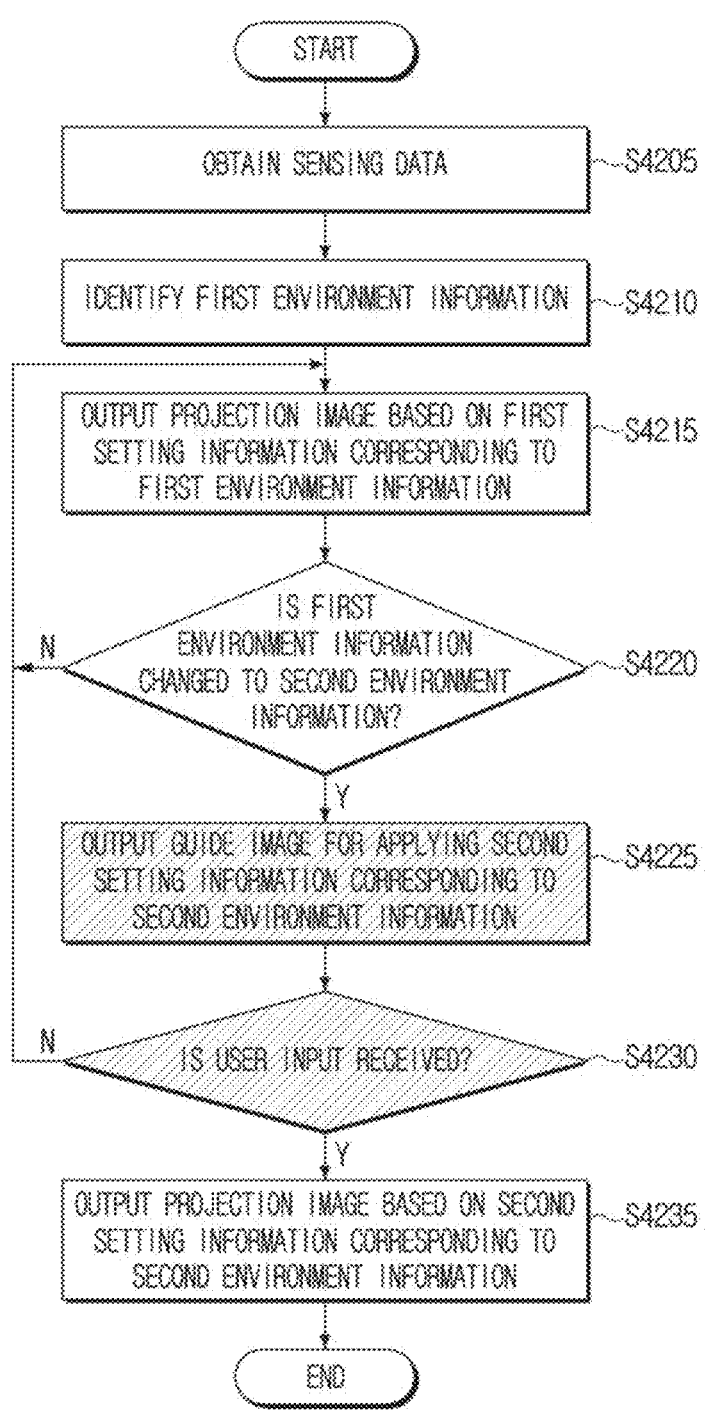
FIG. 42 is a flowchart of the operation using object information in various examples according to an embodiment of the disclosure.

FIG. 42 is a flowchart of the operation using object information in various examples according to an embodiment of the disclosure.

Operations 54205, 54210, 54215, and S4220 of FIG. 42 may correspond to operations S2105, S2110, S2115, and S2120 of FIG. 21. Therefore, repeated description thereof is omitted.

In case that the first environment information is changed to the second environment information (S4220—Y), the electronic apparatus 100 may output the guide image for applying the second setting information corresponding to the second environment information in operation S4225. The electronic apparatus 100 may identify whether the user input is received through the guide image in operation S4230.

In case that the user input for applying the second setting information is not received through the guide image (S4230—N), the electronic apparatus 100 may repeatedly output the projection image based on the first setting information.

In case that the user input for applying the second setting information is received through the guide image (S4230—N), the electronic apparatus 100 may output the projection image based on the second setting information corresponding to the second environment information in operation S4235.

Figure 43:
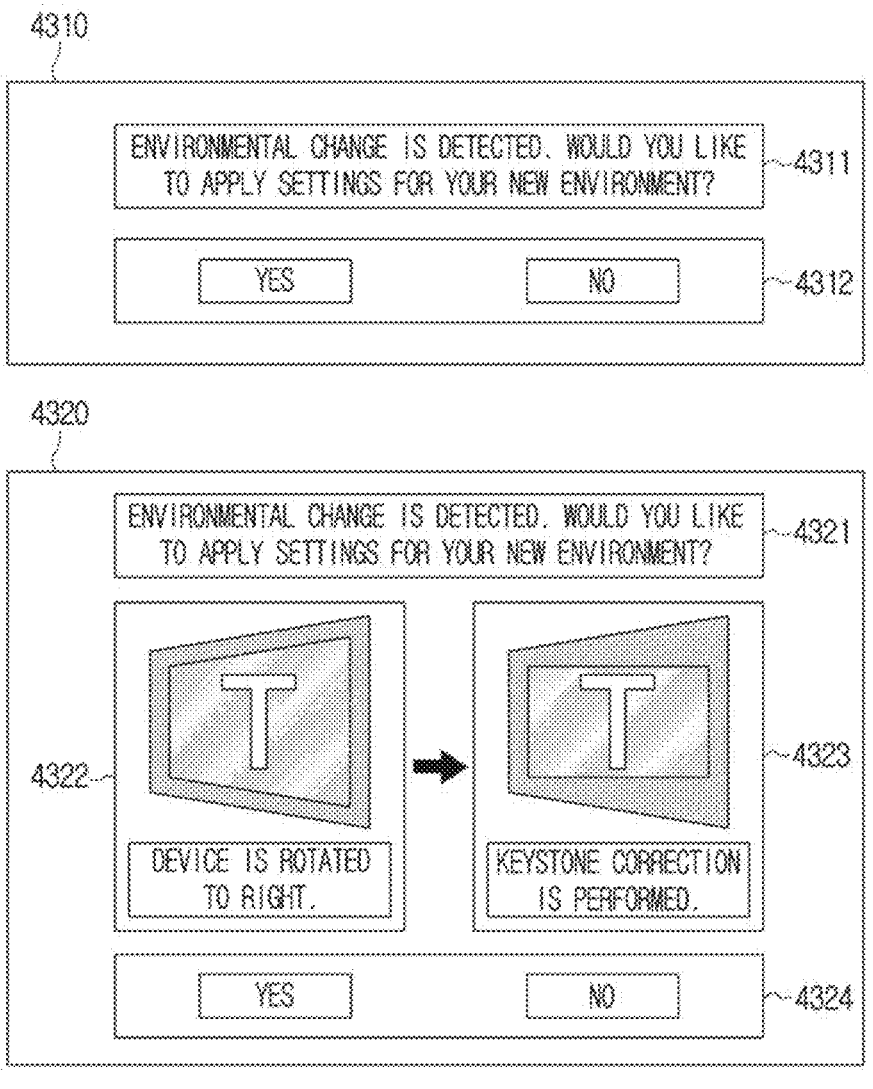
FIG. 43 is a diagram of an operation of providing a user with a guide image in various examples according to an embodiment of the disclosure.

FIG. 43 is a diagram of an operation of providing a user with a guide image in various examples according to an embodiment of the disclosure.

In Example 4310, the electronic apparatus 100 may output at least one of a UI 4311 for guiding application of new setting information (e.g., indicating whether net setting information is needed or whether an environmental change is detected) or a UI 4312 for receiving the user input. The UI 4311 for guiding the application of the new setting information may include text information.

The UIs 4321 and 4324 of Example 4320 may correspond to the UIs 4311 and 4312 of Example 4310. The electronic apparatus 100 may further output UIs 4322 and 4323 for guiding the projection image to which the setting information is applied. The UI 4322 may include an image showing the projection image output based on current setting information. The UI 4323 may include an image showing the projection image output based on setting information to be changed. The user may easily grasp how the setting information is changed through the UIs 4322 and 4323.

For example, the electronic apparatus 100 may be rotated to the right (or clockwise around the y-axis) while facing the projection plane 10 based on the motion of the electronic apparatus 100. The UI 4322 may show the projection image output based on a current state of the electronic apparatus 100 and existing setting information (or the first setting information). The UI 4323 may show the projection image output based on the current state of the electronic apparatus 100 and setting information to be changed (or the second setting information). The UI 4323 may include the projection image on which the keystone correction is completed. In addition, the UIs 4322 and 4323 may include the text information corresponding to each situation.

Figure 44:
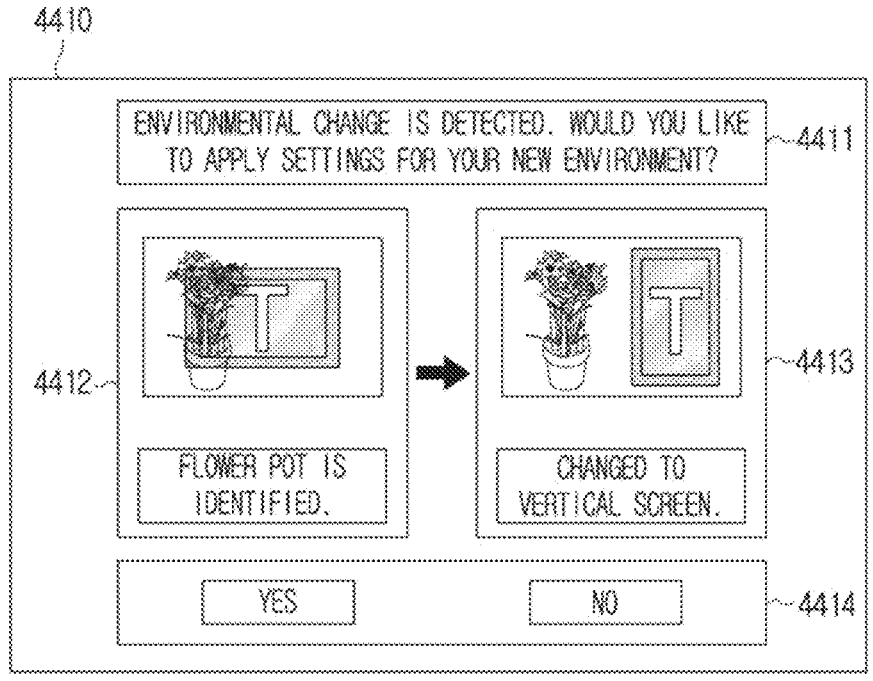
FIG. 44 is a diagram of the operation of providing a user with a guide image in various examples according to an embodiment of the disclosure.

FIG. 44 is a diagram of the operation of providing a user with a guide image in various examples according to an embodiment of the disclosure.

Example 4410 of FIG. 44 assumes the same situation as Examples 4010 and 4020 of FIG. 40. The electronic apparatus 100 may provide the guide image for applying the new setting information by identifying the object 30.

The UIs 4411, 4412, 4413, and 4414 of Example 4410 may correspond to the UIs 4321, 4322, 4323, and 4324 of Example 4320.

For example, the electronic apparatus 100 may identify the object 30 in a partial area of the projection plane 10 based on the motion of the electronic apparatus 100. The UI 4412 may show the projection image output based on the current state of the electronic apparatus 100 and the existing setting information (or the first setting information). The UI 4413 may show the projection image output based on the current state of the electronic apparatus 100 and the setting information to be changed (or the second setting information). The UI 4423 may include the projection image output to an area from which the object 30 is avoided. In addition, the UIs 4412 and 4413 may include the text information corresponding to each situation.

Figure 45:
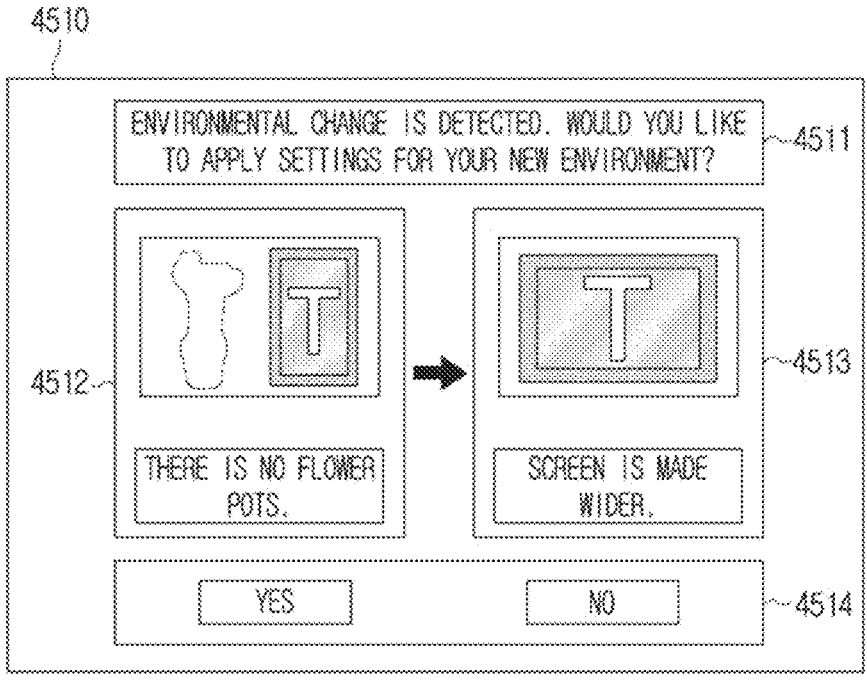
FIG. 45 is a diagram of the operation of providing a user with a guide image in various examples according to an embodiment of the disclosure.

FIG. 45 is a diagram of the operation of providing a user with a guide image in various examples according to an embodiment of the disclosure.

Example 4510 of FIG. 45 assumes the same situation as Examples 4110, 4120 and 4130 of FIG. 41. The electronic apparatus 100 may provide the guide image for applying the new setting information in a situation where the object 30 is not identified.

The UIs 4511, 4512, 4513, and 4514 of Example 4510 may correspond to the UIs 4321, 4322, 4323, and 4324 of Example 4320.

For example, the electronic apparatus 100 may no longer identify that the object exists in the partial area of the projection plane 10 based on the motion of the electronic apparatus 100. The UI 4512 may show the projection image output based on the current state of the electronic apparatus 100 and the existing setting information (or the first setting information). The UI 4513 may represent the projection image output based on the current state of the electronic apparatus 100 and the setting information to be changed (or the second setting information). The UI 4512 may show information (for example, a dotted line) indicating position where the object 30 used to exist. The UI 4513 may include the projection image output to the projection plane 10 where the object 30 does not exist. In addition, the UIs 4512 and 4513 may include the text information corresponding to each situation.

Figure 46:
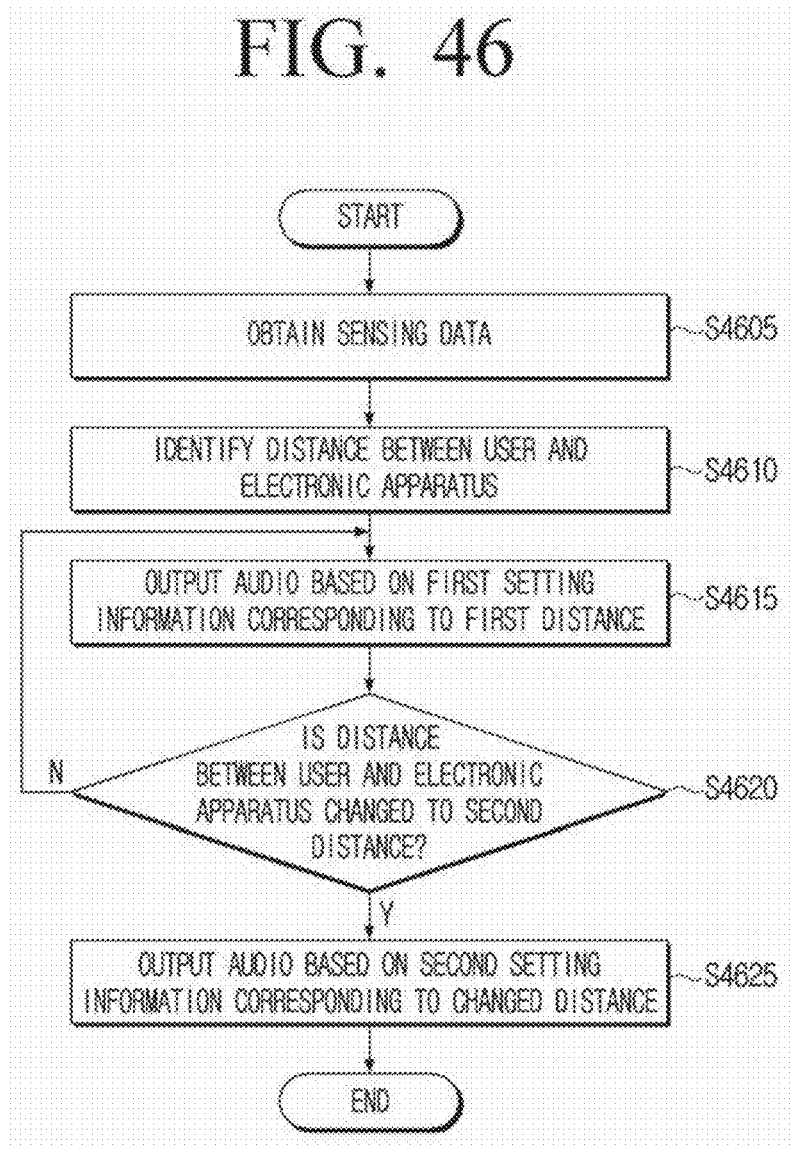
FIG. 46 is a flowchart of an operation of outputting audio by the electronic apparatus in case that the distance is changed between the electronic apparatus and the projection plane according to an embodiment of the disclosure.

FIG. 46 is a flowchart of an operation of outputting audio by the electronic apparatus in case that the distance is changed between the electronic apparatus and the projection plane according to an embodiment of the disclosure.

Referring to FIG. 46, the electronic apparatus 100 may obtain the sensing data in operation S4605. The electronic apparatus 100 may then identify a distance between the user and the electronic apparatus 100 based on the sensing data in operation S4610. The identified distance may be the first distance. The electronic apparatus 100 may output the audio based on the first setting information corresponding to the first distance in operation S4615.

The electronic apparatus 100 may identify whether the distance between the user and the electronic apparatus 100 is changed to the second distance in operation S4620. The electronic apparatus 100 may identify the distance between the user and the electronic apparatus 100 based on the sensing data obtained in real time (or predetermined time units). In addition, the electronic apparatus 100 may identify whether the distance between the user and the electronic apparatus 100 is changed.

In case that the distance between the user and the electronic apparatus 100 is not changed (S4620—N), the electronic apparatus 100 may repeatedly output the audio based on the first setting information. In case that the distance between the user and the electronic apparatus 100 is changed (S4620—Y), the electronic apparatus 100 may output the audio based on the second setting information corresponding to the changed distance (or the second distance) in operation S4625.

The first setting information or the second setting information may include at least one of the volume, channel, or effect of the audio.

FIG. 47 is a flowchart of the operation of outputting audio by the electronic apparatus in case that the distance is changed between the electronic apparatus and the projection plane according to an embodiment of the disclosure.

Referring to FIG. 47, the electronic apparatus 100 may output the volume of the audio different based on the distance between the electronic apparatus 100 and the user.

In Example 4710, a first distance x1 may be the distance between the electronic apparatus 100 and the user. The electronic apparatus 100 may output the audio having the volume corresponding to the first distance x1.

In Example 4720, a second distance x2 may be the distance between the electronic apparatus 100 and the user. The electronic apparatus 100 may output the audio having the volume corresponding to the second distance x2.

The electronic apparatus 100 may output the audio having a lower volume as the distance is decreased between the user and the electronic apparatus 100. On the other hand, the electronic apparatus 100 may output the audio having a higher volume as the distance is increased between the user and the electronic apparatus 100. The reason is that the farther away the user is, the more likely the user cannot hear the sound. The volume of the audio is increased even in case that the user moves away, the user may listen to constant audio based on the distance.

For example, 3 may be the volume of the audio corresponding to the first distance x1. 5 may be the volume of the audio corresponding to the second distance x2 in case that the second distance x2 is greater than the first distance x1. The higher the volume, the louder the sound may be output.

Figure 48:
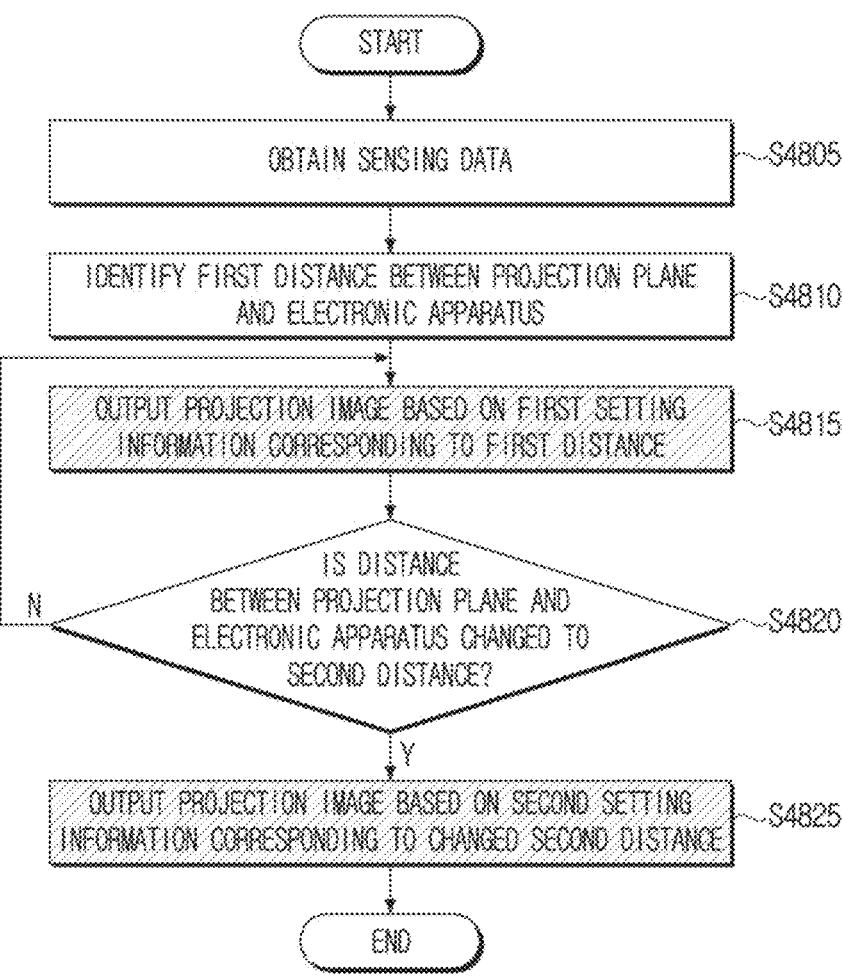
FIG. 48 is a flowchart of an operation of changing brightness of the projection image by the electronic apparatus in case that the distance between the electronic apparatus and the projection plane is changed according to an embodiment of the disclosure.

FIG. 48 is a flowchart of an operation of changing brightness of the projection image by the electronic apparatus in case that the distance between the electronic apparatus and the projection plane is changed according to an embodiment of the disclosure.

Operations S4805, S4810, and S4820 of FIG. 48 may correspond to steps S4605, S4610, and S4620 of FIG. 46. Therefore, repeated description thereof is omitted.

In case of identifying that the first distance is the distance between the projection plane 10 and the electronic apparatus 100, the electronic apparatus 100 may output the projection image based on the first setting information corresponding to the first distance.

After outputting the projection image based on the first setting information, the electronic apparatus 100 may identify whether the first distance is changed based on the sensing data. In case that the first distance is not changed (S4820—N), the electronic apparatus 100 may then repeatedly output the projection image based on the first setting information. In case that the first distance is changed (S4820—Y), the electronic apparatus 100 may output the projection image based on the second setting information corresponding to the changed second distance in operation S4825.

The first setting information or the second setting information may include at least one of the projection ratio, resolution, brightness, or contrast of the image.

FIG. 49 is a flowchart of the operation of changing brightness of the projection image by the electronic apparatus in case that the distance between the electronic apparatus and the projection plane is changed according to an embodiment of the disclosure.

Referring to FIG. 49, the electronic apparatus 100 may output the brightness of the image different based on the distance between the electronic apparatus 100 and the projection plane 10.

In Example 4910, the first distance x1 may be the distance between the electronic apparatus 100 and the projection plane 10. The electronic apparatus 100 may output the image having the brightness corresponding to the first distance x1.

In Example 4920, the second distance x2 may be the distance between the electronic apparatus 100 and the projection plane 10. The electronic apparatus 100 may output the image having the brightness corresponding to the second distance x2.

The electronic apparatus 100 may output the image having lower brightness as the distance between the projection plane 10 and the electronic apparatus 100 is decreased. On the other hand, the electronic apparatus 100 may output the image having higher brightness as the distance between the projection plane 10 and the electronic apparatus 100 is increased. The reason is that as the projection plane 10 is farther away, the output projection image may appear lighter. The brightness of the image may be higher even in case that the projection plane 10 is farther away, constant brightness may be provided to the user based on difference in the distance.

For example, 3 may be the brightness of the image corresponding to the first distance x1. 5 may be the brightness of the image corresponding to the second distance x2 in case that the second distance x2 is greater than the first distance x1.

Figure 50:
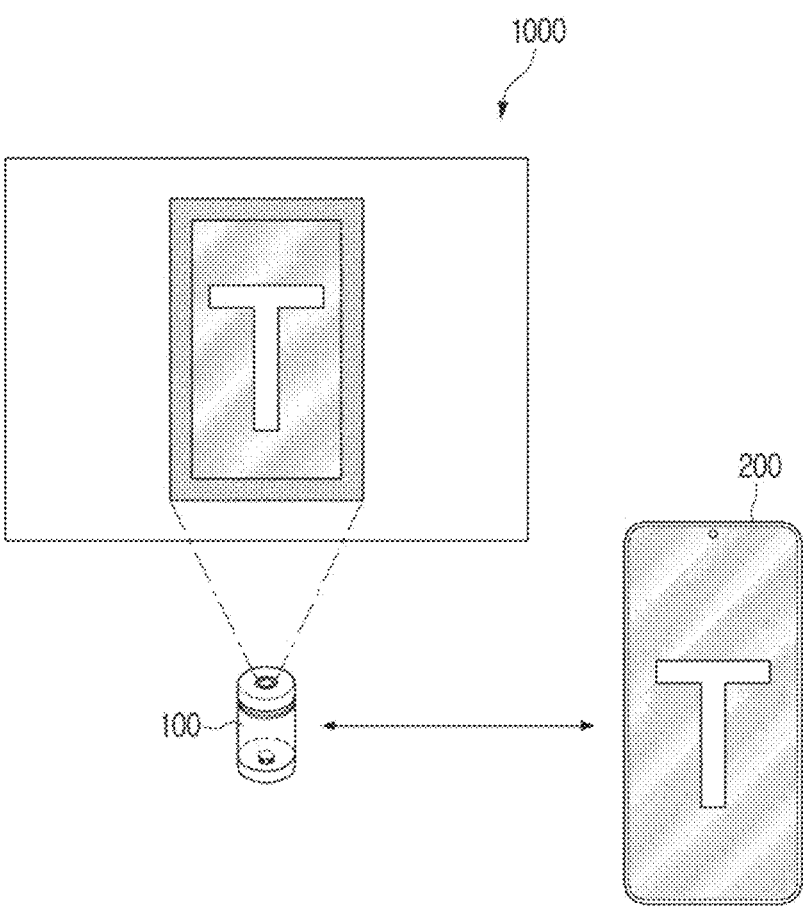
FIG. 50 is a diagram of a system including the electronic apparatus and a terminal device according to an embodiment of the disclosure.

FIG. 50 is a diagram of a system including the electronic apparatus and a terminal device according to an embodiment of the disclosure.

Referring to FIG. 50, the electronic apparatus 100 may communicate with the terminal device 200. The terminal device 200 may indicate the user's device, and the electronic apparatus 100 and the terminal device 200 may be connected with each other in the wireless manner. The projection image projected by the electronic apparatus 100 may also be displayed on the terminal device 200. The terminal device

200 may display the projection image to be output by the electronic apparatus 100 through a display included in the terminal device 200.

The terminal device 200 may transmit the projection image to be output to the projection plane 10 to the electronic apparatus 100. In addition, the electronic apparatus 100 may output the projection image received from the terminal device 200.

The terminal device 200 may display the guide image for the user input on the display included in the terminal device 200. The guide images described with reference to FIGS. 42 to 45 are described as being output from the electronic apparatus 100. In various examples, the terminal device 200 may display the guide image described with reference to FIGS. 42 to 45 based on a control signal received from the electronic apparatus 100.

The terminal device 200 may receive the user input through the displayed guide image. The terminal device 200 may transmit information corresponding to the received user input to the electronic apparatus 100.

The electronic apparatus 100 may output the projection image based on the new setting information about the basis of the information corresponding to the user input received from the terminal device 200.

Figure 51:
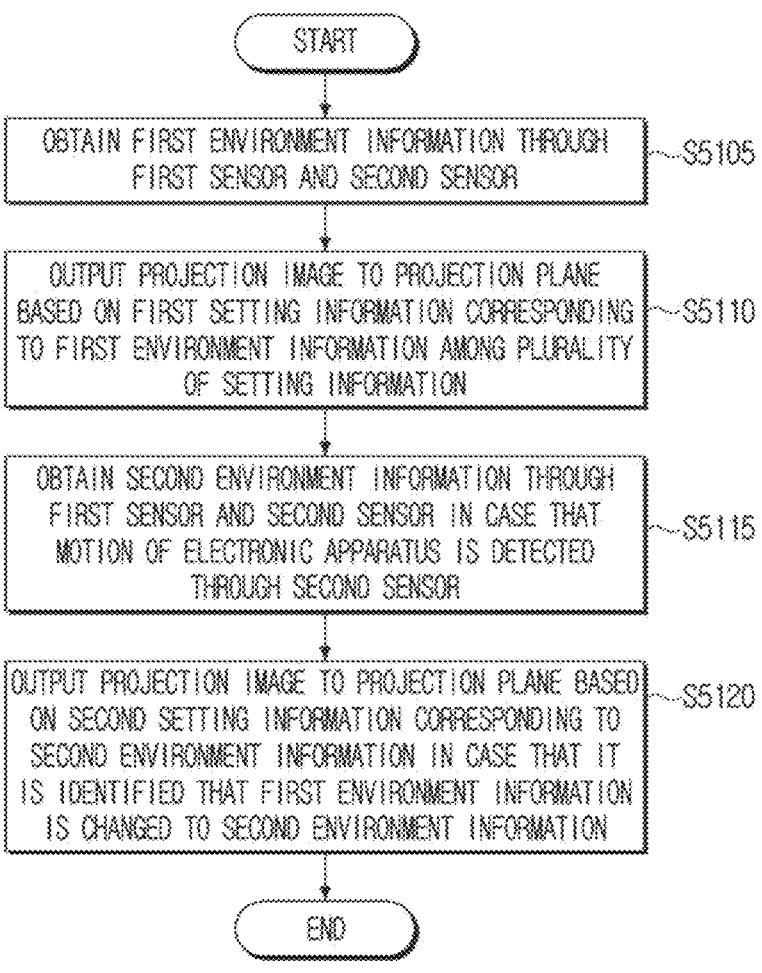
FIG. 51 is a flowchart of a controlling method of an electronic apparatus according to an embodiment of the disclosure.

FIG. 51 is a flowchart of a controlling method of an electronic apparatus according to an embodiment of the disclosure.

Referring to FIG. 51, a controlling method of an electronic apparatus which includes a first sensor for detecting a distance between the electronic apparatus and a projection plane and a second sensor for detecting inclination of the electronic apparatus may include, obtaining first environment information through the first sensor and the second sensor in operation S5105, outputting a projection image to the projection plane based on first setting information corresponding to the first environment information among plurality of setting information in operation S5110, obtaining second environment information through the first sensor and the second sensor in case that motion of the electronic apparatus is detected through the second sensor in operation S5115, and outputting the projection image to the projection plane based on second setting information corresponding to the second environment information in case that it is identified that the first environment information is changed to the second environment information in operation S5120.

The first environment information or the second environment information may include at least one of information about the inclination of the electronic apparatus, information about the distance between the electronic apparatus and the projection plane, and information about an object identified around the electronic apparatus, and the first setting information or the second setting information may include at least one of a projection ratio of the image, resolution of the image, brightness of the image, and a volume of an audio.

In the obtaining of the second environment information of operation S5115, the second environment information may be obtained through the first sensor and the second sensor in case that no motion of the electronic apparatus is detected for a predetermined time after the motion of the electronic apparatus is detected through the second sensor.

In the outputting of the projection image to the projection plane based on the first setting information of operation S5110, the projection image having a first projection size may be output to the projection plane based on a first distance and a first projection ratio in case that the first distance between the electronic apparatus and the projection plane is included in the first environment information.

In the outputting of the projection image to the projection plane based on the second setting information of operation S5120, the projection image having the first projection size may be output to the projection plane based on the first distance, a second distance, and the first projection ratio in case that the second distance between the electronic apparatus and the projection plane is included in the second environment information.

In the outputting of the projection image to the projection plane based on the second setting information of operation S5120, a size of the projection image may be changed based on a ratio of the first distance to the second distance, and the changed projection image having the first projection size may be output to the projection plane.

In the outputting of the projection image to the projection plane based on the second setting information of operation S5120, the projection image having the first projection size may be output to the projection plane based on the second distance and a second projection ratio in case that the second distance between the electronic apparatus and the projection plane is included in the second environment information.

In the outputting of the projection image to the projection plane based on the second setting information of operation S5120, information about the second projection ratio may be obtained based on the second distance and the first projection size.

The controlling method may further include outputting the projection image to the projection plane based on first brightness corresponding to the first distance in case that the first distance between the electronic apparatus and the projection plane is included in the first environment information, and outputting the projection image to the projection plane based on second brightness corresponding to the second distance in case that the second distance between the electronic apparatus and the projection plane is included in the second environment information.

The controlling method may further include outputting a UI for guiding whether the second setting information corresponding to the second environment information is applied in case that it is identified that the first environment information is changed to the second environment information.

The controlling method of the electronic apparatus 100 as shown in FIG. 51 may be performed by the electronic apparatus 100 having the configuration of FIG. 2 or 3, and may also be performed by an electronic apparatus having another configuration.

The method in the various examples of the disclosure described above may be implemented in the form of an application which may be installed on the existing electronic apparatus.

In addition, the method in the various examples of the disclosure described above may be implemented only by software upgrade or hardware upgrade of the conventional electronic apparatus.

In addition, the various examples of the disclosure described above may be performed through an embedded server included in the electronic apparatus, or an external server of at least one of the electronic apparatus or the display device.

According to an embodiment of the disclosure, the various examples described above may be implemented in software including an instruction stored in a machine-readable storage medium (for example, a computer-readable storage medium). A machine may be a device that invokes the stored instruction from the storage medium and be operated based on the invoked instruction, and may include the electronic apparatus in the disclosed embodiments. In case that the instruction is executed by the processor, the processor may directly perform a function corresponding to the instruction or other components may perform the function corresponding to the instruction under a control of the processor. The instruction may include codes provided or executed by a compiler or an interpreter. The machine-readable storage medium may be provided in the form of a non-transitory storage medium. The term "non-transitory" indicates that the storage medium is tangible without including a signal, and does not distinguish whether data are semi-permanently or temporarily stored in the storage medium.

In addition, according to an embodiment of the disclosure, the method in the various examples described above may be provided by being included in a computer program product. The computer program product may be traded as a product between a seller and a purchaser. The computer program product may be distributed in a form of the storage medium (for example, a compact disc read only memory (CD-ROM)) that may be read by the machine or online through an application store (for example, PlayStore™). When the online distribution, at least portions of the computer program product may be at least temporarily stored or temporarily provided in a storage medium such as a memory of a server of a manufacturer, a server of an application store or a relay server.

In addition, each component (e.g., module or program) in the various examples described above may include one entity or a plurality of entities, and some of the corresponding sub-components described above may be omitted or other sub-components may be further included in the various examples. Alternatively or additionally, some of the components (e.g., modules or programs) may be integrated into one entity, and may perform functions performed by the respective corresponding components before being integrated in the same or similar manner. Operations performed by the modules, the programs, or other components in the various examples may be executed in a sequential manner, a parallel manner, an iterative manner, or a heuristic manner, at least some of the operations may be performed in a different order or be omitted, or other operations may be added.

Although the embodiments of the disclosure are shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications also fall within the scope of the disclosure.

What is claimed is:

1. An electronic apparatus comprising:
a plurality of sensors;
a memory configured to store a plurality of setting information;
a projecting part; and
at least one processor configured to:
    obtain first environment information based on sensing data of the plurality of sensors,
    based on first setting information among the plurality of setting information corresponding to the first environment information, control the projecting part to output a projection image to a projection plane based on the first setting information, detect motion of the electronic apparatus based on sensing data of at least one sensor among the plurality of sensors,
    obtain second environment information based on sensing data of the plurality of sensors in response to detecting motion of the electronic apparatus, and
    based on second setting information among the plurality of setting information corresponding to the second environment information, control the projecting part to output the projection image to the projection plane based on the second setting information and based on the first environment information being changed to the second environment information,
wherein the first environment information and the second environment information comprises at least one of information about the inclination of the electronic apparatus, information about the distance between the electronic apparatus and the projection plane, and information about an object around the electronic apparatus,
wherein the first setting information and the second setting information comprises at least one of a projection ratio of an image and a resolution of the image, and
wherein the at least one processor is further configured to provide a user interface (UI) configured to indicate whether the second setting information corresponding to the second environment information is applied based on the first environment information being changed to the second environment information.

2. The electronic apparatus of claim 1, wherein the at least one processor is further configured to obtain the second environment information based on detecting no motion of the electronic apparatus for a predetermined time after detecting the motion of the electronic apparatus through at least one sensor among the plurality of sensors.

3. The electronic apparatus of claim 1, wherein the at least one processor is further configured to, based on a first distance between the electronic apparatus and the projection plane being included in the first environment information, control the projecting part to output the projection image having a first projection size to the projection plane based on the first distance and a first projection ratio.

4. The electronic apparatus of claim 3, wherein the at least one processor is further configured to, based on a second distance between the electronic apparatus and the projection plane being included in the second environment information, control the projecting part to output the projection image having the first projection size to the projection plane based on the first distance, the second distance, and the first projection ratio.

5. The electronic apparatus of claim 4, wherein the at least one processor is further configured to control the projecting part to:
    change a size of the projection image based on a ratio of the first distance to the second distance, and
    output the projection image having the changed size to the projection plane.

6. The electronic apparatus of claim 3, wherein the at least one processor is further configured to, based on a second distance between the electronic apparatus and the projection plane being included in the second environment information, control the projecting part to output the projection image having the first projection size to the projection plane based on the second distance and a second projection ratio.

7. The electronic apparatus of claim 6, wherein the at least one processor is further configured to obtain information about the second projection ratio based on the second distance and the first projection size.

8. The electronic apparatus of claim 1, wherein the at least one processor is further configured to:

based on a first distance between the electronic apparatus and the projection plane being included in the first environment information, control the projecting part to output the projection image to the projection plane based on a first brightness corresponding to the first distance, and based on a second distance between the electronic apparatus and the projection plane being included in the second environment information, control the projecting part to output the projection image to the projection plane based on a second brightness corresponding to the second distance.

9. A controlling method of an electronic apparatus, the electronic apparatus comprising a memory storing a plurality of setting information, and a plurality of sensors, the method comprising:

obtaining first environment information based on sensing data of the plurality of sensors;

based on first setting information among the plurality of setting information corresponding to the first environment information, outputting a projection image to a projection plane based on the first setting information;

detecting motion of the electronic apparatus based on sensing data of at least one sensor among the plurality of sensors;

obtaining second environment information based on sensing data of the plurality of sensors, in response to detecting motion of the electronic apparatus; and based on second setting information among the plurality of setting information corresponding to the second environment information, outputting the projection image to the projection plane based on the second setting information based on the first environment information being changed to the second environment information, wherein the first environment information and the second environment information comprises at least one of information about the inclination of the electronic apparatus, information about the distance between the electronic apparatus and the projection plane, and information about an object around the electronic apparatus, wherein the first setting information and the second setting information comprises at least one of a projection ratio of an image and a resolution of the image, and wherein the method further comprises providing a user interface (UI) configured to indicate whether the second setting information corresponding to the second environment information is applied based on the first environment information being changed to the second environment information.

10. The method of claim 9, wherein the second environment information is obtained based on no motion of the electronic apparatus being detected for a predetermined time after the motion of the electronic apparatus is detected through at least one sensor among the plurality of sensors.

11. The method of claim 9, wherein the outputting of the projection image to the projection plane based on the first setting information comprises:

based on a first distance between the electronic apparatus and the projection plane being included in the first environment information, outputting the projection image having a first projection size to the projection plane based on the first distance and a first projection ratio.

12. The method of claim 11, wherein the outputting of the projection image to the projection plane based on the second setting information comprises:

based on a second distance between the electronic apparatus and the projection plane being included in the second environment information, outputting the projection image having the first projection size to the projection plane based on the first distance, the second distance, and the first projection ratio.

13. The method of claim 12, further comprising:

changing a size of the projection image based on a ratio of the first distance to the second distance, and outputting the projection image having the changed size to the projection plane.

14. The method of claim 11, further comprising, based on a second distance between the electronic apparatus and the projection plane being included in the second environment information, outputting the projection image having the first projection size to the projection plane based on the second distance and a second projection ratio.

15. The method of claim 14, further comprising obtaining information about the second projection ratio based on the second distance and the first projection size.

16. The method of claim 9, further comprising:

based on a first distance between the electronic apparatus and the projection plane being included in the first environment information, outputting the projection image to the projection plane based on a first brightness corresponding to the first distance, and based on a second distance between the electronic apparatus and the projection plane being included in the second environment information, outputting the projection image to the projection plane based on a second brightness corresponding to the second distance.

17. A non-transitory computer-readable storage medium storing instructions that, when executed by at least one processor, cause the at least one processor to:

obtain first environment information based on sensing data of a plurality of sensors;

based on first setting information among a plurality of setting information stored in a memory corresponding to the first environment information, output a projection image to a projection plane based on the first setting information;

detect motion of an electronic apparatus based on sensing data of at least one sensor among the plurality of sensors;

obtain second environment information based on sensing data of the plurality of sensors, in response to detecting motion of the electronic apparatus; and based on second setting information among the plurality of setting information stored in the memory corresponding to the second environment information, output the projection image to the projection plane based on the second setting information and based on the first environment information being changed to the second environment information, wherein, the first environment information and the second environment information comprises at least one of information about the inclination of the electronic apparatus, information about the distance between the electronic apparatus and the projection plane, and information about an object around the electronic apparatus, wherein the first setting information and the second setting information comprises at least one of a projection ratio of an image and a resolution of the image, and wherein the instructions, when executed by the at least one processor, further cause the at least one processor to provide a user interface (UI) configured to indicate whether the second setting information corresponding to the second environment information is applied based on the first environment information being changed to the second environment information.

* * * * *